United States Patent
Woytowitz et al.

(10) Patent No.: US 9,301,461 B2
(45) Date of Patent: Apr. 5, 2016

(54) SYSTEMS AND METHODS TO ADJUST IRRIGATION

(71) Applicant: Hunter Industries, Inc., San Marcos, CA (US)

(72) Inventors: Peter J. Woytowitz, San Diego, CA (US); Christopher M. Shearin, Murrieta, CA (US); Jeffrey J. Kremicki, Cardiff by the Sea, CA (US); LaMonte D. Porter, San Marcos, CA (US)

(73) Assignee: HUNTER INDUSTRIES, INC., San Marcos, CA (US)

( * ) Notice: Subject to any disclaimer, the term of this patent is extended or adjusted under 35 U.S.C. 154(b) by 0 days.

(21) Appl. No.: 14/188,235

(22) Filed: Feb. 24, 2014

(65) Prior Publication Data

US 2014/0172180 A1 Jun. 19, 2014

Related U.S. Application Data

(63) Continuation-in-part of application No. 14/090,281, filed on Nov. 26, 2013, now abandoned, which is a continuation of application No. 13/153,270, filed on Jun. 3, 2011, now Pat. No. 8,600,569, which is a (Continued)

(51) Int. Cl.
*A01G 25/16* (2006.01)

(52) U.S. Cl.
CPC ....................... *A01G 25/16* (2013.01)

(58) Field of Classification Search
CPC ...... A01G 25/16; A01G 25/167; G05D 11/00

USPC ........... 700/282–284; 137/78.1–78.3; 239/64, 239/67, 69

See application file for complete search history.

(56) References Cited

U.S. PATENT DOCUMENTS

| | | |
|---|---|---|
| 3,721,254 A | 3/1973 | Rutten |
| 4,176,395 A | 11/1979 | Evelyn-Veere et al. |
| 4,180,083 A | 12/1979 | Miyaoka et al. |
| 4,567,563 A | 1/1986 | Hirsch |
| 4,646,224 A | 2/1987 | Ransburg et al. |

(Continued)

FOREIGN PATENT DOCUMENTS

| | | |
|---|---|---|
| WO | WO 03/085473 | 10/2003 |
| WO | WO 2008/144563 | 11/2008 |

OTHER PUBLICATIONS

Aqua Conserve Products from Internet—Email address: http://www.aquaconserve.com/products.php (2002, Aqua Conservation Systems), in 5 pages.

(Continued)

*Primary Examiner* — Mohammad Ali
*Assistant Examiner* — Nathan L Laughlin
(74) *Attorney, Agent, or Firm* — Knobbe, Martens, Olson & Bear

(57) ABSTRACT

An irrigation system includes an irrigation controller with an adjust feature and at least one sensor. The irrigation system further includes a sensor control unit operatively connected to the irrigation controller and the at least one sensor. The sensor control unit is configured to calculate an irrigation value using a signal from the sensor and to automatically modify a watering schedule of the irrigation controller through the adjust feature based on the irrigation value to thereby conserve water while maintaining plant health.

18 Claims, 82 Drawing Sheets

Related U.S. Application Data continuation of application No. 12/181,894, filed on Jul. 29, 2008, now abandoned, and a continuation-in-part of application No. 13/011,301, filed on Jan. 21, 2011, now Pat. No. 8,548,632, which is a continuation of application No. 12/176,936, filed on Jul. 21, 2008, now Pat. No. 7,877,168, which is a continuation-in-part of application No. 10/985,425, filed on Nov. 9, 2004, now Pat. No. 7,853,363, and a continuation-in-part of application No. 11/288,831, filed on Nov. 29, 2005, now Pat. No. 7,412,303, application No. 14/188,235, filed on Feb. 24, 2014, which is a continuation-in-part of application No. 13/154,253, filed on Jun. 6, 2011, now Pat. No. 8,660,705, which is a continuation of application No. 12/251,179, filed on Oct. 14, 2008, now abandoned, and a continuation-in-part of application No. 13/011,301, filed on Jan. 21, 2011, now Pat. No. 8,548,632, which is a continuation of application No. 12/176,936, filed on Jul. 21, 2008, now Pat. No. 7,877,168, which is a continuation-in-part of application No. 10/985,425, filed on Nov. 9, 2004, now Pat. No. 7,853,363, and a continuation-in-part of application No. 11/288,831, filed on Nov. 29, 2005, now Pat. No. 7,412,303, application No. 14/188,235, filed on Feb. 24, 2014, which is a continuation-in-part of application No. 12/713,104, filed on Feb. 25, 2010, now Pat. No. 8,793,024.

(60) Provisional application No. 61/156,397, filed on Feb. 27, 2009.

(56) References Cited

U.S. PATENT DOCUMENTS

| | | |
|---|---|---|
| 4,655,076 A | 4/1987 | Weihe et al. |
| 4,693,419 A | 9/1987 | Weintraub et al. |
| 4,722,478 A | 2/1988 | Fletcher et al. |
| 4,755,942 A | 7/1988 | Gardner et al. |
| 4,807,664 A | 2/1989 | Wilson et al. |
| 4,811,221 A | 3/1989 | Sturman et al. |
| 4,876,647 A | 10/1989 | Gardner et al. |
| 4,877,189 A | 10/1989 | Williams |
| 4,922,433 A | 5/1990 | Mark |
| 4,937,732 A | 6/1990 | Brundisini |
| 4,962,522 A | 10/1990 | Marian |
| 5,097,861 A | 3/1992 | Hopkins et al. |
| 5,148,826 A | 9/1992 | Bakhshaei |
| 5,148,985 A | 9/1992 | Bancroft |
| 5,173,855 A | 12/1992 | Nielsen et al. |
| 5,208,855 A | 5/1993 | Marian |
| 5,229,937 A | 7/1993 | Evelyn-Veere |
| 5,251,153 A | 10/1993 | Nielsen et al. |
| 5,293,554 A | 3/1994 | Nicholson |
| 5,337,957 A | 8/1994 | Olson |
| 5,381,331 A | 1/1995 | Mock et al. |
| 5,444,611 A | 8/1995 | Woytowitz et al. |
| 5,479,339 A | 12/1995 | Miller |
| 5,546,974 A | 8/1996 | Bireley |
| 5,694,963 A | 12/1997 | Fredell et al. |
| 5,696,671 A | 12/1997 | Oliver |
| 5,740,038 A | 4/1998 | Hergert |
| 5,829,678 A | 11/1998 | Hunter et al. |
| 5,836,339 A | 11/1998 | Klever et al. |
| 5,870,302 A | 2/1999 | Oliver |
| 5,944,444 A | 8/1999 | Motz et al. |
| 6,016,971 A | 1/2000 | Welch et al. |
| 6,088,621 A | 7/2000 | Woytowitz et al. |
| 6,145,755 A | 11/2000 | Feltz |
| 6,227,220 B1 | 5/2001 | Addink |
| 6,267,298 B1 | 7/2001 | Campbell |
| 6,298,285 B1 | 10/2001 | Addink et al. |
| 6,314,340 B1 | 11/2001 | Mecham et al. |
| 6,452,499 B1 | 9/2002 | Runge et al. |
| 6,453,215 B1 | 9/2002 | Lavole |
| 6,453,216 B1 | 9/2002 | McCabe et al. |
| 6,568,416 B2 | 5/2003 | Tucker et al. |
| 6,570,109 B2 | 5/2003 | Klinefelter et al. |
| 6,600,971 B1 | 7/2003 | Smith et al. |
| 6,721,630 B1 | 4/2004 | Woytowitz |
| 6,782,311 B2 | 8/2004 | Barlow et al. |
| 6,823,239 B2 | 11/2004 | Sieminski |
| 6,842,667 B2 | 1/2005 | Beutler et al. |
| 6,892,114 B1 | 5/2005 | Addink et al. |
| 6,895,987 B2 | 5/2005 | Addink et al. |
| 6,947,811 B2 | 9/2005 | Addink et al. |
| 6,977,351 B1 | 12/2005 | Woytowitz |
| 6,993,416 B2 | 1/2006 | Christiansen |
| 7,010,394 B1 | 3/2006 | Runge et al. |
| 7,010,396 B2 | 3/2006 | Ware et al. |
| 7,048,204 B1 | 5/2006 | Addink et al. |
| 7,058,478 B2 | 6/2006 | Alexanian |
| 7,069,115 B1 | 6/2006 | Woytowitz |
| 7,133,749 B2 | 11/2006 | Goldberg |
| 7,146,254 B1 | 12/2006 | Howard |
| 7,168,632 B2 | 1/2007 | Kates |
| 7,203,576 B1 | 4/2007 | Wilson et al. |
| 7,225,058 B1 | 5/2007 | Porter |
| 7,231,298 B2 | 6/2007 | Hnilica-Maxwell |
| 7,245,991 B1 | 7/2007 | Woytowitz |
| 7,261,245 B2 | 8/2007 | Zur |
| 7,289,886 B1 | 10/2007 | Woytowitz |
| 7,403,840 B2 | 7/2008 | Moore et al. |
| 7,412,303 B1 | 8/2008 | Porter et al. |
| 7,430,458 B2 | 9/2008 | Dansereau et al. |
| 7,458,521 B2 | 12/2008 | Ivans |
| 7,477,950 B2 | 1/2009 | DeBourke et al. |
| 7,532,954 B2 | 5/2009 | Evelyn-Veere |
| 7,596,429 B2 | 9/2009 | Cardinal et al. |
| 7,619,322 B2 | 11/2009 | Gardner et al. |
| 7,789,321 B2 | 9/2010 | Hitt |
| 7,805,221 B2 | 9/2010 | Nickerson |
| 7,853,363 B1 | 12/2010 | Porter et al. |
| 7,877,168 B1 | 1/2011 | Porter et al. |
| 7,953,517 B1 | 5/2011 | Porter et al. |
| 7,956,624 B2 | 6/2011 | Beaulieu |
| 8,301,309 B1 | 10/2012 | Woytowitz et al. |
| 8,538,592 B2 | 9/2013 | Alexanian |
| 8,548,632 B1 | 10/2013 | Porter et al. |
| 8,600,569 B2 | 12/2013 | Woytowitz et al. |
| 8,606,415 B1 | 12/2013 | Woytowitz et al. |
| 8,660,705 B2 | 2/2014 | Woytowitz et al. |
| 8,793,024 B1 | 7/2014 | Woytowitz et al. |
| 8,924,032 B2 | 12/2014 | Woytowitz et al. |
| 2001/0054967 A1 | 12/2001 | Vanderah et al. |
| 2002/0002425 A1 | 1/2002 | Dossey et al. |
| 2002/0072829 A1 | 6/2002 | Addink et al. |
| 2003/0093159 A1 | 5/2003 | Sieminski |
| 2003/0109964 A1 | 6/2003 | Addink et al. |
| 2003/0179102 A1 | 9/2003 | Barnes |
| 2003/0182022 A1 | 9/2003 | Addink et al. |
| 2004/0011880 A1 | 1/2004 | Addink et al. |
| 2004/0015270 A1 | 1/2004 | Addink et al. |
| 2004/0030456 A1 | 2/2004 | Barlow et al. |
| 2004/0039489 A1 | 2/2004 | Moore et al. |
| 2004/0181315 A1 | 9/2004 | Cardinal et al. |
| 2004/0206395 A1 | 10/2004 | Addink et al. |
| 2004/0225412 A1 | 11/2004 | Alexanian |
| 2004/0239524 A1 | 12/2004 | Kobayashi |
| 2005/0038529 A1* | 2/2005 | Perez et al. ............ 700/19 |
| 2005/0038569 A1* | 2/2005 | Howard ............ 700/284 |
| 2005/0090936 A1 | 4/2005 | Hitt et al. |
| 2005/0125083 A1 | 6/2005 | Kiko |
| 2005/0171646 A1 | 8/2005 | Miller |
| 2005/0199842 A1 | 9/2005 | Parsons et al. |
| 2005/0203669 A1 | 9/2005 | Curren |
| 2005/0211791 A1 | 9/2005 | Clark et al. |
| 2005/0211792 A1 | 9/2005 | Clark et al. |
| 2005/0211793 A1 | 9/2005 | Clark et al. |
| 2005/0211794 A1 | 9/2005 | Clark et al. |
| 2005/0216127 A1 | 9/2005 | Clark et al. |

(56) References Cited

U.S. PATENT DOCUMENTS

| | | | |
|---|---|---|---|
| 2005/0216128 A1 | 9/2005 | Clark et al. | |
| 2005/0216129 A1 | 9/2005 | Clark et al. | |
| 2005/0216130 A1* | 9/2005 | Clark | A01G 25/16 700/284 |
| 2006/0116792 A1 | 6/2006 | Addink | |
| 2006/0122736 A1 | 6/2006 | Alexanian | |
| 2006/0161309 A1* | 7/2006 | Moore et al. | 700/284 |
| 2006/0184284 A1 | 8/2006 | Froman et al. | |
| 2006/0184285 A1 | 8/2006 | Evelyn-Veere | |
| 2007/0016334 A1 | 1/2007 | Smith et al. | |
| 2007/0055407 A1 | 3/2007 | Goldberg et al. | |
| 2007/0156290 A1 | 7/2007 | Froman et al. | |
| 2007/0237583 A1 | 10/2007 | Corwon et al. | |
| 2007/0282486 A1 | 12/2007 | Walker et al. | |
| 2007/0293990 A1 | 12/2007 | Alexanain | |
| 2008/0091307 A1 | 4/2008 | Dansereau et al. | |
| 2008/0142614 A1 | 6/2008 | Elezaby | |
| 2009/0094097 A1 | 4/2009 | Gardenswartz | |
| 2009/0099701 A1 | 4/2009 | Li et al. | |
| 2009/0138105 A1 | 5/2009 | Crawford | |
| 2009/0177330 A1 | 7/2009 | Kah, Jr. | |
| 2009/0216345 A1 | 8/2009 | Christfort | |
| 2009/0326723 A1 | 12/2009 | Moore et al. | |
| 2010/0030476 A1 | 2/2010 | Woytowitz et al. | |
| 2010/0094472 A1 | 4/2010 | Woytowitz et al. | |
| 2010/0312404 A1 | 12/2010 | Nickerson | |
| 2011/0093123 A1 | 4/2011 | Alexanian | |
| 2011/0224836 A1 | 9/2011 | Hern et al. | |
| 2011/0238228 A1 | 9/2011 | Woytowitz et al. | |
| 2011/0238229 A1 | 9/2011 | Woytowitz et al. | |
| 2014/0081471 A1 | 3/2014 | Woytowitz et al. | |
| 2014/0088771 A1 | 3/2014 | Woytowitz et al. | |
| 2015/0112494 A1 | 4/2015 | Woytowtiz | |

OTHER PUBLICATIONS

Crop Evapotranspiration—Guidelines for Computing Crop Water Requirements—FAQ Irrigation and Drainage Paper 56 Attachment for link to Internet-Email address: http://hydrotechnic.150m.com/crop_water.html (1998) 60 pages.

Dukes, et al.: "Soil Moisture Sensor Control for Conservation of Landscape Irrigation," Georgia Water Resources Conference, Mar. 27-29, 2007.

East Bay Municipal Utility District (EBMUD), "Irrigation Controllers Timer for the Homeowner," US Environmental Protection Agency (EPA) (EPA 832-K-03-001, Jul. 2003)—http://www.epa.gov/owm/water-efficiency/Irrigation_booklet.pdf.

Hunter Irrigation Products Catalog, 110 pages, 2007.

Hydropoint, Inc., WeatherTRAK, Smart Irrigation Made Simple, in 1 page. 2004 Hydropoint, Inc. http://www.hydropoint.com (2004 Hydropoint, Inc.).

Smart Irrigation Made Simple: of Weathertrak from Internet—Email address: http://www.hydropoint.com (2004 Hydropoint, Inc.), in 1 page.

Residential Landscape Irrigation Study Using Aqua ET Controllers for Aqua Conserve, Denver Water, Denver, CO & City of Sonoma, CA & Valley of the Moon Water District, CA. Jun. 2002, in 5 pages.

Shedd et al., "Evaluation of Evapotranspiration and Soil Moisture-based Irrigation Control on Turfgrass," Proceedings ASCE EWRI World Environmental & Water Resources Congress, May 15-19, 2007, in 21 pages.

SRR Remote Wiring and Installation of Hunter the Irrigation Innovators from Internet—Email address: http:////www.hunterindustries.com/resources/technical_bulletin/srr_remote.html (2004 Hunter Industries Incorporated), in 1 page.

Toro Partners with HydroPoint Data Systems to Develop Weather-Based Irrigation Controllers of Athletic Turf News from Internet—Email address: http://athleticturf.net/athleticturf/article, Jan. 16, 2004.

The ongoing prosecution history of U.S. Appl. No. 11/458,551, filed Jul. 19, 2006, including without limitations Office Action, Amendments, Remarks, and any other potentially relevant documents.

The ongoing prosecution history of U.S. Appl. No. 12/042,301, filed Mar. 4, 2008, including without limitations Office Action, Amendments, Remarks, and any other potentially relevant documents.

U.S. Appl. No. 10/985,425 "Amendment" in response to USPTO Office Action mailed on Aug. 11, 2005 in 9 pages.

U.S. Appl. No. 10/985,425 "Amendment" in response to USPTO Office Action mailed Dec. 6, 2005 in 8 pages.

U.S. Appl. No. 10/985,425 "Brief on Appeal" in response to Board of Appeals and Interferences' Notice of Panel Decision from Pre-Appeal Brief Review mailed Jan. 23, 2007 (appealing from USPTO Office Action mailed Mar. 24, 2006), in 22 pages.

U.S. Appl. No. 10/985,425 "Examiner's Answer" in response to Appellants' Appeal Brief filed Mar. 23, 2007 (appealing from USPTO Office Action mailed on Mar. 24, 2006).

U.S. Appl. No. 10/985,425 "Reply Brief" in response to Examiner's Answer from Board of Appeals and Interferences mailed Jul. 25, 2007.

Written Opinion of International Searching Authority in re PCT/US2008/063977. Published as WO 2008/144563.

Rain Bird, Turf Irrigation Equipment 1989 catalog, cover page, pp. 72 and 73.

* cited by examiner

I-CORE
Pump Master Valve

SYSTEMS AND METHODS TO ADJUST IRRIGATION

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

BACKGROUND

Electronic irrigation controllers are used on residential and commercial sites to water turf and landscaping. They typically comprise a plastic housing that encloses circuitry including a processor that executes a watering program. Watering schedules are typically manually entered or selected by a user with pushbutton and/or rotary controls while observing a display. The processor turns a plurality of solenoid actuated valves ON and OFF with solid state switches according to the watering schedules that are carried out by the watering program. The valves deliver water to sprinklers connected by subterranean pipes.

There is a large demand for conventional irrigation controllers that are easy for users to set up and modify watering schedules. The user simply enters the start times for a selected watering schedule, assigns a station to one or more schedules, and sets each station to run a predetermined number of minutes to meet the irrigation needs of the site. The problem with conventional irrigation controllers is that they are often set up to provide the maximum amount of irrigation required for the hottest and driest season, and then either left that way for the whole year, or in some cases the watering schedules are modified once or twice per year by the user. The result is that large amounts of water are wasted. Water is a precious natural resource and there is an increasing need to conserve it.

SUMMARY

In an embodiment, an irrigation system to irrigate an irrigation site comprises an irrigation controller, at least one sensor configured to generate a signal representative of an irrigation condition, and a control unit. The irrigation controller comprises a plurality of user inputs that enable a user to enter a watering schedule including a run time and to manually adjust an adjustment value of an adjustment feature. The adjustment feature is configured to modify the run time of the watering program by the adjustment value.

In an embodiment, the irrigation controller further comprises a computer processor operatively connected to the plurality of user inputs and a memory connected to the computer processor, where programming stored in the memory implements the adjustment feature to change the run time of the watering schedule by the adjustment value.

In one embodiment, the adjustment feature is a percentage adjustment feature and the adjustment value is a percentage adjustment value, where the percentage adjustment value is a percentage. For example, the watering program can be set up by the user to water for 30 minutes on selected days. In dry summer months, the user can set the percentage adjustment value to 50% and the irrigation controller adjusts the run time by the percentage adjustment value. In this example, the irrigation controller adjusts the run time by 50% or adjusts the run time to 45 minutes on the selected days based on the user-entered percentage adjustment value.

The sensors can be, for example, but not limited to one or more of soil moisture sensors, weather stations, rain sensors, humidity sensors, temperature sensors, solar radiation sensors, wind sensors, and the like. An irrigation condition is a condition that provides an indication of the need or lack of need for irrigation of the irrigation site. For example, the irrigation condition at the irrigation site can be, for example, but not limited to one or more of a soil moisture level of the soil, an amount of recent rain fall, humidity and/or temperature of the air, an amount of solar radiation, wind velocity and/or direction, and the like. In certain embodiments, the one or more sensors comprise a plurality of soil moisture sensors.

The control unit comprises a memory storing programming that calculates an irrigation value using the signal from the at least one sensor and communicates an irrigation adjustment value based at least in part on the irrigation value to the computer processor of the stand alone irrigation controller to automatically modify the percentage adjustment value based on the irrigation adjustment value. For example, the summer is not as hot and dry as the user expected and watering for 45 minutes on the selected days is too much water for the plants. If, for example, the at least one sensor comprises a soil moisture sensor and the signal from the soil moisture sensor indicates that the soil is moist, then the control unit calculates an irrigation value using the soil moisture level indicated by the soil moisture sensor and determines an irrigation adjustment value based at least in part on the irrigation value.

The irrigation controller receives the irrigation adjustment value from the control unit and automatically adjusts the adjustment value by the irrigation adjustment value, which, in turn, automatically adjusts the run time of the watering schedule. For example, the control unit determines that the run time for the current soil moisture level should be adjusted by only 10%. The irrigation controller then automatically adjusts the percentage adjustment value to 10% such that the run time becomes 33 minutes for the watering program associated with the soil moisture sensor.

In further embodiments, the irrigation system iteratively repeats this process to fine tune the irrigation of the irrigation site by providing successive automatic adjustments to the adjustment value.

According to various embodiments, an irrigation system is disclosed. The irrigation system comprises a stand alone irrigation controller comprising a plurality of user inputs that enable a user to enter a watering schedule including a run time and to manually adjust a percentage adjustment value of a percentage adjustment feature, a computer processor operatively connected to the plurality of user inputs, and a memory connected to the computer processor, wherein programming stored in the memory implements the percentage adjustment feature to change the run time of the watering schedule by the percentage adjustment value. The irrigation system further comprises at least one sensor configured to generate a signal representative of an irrigation condition, and a stand alone control unit comprising a memory storing programming that calculates an irrigation value using the signal from the at least one sensor and communicates an irrigation adjustment value based at least in part on the irrigation value to the computer processor of the stand alone irrigation controller to automatically modify the percentage adjustment value based on the irrigation adjustment value.

In an embodiment, the irrigation value is calculated using the signal from the at least one sensor and a reference point. In another embodiment, the reference point is calculated based on constants selected to simulate local conditions of an irrigation site. In a further embodiment, the stand alone control unit further comprises at least one user input that enables the user to change the reference point.

In an embodiment, the at least one sensor comprises at least one environmental sensor and the signal from the at least one sensor comprises an indication of at least one of temperature, humidity, solar radiation, wind, and rain. In another embodiment, the at least one sensor comprises at least one soil moisture sensor and the signal from the at least one sensor comprises an indication of soil moisture. In a further embodiment, the percentage adjustment value comprises a scaling factor. In a yet further embodiment, the stand alone control unit further comprises a hand held housing. In another embodiment, the stand alone control unit further comprises a protective housing. In another embodiment, the stand alone control unit further comprises a housing that is mountable to a housing of the stand alone irrigation controller.

In certain embodiments, an irrigation system is disclosed. The irrigation system comprises a plurality of user inputs that enable a user to enter a watering schedule including a run time and to manually adjust a percentage adjustment value of a percentage adjustment feature, a computer processor operatively connected to the plurality of user inputs, a memory connected to the computer processor to store the watering schedule, at least one sensor configured to generate a signal representative of an irrigation condition, where the computer processor is configured to calculate an irrigation value based at least in part on the signal from the at least one sensor and to determine an irrigation adjustment value responsive to the irrigation value; and programming stored in the memory to implement the percentage adjustment feature to modify the run time of the watering schedule by the percentage adjustment value. The programming automatically modifies the percentage adjustment value based on the irrigation adjustment value.

In an embodiment, the at least one sensor comprises at least one soil moisture sensor and a temperature sensor and the irrigation value is calculated using signals from the at least one soil moisture sensor and the temperature sensor. In another embodiment, the irrigation value is further based on one or more constants configured to approximate local environmental conditions of an irrigation site. In a further embodiment, the irrigation adjustment value is a percentage.

In accordance with various embodiments, a method to irrigate an irrigation site is disclosed. The method comprises accepting inputs from a user that enable the user to enter a watering schedule including a run time and to manually adjust a percentage adjustment value of a percentage adjustment feature configured to change the watering schedule by the percentage adjustment value, receiving a signal representative of an irrigation condition on an irrigation site, determining an irrigation adjustment value based on the signal, implementing the percentage adjustment feature by modifying the run time of the watering schedule by the percentage adjustment value, and automatically adjusting the percentage adjustment value based on the irrigation adjustment value.

In an embodiment, the method further comprises calculating an irrigation value based at least in part on the signal and one or more constants representative of a geographic region associated with the irrigation site, and determining the irrigation adjustment value based on the irrigation value. In another embodiment, the method further comprises automatically shutting down irrigation based at least in part on detecting a rain event. In a yet further embodiment, the method further comprises automatically shutting down irrigation based at least in part on detecting a freeze event.

For purposes of summarizing the disclosure, certain aspects, advantages and novel features of the embodiments have been described herein. It is to be understood that not necessarily all such advantages may be achieved in accordance with any particular embodiment of the invention. Thus, the inventions may be embodied or carried out in a manner that achieves or optimizes one advantage or group of advantages as taught herein without necessarily achieving other advantages as may be taught or suggested herein.

BRIEF DESCRIPTION OF THE DRAWINGS

Throughout the drawings, reference numbers are re-used to indicate correspondence between referenced elements. The drawings, associated descriptions, and specific implementation are provided to illustrate embodiments and not to limit the scope of the disclosure.

DETAILED DESCRIPTION

Figure 1:
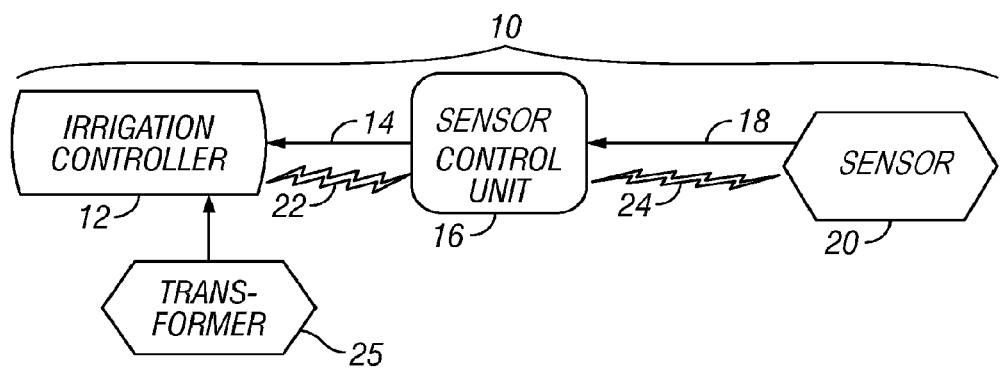
FIG. 1 is a block diagram of an irrigation system, according to an embodiment.

The entire disclosures of the following U.S. patents and U.S. patent applications are hereby incorporated by reference: U.S. Pat. No. 5,097,861 granted Mar. 24, 1992 of Hopkins et al. entitled IRRIGATION METHOD AND CONTROL SYSTEM; U.S. Pat. No. 5,444,611 granted Aug. 22, 1995 of Peter J. Woytowitz, et al. entitled LAWN AND GARDEN IRRIGATION CONTROLLER; U.S. Pat. No. 5,829,678 granted Nov. 3, 1998 of Richard E. Hunter et al. entitled SELF-CLEANING IRRIGATION REGULATOR VALVE APPARATUS; U.S. Pat. No. 6,088,621 granted Jul. 11, 2000 also of Peter J. Woytowitz et al. entitled PORTABLE APPARATUS FOR RAPID REPROGRAMMING OF IRRIGATION CONTROLLERS; U.S. Pat. No. 6,721,630 granted Apr. 13, 2004 also of Peter J. Woytowitz entitled EXPANDABLE IRRIGATION CONTROLLER WITH OPTIONAL HIGH-DENSITY STATION MODULE; U.S. Pat. No. 6,842,667 granted Jan. 11, 2005 of Beutler et al. entitled POSITIVE STATION MODULE LOCKING MECHANISM FOR EXPANDABLE IRRIGATION CONTROLLER; U.S. Pat. No. 7,069,115 granted June 27 of Peter J. Woytowitz entitled HYBRID MODULAR/DECODER IRRIGATION CONTROLLER; U.S. Pat. No. 7,853,363 granted Dec. 14, 2010 Peter J. Woytowitz et al. entitled EVAPOTRANSPIRATION UNIT CONNECTABLE TO IRRIGATION CONTROLLER; U.S. Pat. No. 7,412,303 granted Aug. 12, 2008 of LaMonte D. Porter et al. and entitled EVAPOTRANSPIRATION UNIT FOR RE-PROGRAMMING AN IRRIGATION CONTROLLER; U.S. Pat. No. 7,245,991 granted Jul. 17, 2007 of Peter J. Woytowitz entitled DISTRIBUTED ARCHITECTURE IRRIGATION CONTROLLER; U.S. Pat. No. 7,289,886 of Peter J. Woytowitz granted Oct. 30, 2007 entitled MODULAR IRRIGATION CONTROLLER WITH SEPARATE FIELD VALVE LINE WIRING TERMINALS; U.S. Pat. No. 7,225,058 granted May 29, 2007 of LaMonte D. Porter entitled MODULAR IRRIGATION CONTROLLER WITH INDIRECTLY POWERED STATION MODULES; U.S. patent application Ser. No. 11/458,551 filed Jul. 19, 2006 of LaMonte D. Porter et al. entitled IRRIGATION CONTROLLER WITH INTERCHANGEABLE CONTROL PANEL; pending U.S. patent application Ser. No. 12/042,301 filed Mar. 4, 2008 of Peter J. Woytowitz et al. entitled IRRIGATION CONTROLLER WITH SELECTABLE WATERING RESTRICTIONS; U.S. patent application Ser. No. 12/181,894 filed Jul. 29, 2008 of Peter J. Woytowitz et al. entitled IRRIGATION SYSTEM WITH ET BASED SEASONAL WATERING ADJUSTMENT; U.S. Pat. No. 7,953,517 granted May 31, 2011 of LaMonte D. Porter et al. entitled LANDSCAPE CONTROLLER WITH CONTROL PANEL INSERTABLE FEATURE MODULE; and U.S. patent application Ser. No. 12/251,179 filed Oct. 14, 2008 of Peter J. Woytowitz et al. entitled IRRIGATION SYSTEM WITH SOIL MOISTURE BASED SEASONAL WATERING ADJUSTMENT. The aforementioned U.S. patents and applications are all assigned to Hunter Industries, Inc., the assignee of the subject application.

A conventional irrigation controller of the type that is used in the commercial market typically includes a seasonal adjustment feature. This feature is typically a global adjustment implemented by the user that adjusts the overall watering as a percentage of the originally scheduled cycle times. It is common for the seasonal adjustment to vary between a range of about ten percent to about one hundred and fifty percent or more of the scheduled watering. This is the simplest and most common overall watering adjustment that users of irrigation controllers can effectuate. Users can move the amount of adjustment down ten to thirty percent in the winter, depending on their local requirements. They may run the system at fifty percent during the spring or fall seasons, and then at one hundred percent for the summer. The ability to seasonally adjust up to one hundred and fifty percent or more of the scheduled watering accommodates the occasional heat wave when turf and landscaping require significantly increased watering.

The seasonal adjustment feature does not produce the optimum watering schedules because it does not take into consideration factors such as moisture that is actually available in the soil type, plant type, slope, temperature, humidity, solar radiation, wind speed, etc. for the plants to utilize for healthy growth. Instead, the seasonal adjustment feature is manually set to adjust the watering schedules globally to run a longer or shorter period of time based on the existing watering schedule. So a considerable amount of water is wasted, or turf and landscaping die.

Embodiments of the irrigation system automatically modify watering schedules based on sensor data in order to conserve water and effectively irrigate vegetation throughout the year as weather conditions vary. Embodiments of the user friendly irrigation system are capable of saving a significant amount of water, but are still able to be used by non-professionals.

Referring to FIG. 1, in an embodiment, an irrigation system 10 comprises a stand alone irrigation controller 12 connected via cable 14 to a stand alone sensor control unit 16 that is in turn connected via cable 18 to a sensor 20. The irrigation controller 12 and sensor control unit 16 would typically be mounted in a garage or other protected location, although they can have a waterproof construction that allows them to be mounted out of doors.

The cables 14 and 18 typically include copper wires so that power can be supplied to the sensor control unit 16 and the sensor 20 from the irrigation controller 12. Data and commands are sent on other copper wires in the cables. Fiber optic cables can also be utilized for sending data and commands. The controller 12, sensor control unit 16, and sensor 20 may exchange data and commands via wireless communication links 22 and 24. A transformer 25 that plugs into a standard household 110VAC duplex outlet supplies 24VAC power to the stand alone irrigation controller 12. In an embodiment, the irrigation system 10 employs a hard wired communication link 14 between the stand alone irrigation controller 12 and the stand alone sensor control unit 16 that are normally mounted adjacent one another, such as on a garage wall.

In an embodiment, the sensor 20 comprises a weather station 20 and the sensor control unit 16 comprises an evapotranspiration (ET) control unit 16. The weather station 20 is typically mounted on an exterior wall, gutter, post or fence near the garage and the irrigation system 10 may employ a hard wired communication link 24 between the stand alone ET control unit 16 and the weather station 20.

In another embodiment, the sensor 20 comprises one or more soil moisture sensors 20 and the sensor control unit 16 comprises a soil moisture control unit 16. The soil moisture control unit 16 may be manufactured to fit inside the open space of the irrigation controller 12. The soil moisture sensor 20 is typically mounted in the ground at a place that represents the typical moisture content of the irrigated area, and the irrigation system 10 may employ a wireless communication link 24 between the stand alone soil moisture control unit 16 and one or more soil moisture sensors 20.

Figure 2A:
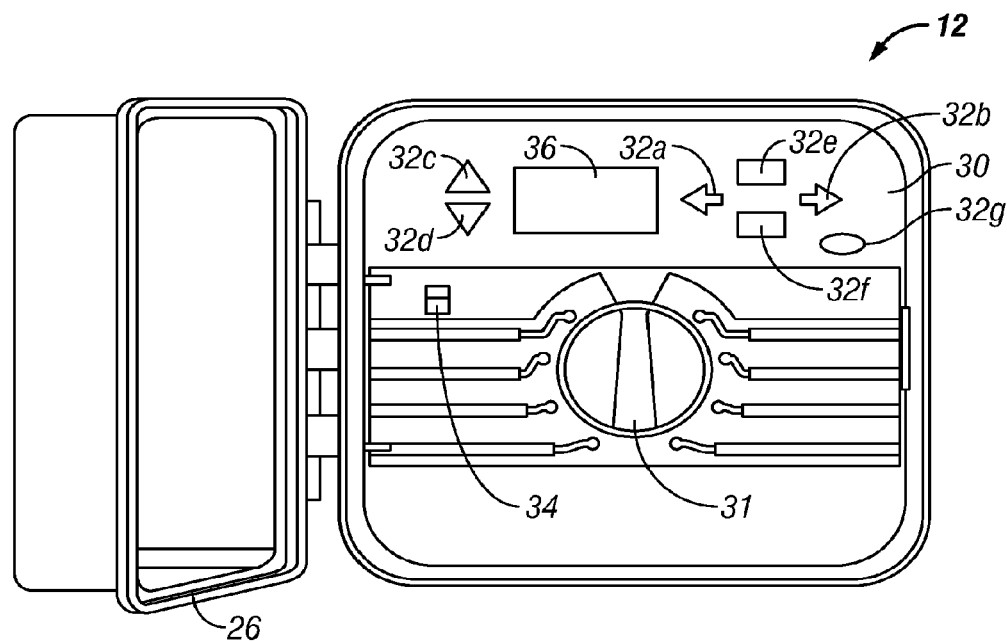
FIGS. 2A and 2B are a front elevation views of embodiments of the stand alone irrigation controller with its front door open to reveal its removable face pack.
Figure 2B:
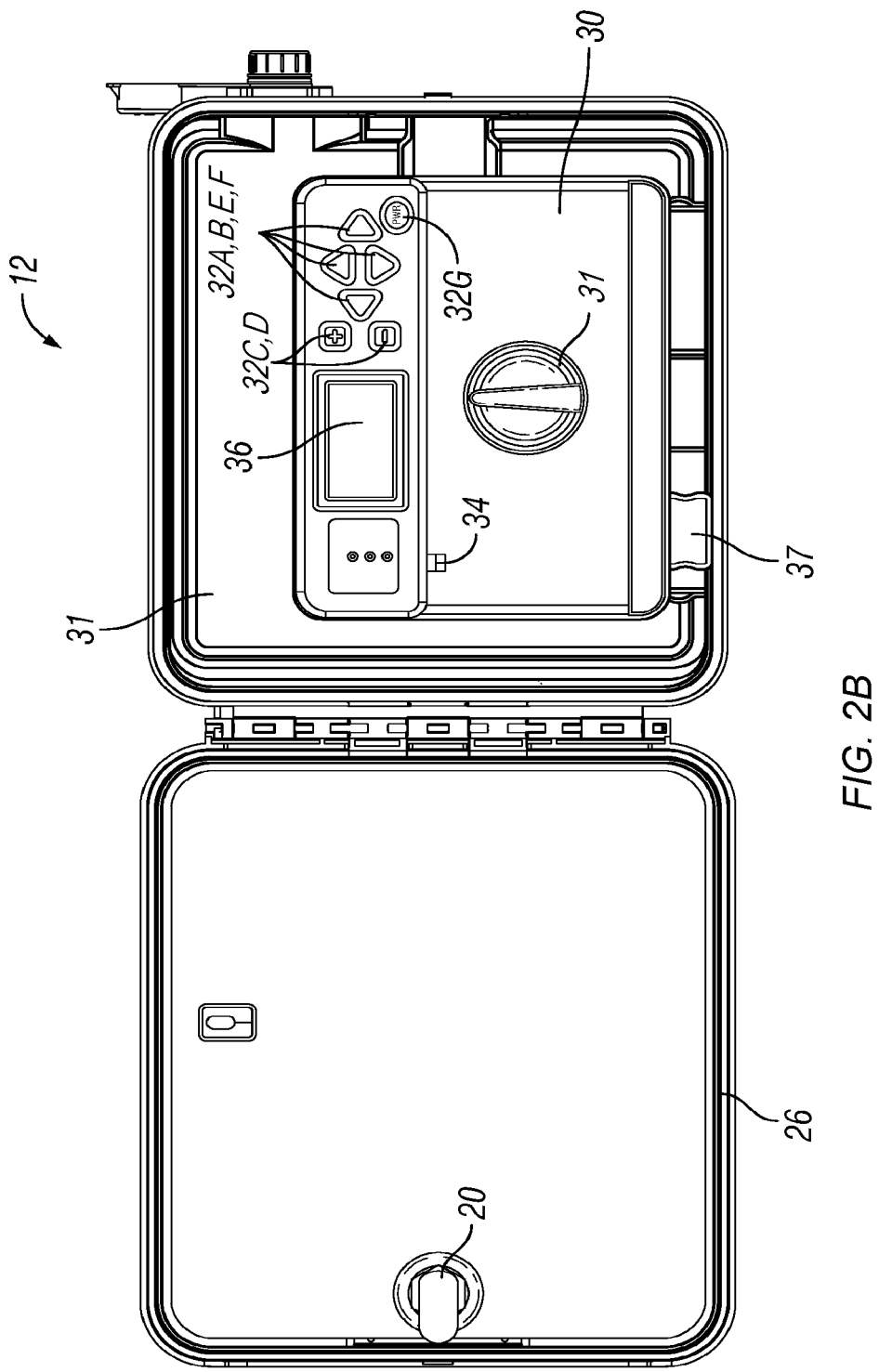
Figure 3A:
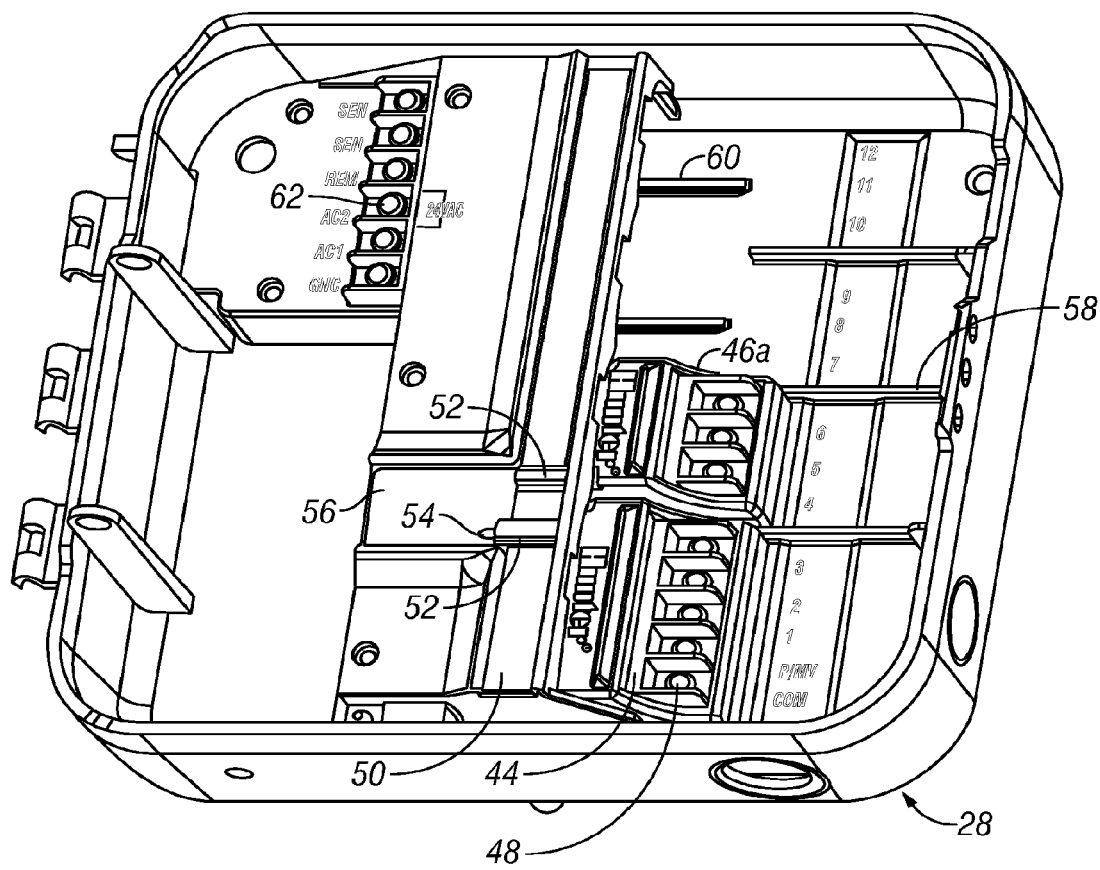
FIG. 3A is an enlarged perspective view of the back panel of the stand alone irrigation controller illustrating one base module and one station module plugged into their respective receptacles in the back panel, according to certain embodiments.
Figure 3B:
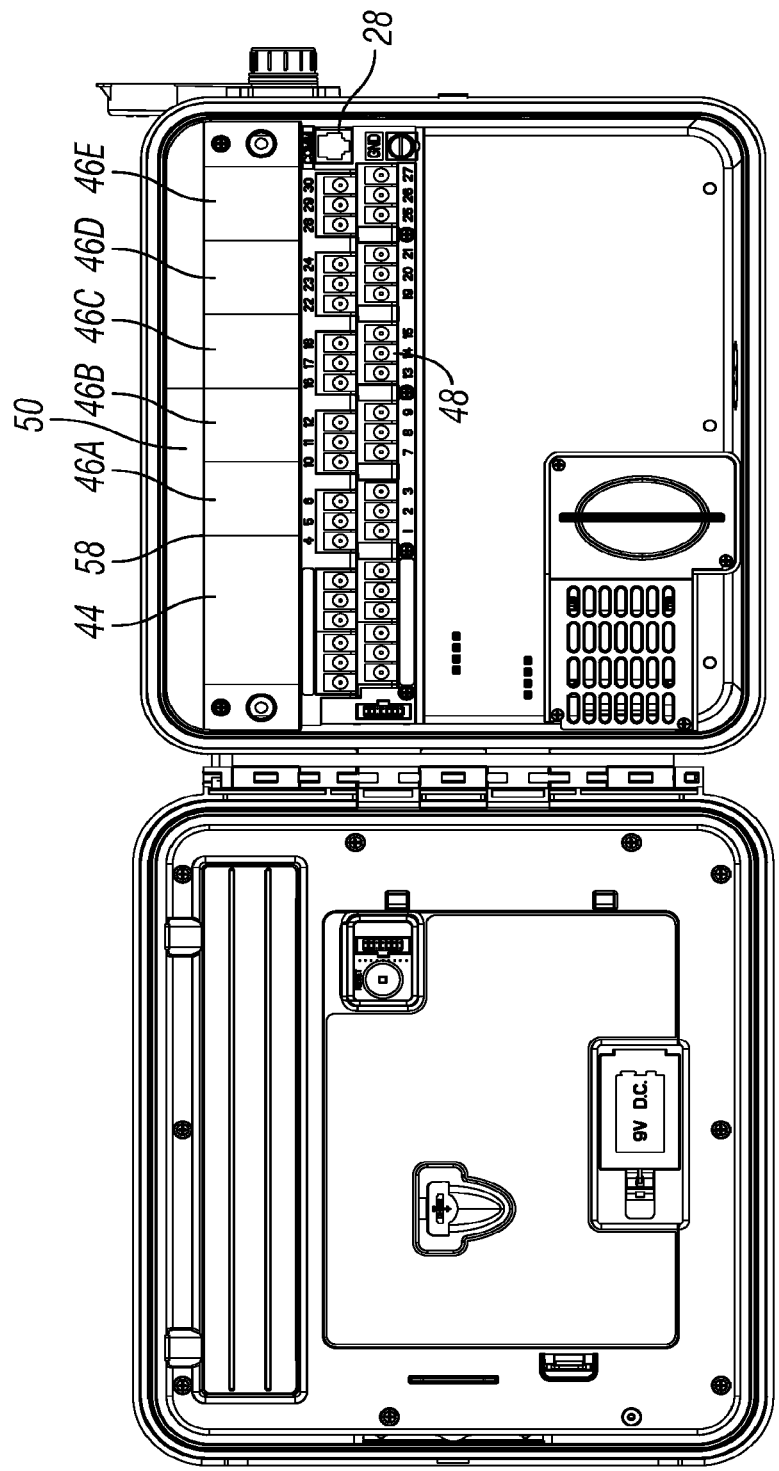
FIG. 3B is an enlarged perspective view of the back panel of the stand alone irrigation controller illustrating one base module and five station modules plugged into their respective receptacles in the back panel, according to certain embodiments.

FIGS. 2A and 2B illustrate embodiments of the irrigation controller 12. In one embodiment, the stand alone irrigation controller 12 may be the Pro-C® modular irrigation controller commercially available from Hunter Industries, Inc. The irrigation controller 12 includes a wall-mountable plastic housing structure in the form of a generally box-shaped front door 26 hinged along one vertical edge to a generally box-shaped back panel 28 (FIGS. 3A and 3B). A generally rectangular face pack 30 (FIGS. 2A and 2B) is removably mounted over the back panel 28 and is normally concealed by the front door 26 when not being accessed for programming. The face pack 30 has an interface in the form of a plurality of manually actuable controls including a rotary knob switch 31 and push button switches 32a-32g as well as slide switch 34 which serves as a sensor by-pass switch. Watering schedules consisting of various run and cycle times can be entered by the user by manipulating the rotary knob switch 31 and selected ones of the push button switches 32a-32g in conjunction with observing numbers, words and/or graphic symbols indicated on a liquid crystal display (LCD) 36. Push buttons 32c and 32d are used to increase or to decrease a seasonal adjust value. The watering schedules can be a complicated set of run time and cycle algorithms, or a portion thereof, such as a simple five minute cycle for a single station. Alternatively, existing pre-programmed watering schedules can be selected, such as selected zones every other day. An optional features card 37 that modifies the programming features to the user is installed in face pack 30. Any or sub-combination of manually actuable input devices such as rotary switches, dials, push buttons, slide switches, rocker switches, toggle switches, membrane switches, track balls, conventional screens, touch screens, etc. may be used to provide an interface that enables a user to select and/or enter a watering schedule. Still another alternative involves uploading watering schedules through the SmartPort™ feature of the irrigation controller 12, more details of which are set forth in the aforementioned U.S. Pat. No. 6,088,621.

Figure 4A:
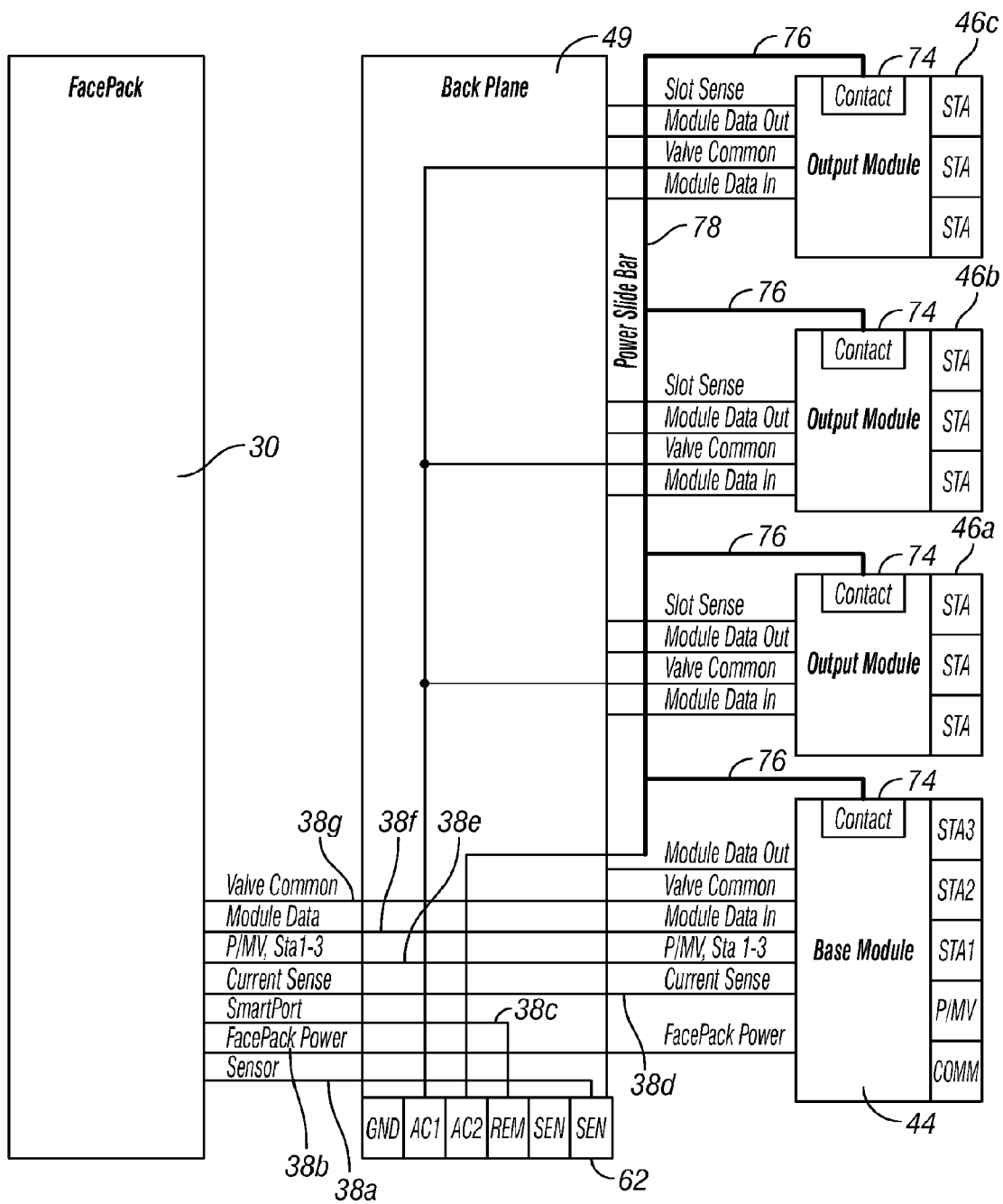
FIG. 4A is a block diagram of the electronic portion of the stand alone irrigation controller with three output modules, according to certain embodiments.
Figure 4B:
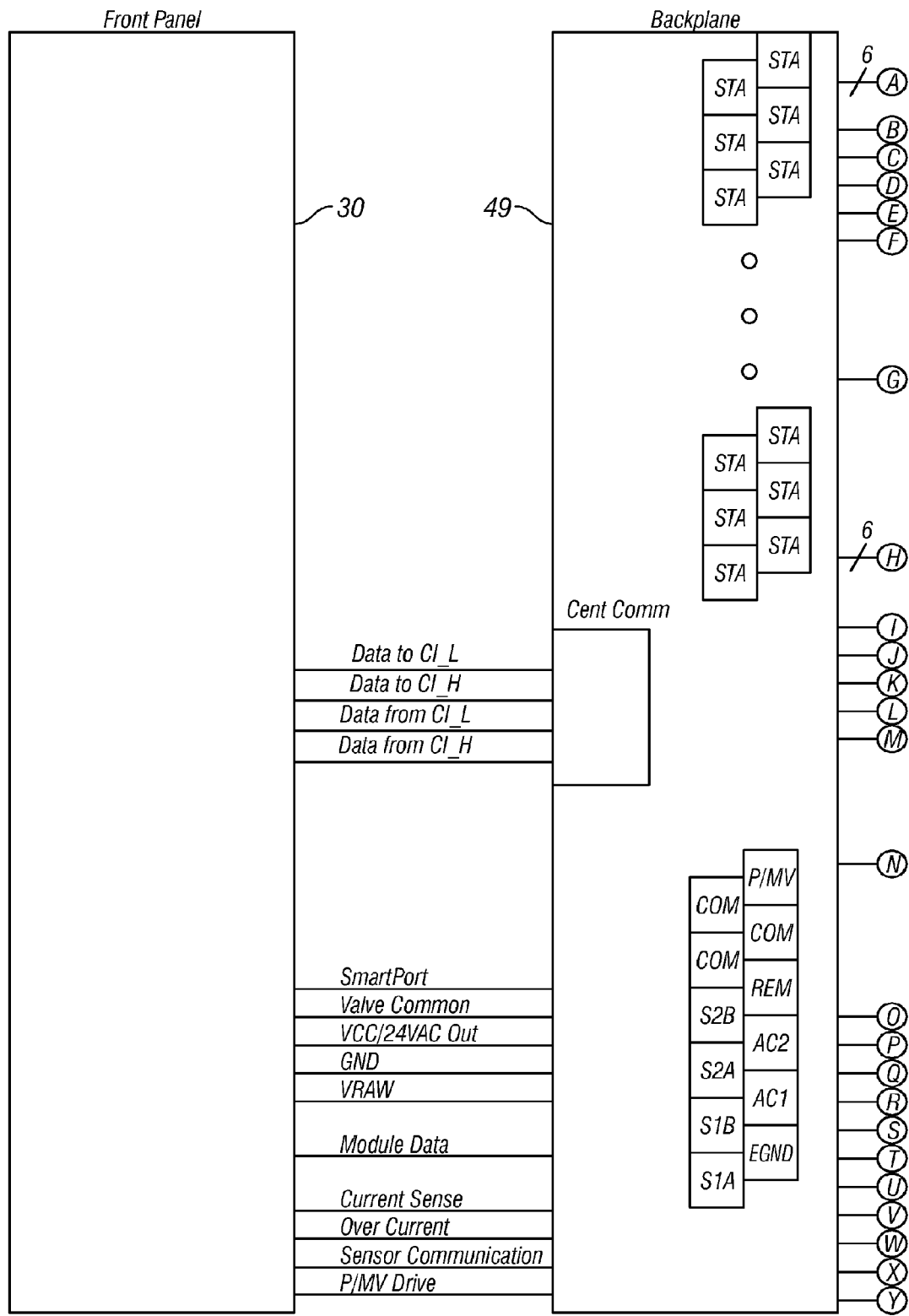
FIG. 4B is a block diagram of the electronic portion of the stand alone irrigation controller with two output modules, according to certain embodiments.

The face pack 30 (FIGS. 2A and 2B) encloses and supports a printed circuit board (not illustrated) with a processor for executing and implementing a stored watering program. An electrical connection is made between the face pack 30 and the components in the back panel 28 through a detachable ribbon cable including a plurality of conductors 38a-g (FIGS. 4A and 4B). The circuitry inside the face pack 30 can be powered by a battery to allow a person to remove the face pack 30, un-plug the ribbon cable, and walk around the lawn, garden area or golf course while entering watering schedules or altering pre-existing watering schedules.

A processor 40 (FIGS. 5A and 5B) is mounted on the printed circuit board inside the face pack 30. A watering program stored in a memory 42 is executable by the processor 40 to enable the processor to generate commands for selectively turning a plurality of solenoid actuated irrigation valves (not illustrated) ON and OFF in accordance with the selected or entered watering schedule. An example of such an irrigation valve is disclosed in U.S. Pat. No. 5,996,608 granted Dec. 7, 1999 of Richard E. Hunter et al. entitled DIAPHRAGM VALVE WITH FILTER SCREEN AND MOVEABLE WIPER ELEMENT, the entire disclosure of which is hereby incorporated by reference. Said patent is also assigned to Hunter Industries, Inc. Typically the solenoid actuated valves are mounted in subterranean plastic boxes (not illustrated) on the irrigated site.

The processor 40 communicates with removable modules 44 and 46*a-c* FIG. 3A or 46*a-c* FIG. 3B each containing a circuit that includes a plurality of solid state switches, such as triacs. These switches turn 24VAC current ON and OFF to open and close corresponding solenoid actuated valves via connected to dedicated field valve wires and a common return line to screw terminals 48 on the modules 44 and 46*a-c*.

FIGS. 3A and 3B are enlarged perspective views of the back panel of the stand alone irrigation controller. FIG. 3A illustrates one base module and one station module plugged into their respective receptacles in the back panel and FIG. 3B illustrates one base module and five station modules plugged into their respective receptacles in the back panel.

In FIGS. 3A and 3B, the modules 44 and 46*a* are shown installed in side-by-side fashion in station module receptacles formed in the back panel 28. The module 44 serves as a base module that can turn a master valve ON and OFF in addition to a plurality of separate station valves. Each module includes an outer generally rectangular plastic housing with a slot at its forward end. A small printed circuit board (not illustrated) within the module housing supports the station module circuit that includes conductive traces that lead to the screw terminals 48 and to V-shaped spring-type electrical contacts (not illustrated) that are accessible via the slot in the forward end of the module housing. These V-shaped electrical contacts register with corresponding flat electrical contacts on the underside of a relatively large printed circuit board 49 (FIGS. 4A and 4B) mounted inside the back panel 28 when the module 44 is slid into its corresponding receptacle. The relatively large printed circuit board 49 is referred to as a "backplane." The base module 44 and station modules 46*a-c* and the backplane 49 are thus electrically and mechanically connected in releasable fashion through a so-called "card edge" connection scheme when the base module 44 and station modules 46*a-c* are inserted or plugged into their respective receptacles.

An elongate locking bar 50 (FIG. 3A) can be manually slid up and down between locked and unlocked positions to secure and un-secure the modules 44 and 46*a-c* after they have been fully inserted into their respective receptacles. Opposing raised projections 52 formed on the locking bar 50 facilitate sliding the locking bar 50 with a thumb. A pointer 54 extends from one of the raised projections 52 and serves as a position indicator that aligns with LOCKED and UNLOCKED indicia (not illustrated) molded into the upper surface of another plastic support structure 56 mounted inside back panel 28.

The receptacles for the modules such as 44 and 46*a-c* are partially defined by vertical walls 58 (FIGS. 3A and 3B) formed on the back panel 28. Vertical walls 60 also formed on the back panel 28 to provide support to the modules 44 and 46*a-c*. An auxiliary terminal strip provides additional screw terminals 62 for connecting remote sensors and accessories. The term "receptacles" should be broadly construed as defined in one or more of the patents and pending applications incorporated by reference above.

Figure 5A:
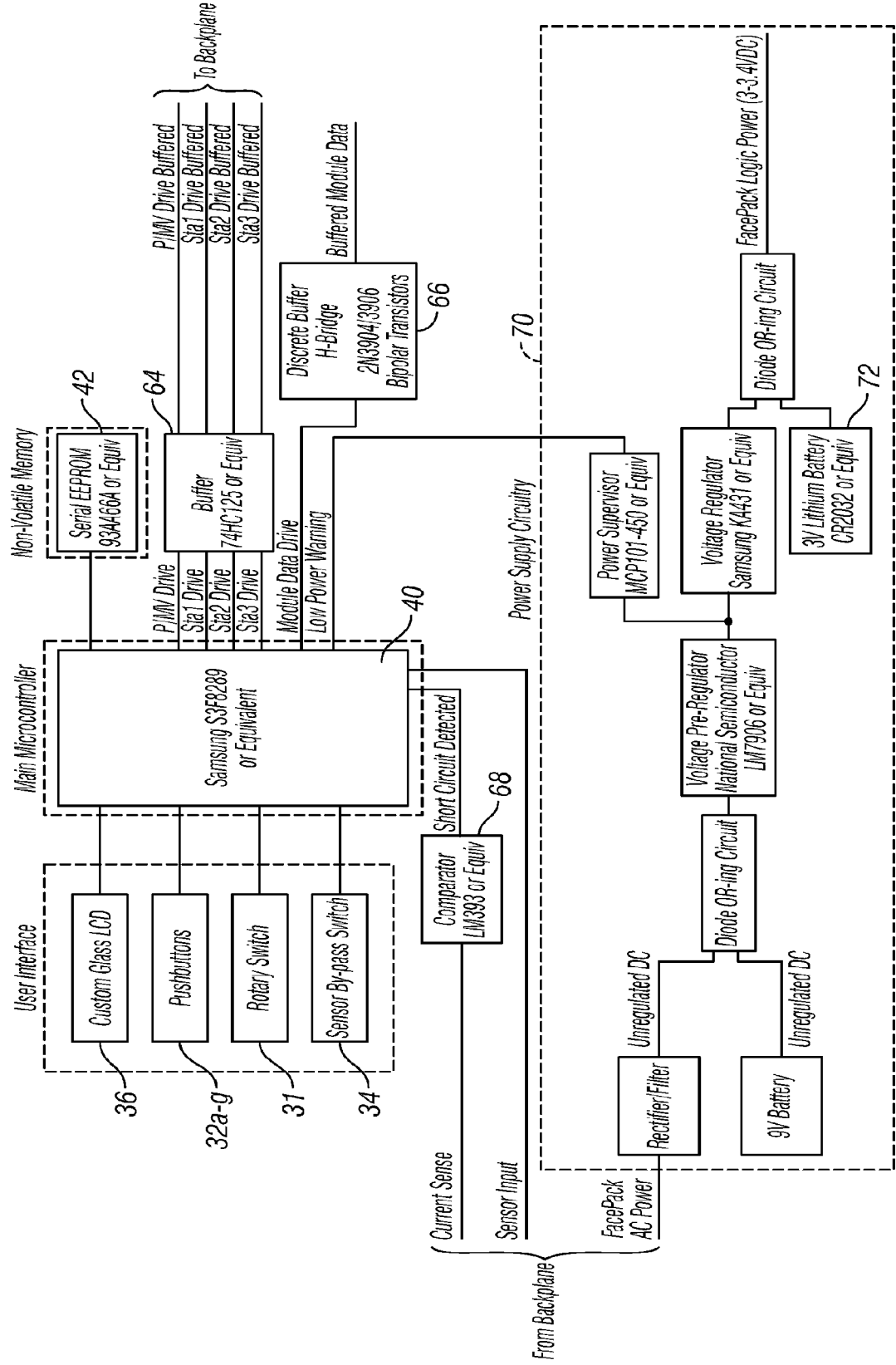
FIGS. 5A and 5B are a block diagrams illustrating further details of embodiments of the electronic portion of the stand alone irrigation controller that resides in the face pack of the controller.
Figure 5B:
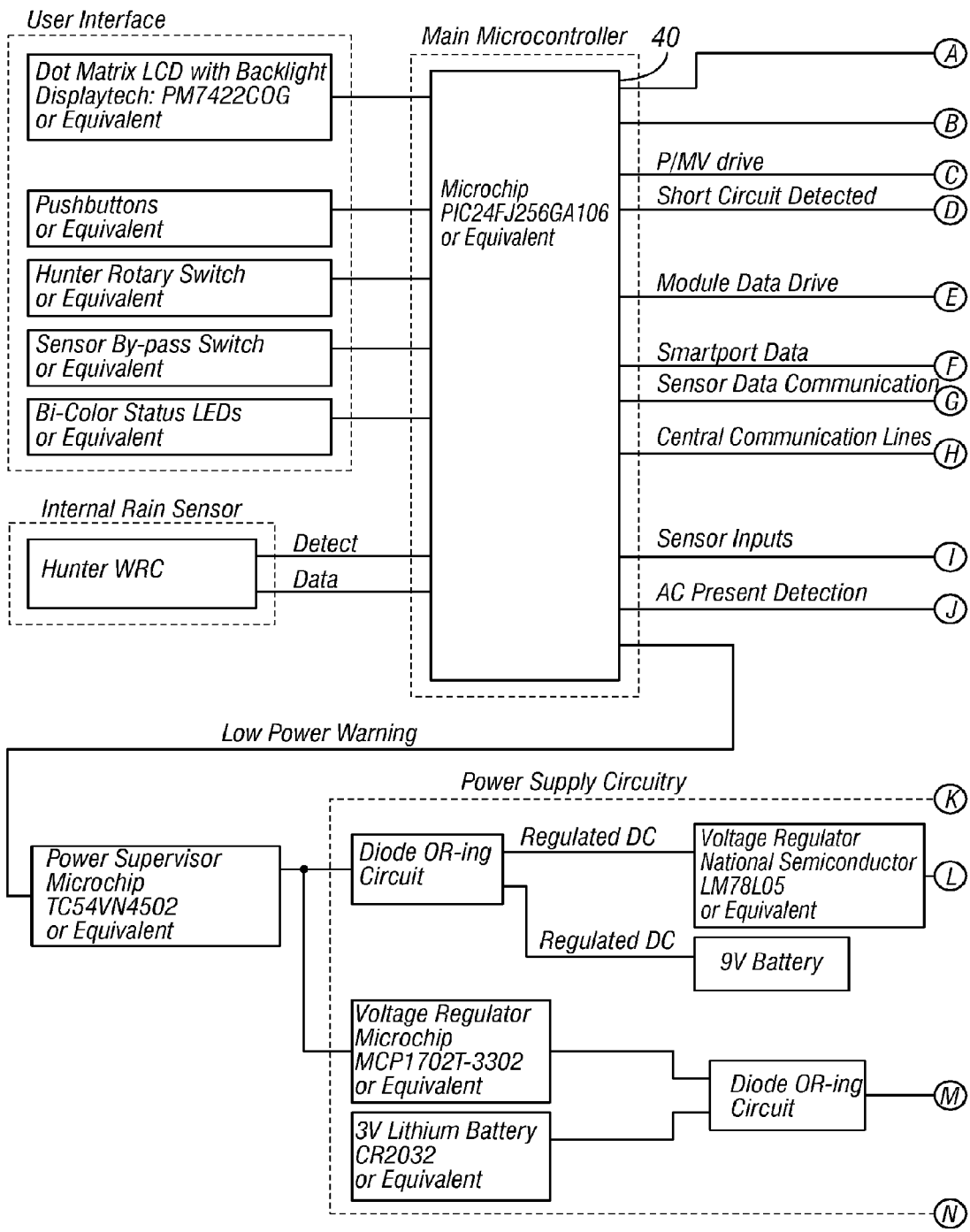
Figure 5B:
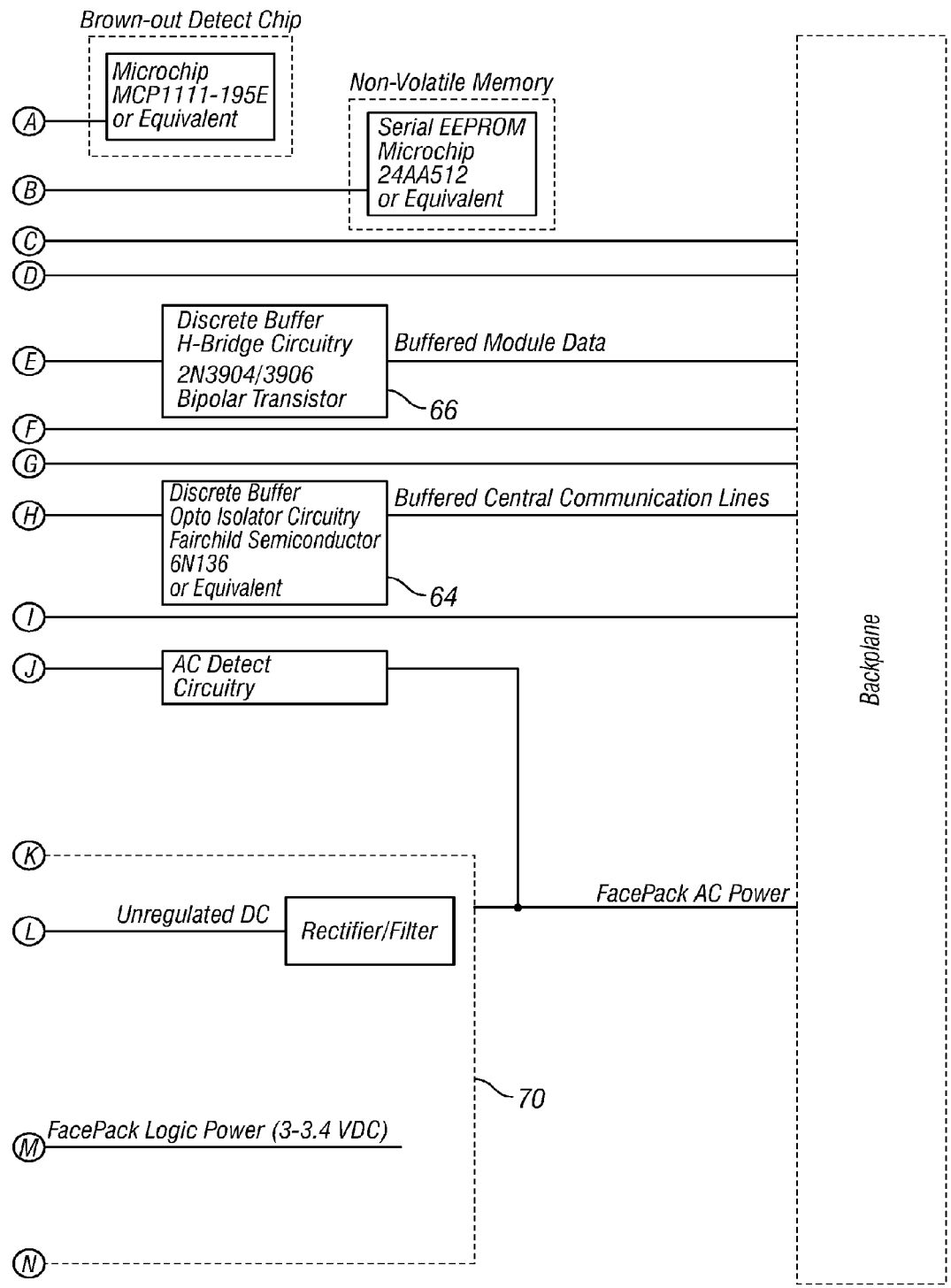

FIGS. 4A and 4B and FIGS. 5A and 5B are block diagrams of the electronic portion of the stand alone irrigation controller 12. FIG. 4A is a block diagram of the electronic portion of the stand alone irrigation controller with three output modules and FIG. 4B is a block diagram of the electronic portion of the stand alone irrigation controller with two output modules. FIGS. 5A and 5B are a block diagrams illustrating further details of embodiments of the electronic portion of the stand alone irrigation controller that resides in the face pack of the controller, according to certain embodiments.

The electronic components are mounted on printed circuit boards contained within the face pack 30, back panel 28, base module 44 and station modules 46*a-c*. The processor 40 (FIGS. 4A and 4B) is mounted on the printed circuit board inside the face pack 30 and executes the watering program stored in the memory 42. By way of example, the processor 40 may be a Samsung S3F8289 processor, a Microchip PIC24FJ256GAI 06 processor, or the like, that executes a program stored in the separate memory 42 which can be an industry standard designation Serial EEPROM 93AA6A non-volatile memory device. Alternatively, the processor 40 and memory 42 may be provided in the form of a microcomputer with on-chip memory. The manually actuable controls 31, 32*a*-32*g* and 34 and the LCD display 36 of the face pack 30 are connected to the processor 40. The processor 40 sends drive signals through buffer 64 and backplane 49 to the base module 44. By way of example the buffer 64 may be an industry standard designation 74HC125 device, a Fairchild semiconductor 6N136, or equivalent device. The processor 40 sends data signals to the modules 46*a-c* through buffer 66. The buffer 66 may be an H-bridge buffer including industry standard 2N3904/3906 discrete bipolar transistors.

The processor 40 (FIGS. 4A and 4B) controls the base module 44 and the station modules 46*a-c* in accordance with one or more watering schedules. Serial or multiplexed communication is enabled via the backplane 49 to the base module 44 and to each of the output modules 46*a-c*. Suitable synchronous serial data and asynchronous serial data station module circuits are disclosed in the aforementioned U.S. Pat. No. 6,721,630. The location of each module in terms of which receptacle it is plugged into is sensed using resistors on the backplane 49 and a comparator 68 (FIGS. 5A and 5B) which may be an industry standard LM393 device. The face pack 30 receives 24VAC power from the transformer 25 through the backplane 49 and regulates the same via a power supply circuit 70. The power supply circuit 70 includes a National Semiconductor LM7906 voltage regulator, a Microchip Technology MCP101-450, a TC54VN45202, or equivalent power supervisor, and a Samsung KA431, a Microchip MCP1702T-3302A, or equivalent voltage regulator. A lithium battery 72 such as an industry standard CR2032 battery is included in the power supply circuit 70 and provides backup power to the micro controller to maintain the internal clock in the event of a power failure. The face pack ribbon cable 38*a-g* (FIGS. 4A and 4B) that connects the face pack 30 and the backplane 49 can be disconnected, and a nine volt battery (FIGS. 5A and 5B) then supplies power to the face pack 30. This allows a user to remove the face 30 pack from the back panel 28 and enter or modify watering schedules as the user walks around the irrigation site.

The modules 44 and 46*a-c* have contacts 74 (FIG. 4A) on the top sides of their outer plastic housings. When the modules are first plugged into their receptacles, only a communication path is established with the processor 40 via the backplane 49. At this time the locking bar 50 (FIG. 3A) is in its UNLOCKED position. Thereafter, when the locking bar is slid to its LOCKED position finger-like contacts 76 (FIG. 4A) on the underside of the locking bar 50 register with the contacts 74 on the tops of the modules 44 and 46*a-c* to supply 24VAC power to the modules that is switched ON and OFF to the valves that are connected to the modules. The finger-like contacts 76 are connected to a common conductor 78 carried by the locking bar 50. When the locking bar 50 is slid to its LOCKED position projections and tabs that extend from the locking bar 50 and the modules are aligned to prevent withdrawal of the modules. See the aforementioned U.S. Pat. No. 7,225,058 for further details.

Figure 4B:
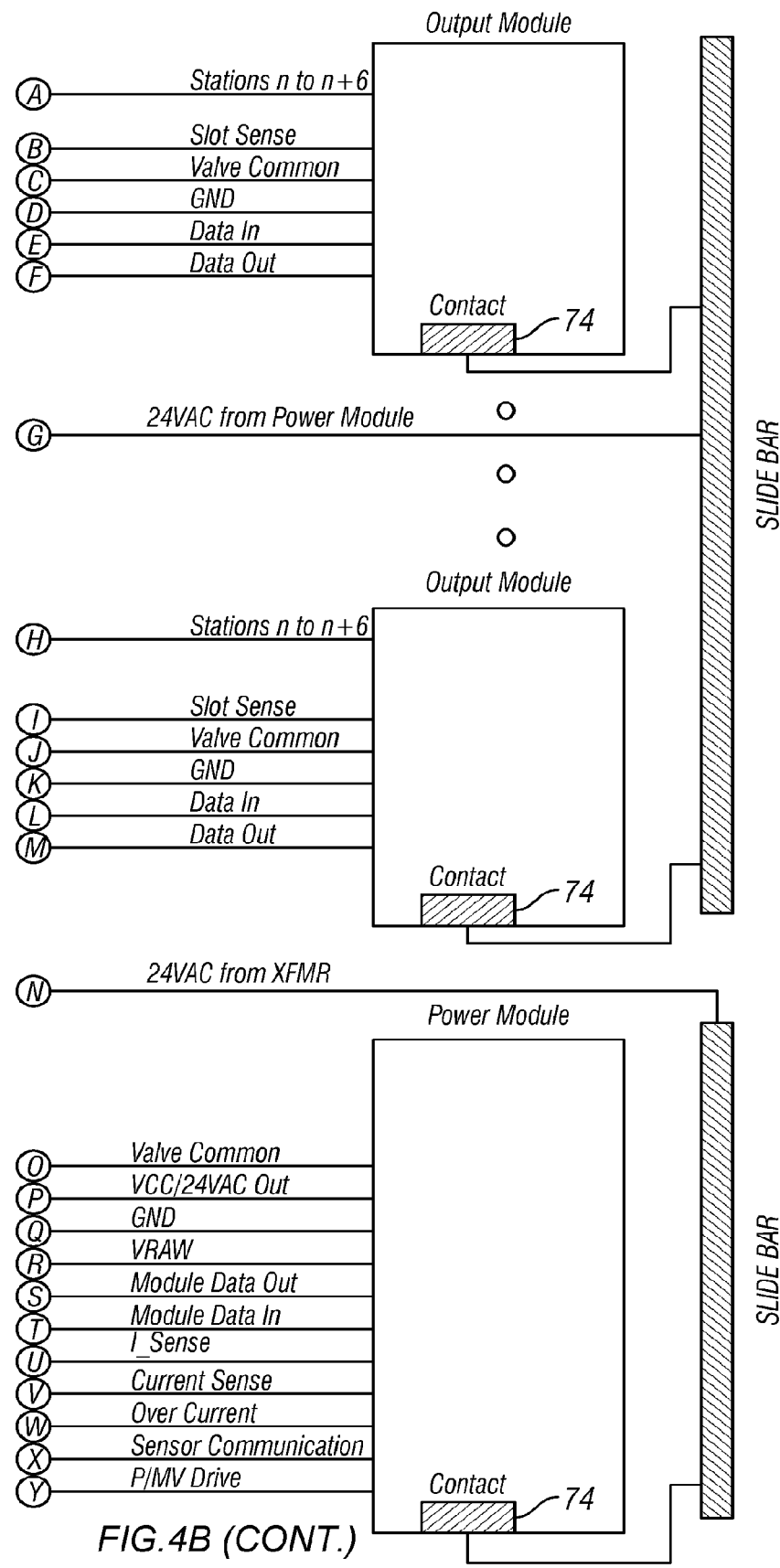
Figure 6A:
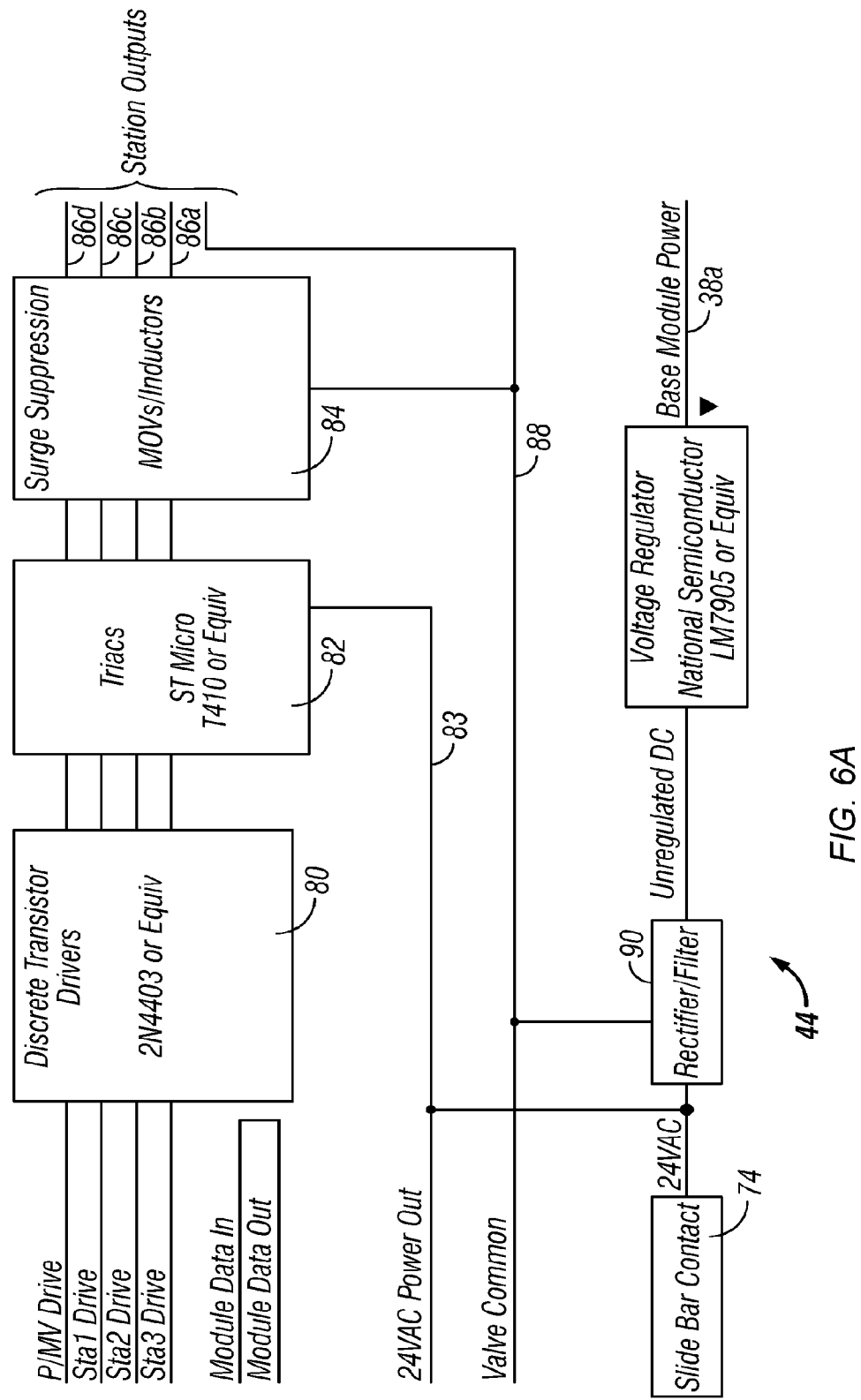
FIG. 6A is a block diagram illustrating further details of the electronic portion of the stand alone irrigation controller of FIG. 2A that resides in the base module, according to certain embodiments.

FIG. 6A is a block diagram illustrating details of an embodiment of the electronic circuit of the base module 44. The base module circuit includes transistor drivers 80 and triacs 82 for switching the 24VAC signal ON and OFF to different solenoid actuated valves. By way of example, the transistor drivers 80 may be industry standard 2N4403 transistors and the triacs may be STMicroelectronics™ T410 triacs. The 24VAC signal is supplied to the triacs 82 via contact 74 and line 83. The 24VAC signal from each of the triacs 82 is routed through an inductor/MOV network 84 for surge suppression to four field valve lines 86*a-d*, each of which can be connected to a corresponding solenoid actuated valve. The valves are each connected to a valve common return line 88. The 24VAC signal is also supplied to a rectifier/filter circuit 90. The unregulated DC signal from the rectifier/filter circuit 90 is supplied to a National Semiconductor LM7905 voltage regulator 92 which supplies five volt DC power to the face pack 30 via a conductor 38*c* (FIG. 4) in the ribbon cable.

Figure 6B:
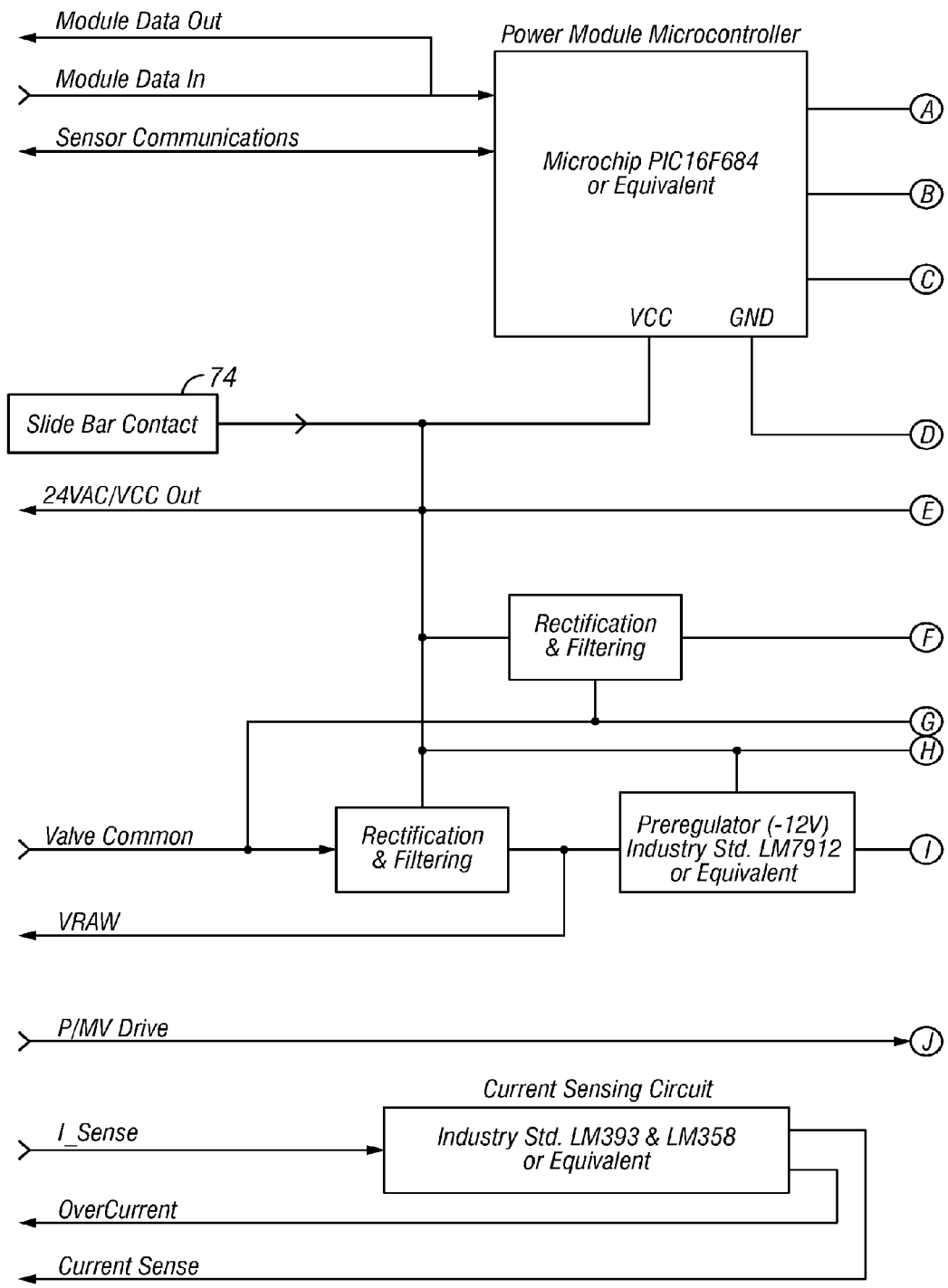
FIG. 6B is a block diagram illustrating further details of the electronic portion of the stand alone irrigation controller of FIG. 2B that resides in the base module, according to certain embodiments.
Figure 6B:
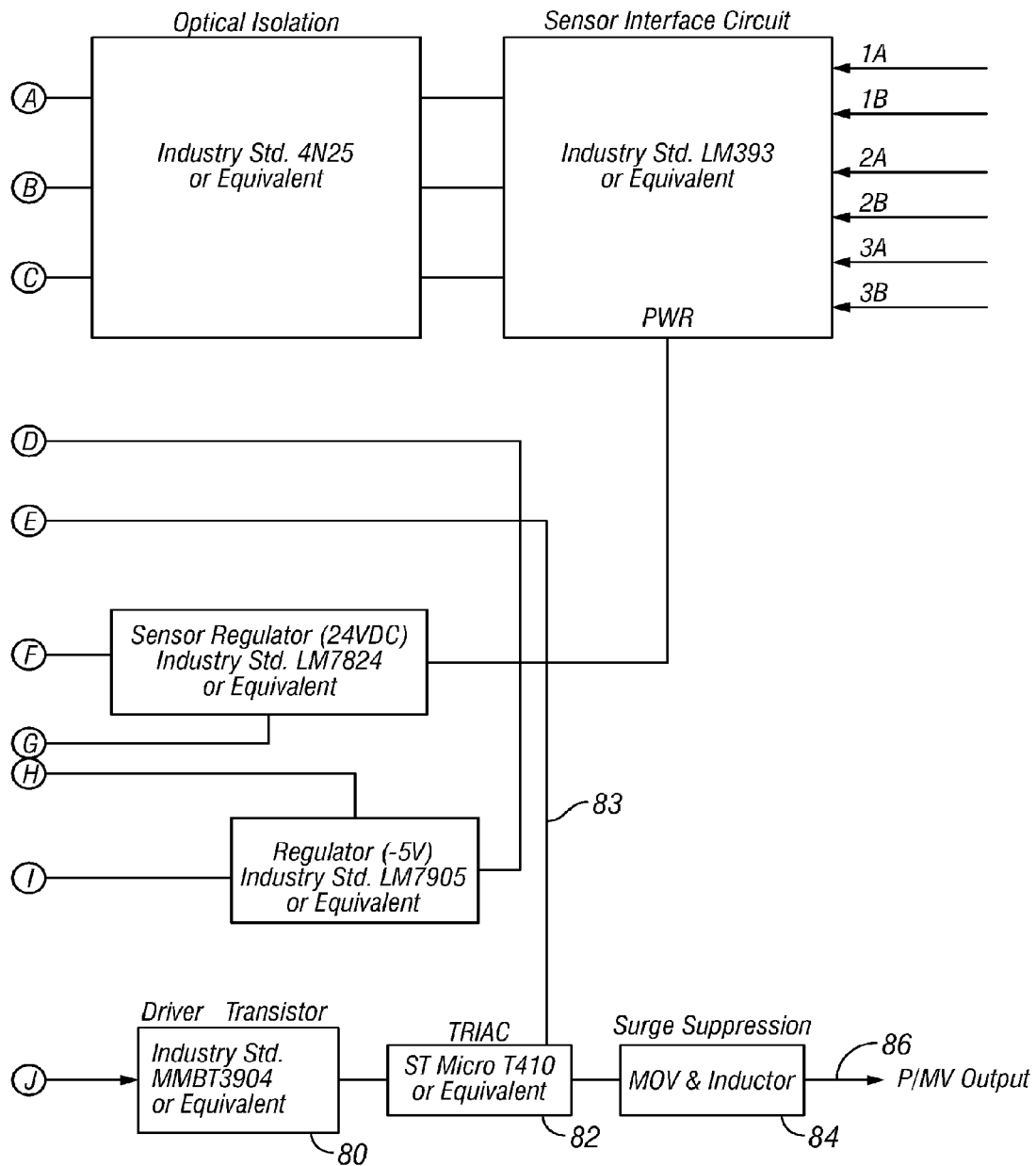

FIG. 6B is a block diagram illustrating the details of another embodiment of the power module 44. The power module circuit includes a transistor driver 80 and triac 82 for switching the 24VAC signal ON and OFF to the Pump/Mater Valve output of the controller. By way of example, the transistor driver 80 may be an industry standard MMBT3905 manufactured by ON Semiconductor and others. The triac may be an ST Micro™ T410. The 24VAC signal is supplied to the triac 82 via contact 74 and line 83. The 24VAC signal from the triac 82 is routed through an inductor/MOV network 84 including an Epcos Inc. SIOK35 MOV for surge protection to pump relay or master valve of the irrigation system via line 86.

The power module circuit also accepts the field sensor signals. These sensors may be normally open or normally closed contacts, pulse (flow), or other proprietary signals such as those used in the Hunter ET System. The sensor signals are first applied to the Sensor interface circuit which contains an industry standard LM393 comparator. The sensor interface circuit feeds a bank of optoisolators, typically comprised of industry standard 4N25 devices. The optoisolators feed the Power Module microcontroller which is a Microchip™ PIC 16F684. This device interprets the (now) conditioned and isolated sensor signals, and communicates their status to the front panel via the sensor communication line. The sensor communication line can also send information from the front panel to the power module such as what type of sensor is connected. This information is useful in helping the power module determine how to power the sensor and interpret its signals. It may also be advantageous to allow the microcontroller in the power module to be aware of the status of the station outputs in the controller. For instance, if the power module is sensing flow, but no stations are on, it can alert the front panel of this fact. The module data is therefore also brought into a pin on the power module microcontroller.

Yet another function of the power module is to sense the current being drawn by the solenoid valves in the field. This is accomplished via the current sensing circuit. A "raw" current signal is brought into the power module on the I_Sense line from the backplane. The current sensing circuit serves two functions. It uses an industry standard LM393 comparator to monitor the instantaneous current and compare it to a pre-set limit. If the instantaneous current exceeds this limit, the "over current" signal goes active and alerts the front panel of the problem so that the outputs may immediately be shut down. The current sense circuit also provides a "current sense" signal to the front panel. This signal represents a filtered, scaled version of the I-Sense signal. It is generated using an industry standard LM358 op amp to amplify, peak detect, and filter the I_Sense signal. The front panel can use the "current sense" signal to display the actual current being drawn by the solenoid actuated valves. It can also use this information to determine if there is enough power capacity left in the controller to turn another solenoid ON.

The power module has several power supplies in it. All the supplies are fed with an unregulated 24VAC signal from the slide bar contact. This signal is first rectified and filtered, then sent to various regulators, and also back out to the backplane on the VRA W line. A pre-regulator comprised of an industry standard LM7912 generates a −12V signal. This signal is fed into an industry standard LM7905 regulator which supplied a minus five volt output. This minus five volt output is used as the logic ground for the entire controller. The power module also contains a separate rectifier and filter for a plus 24VDC voltage regulator comprised of an industry standard LM7824. This 24VDC signal is used to power the sensors.

Figure 7A:
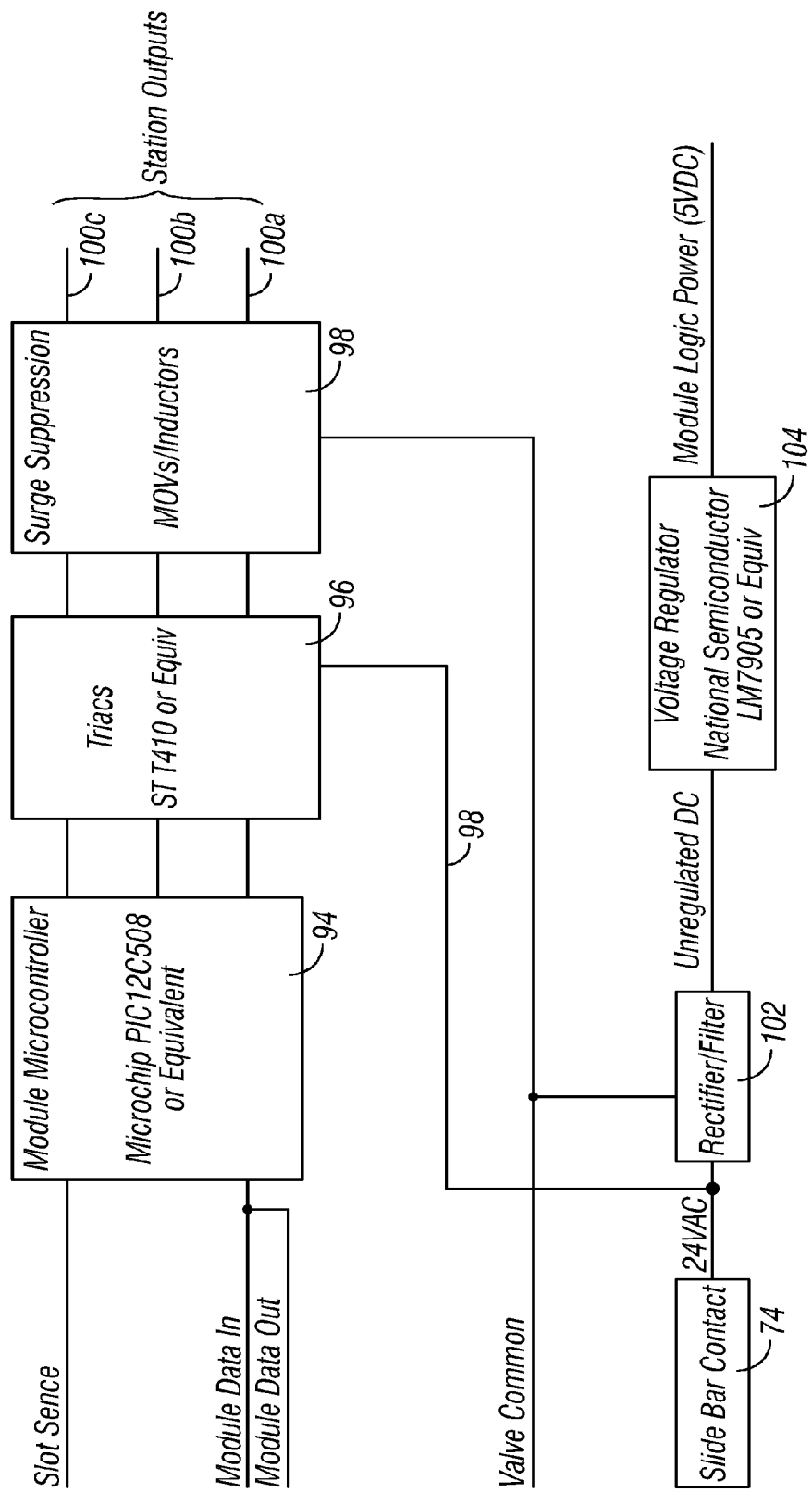
FIGS. 7A and B are a block diagrams illustrating further details of embodiments of the electronic portion of the stand alone irrigation controller that resides in each of the station modules, according to certain embodiments.
Figure 7B:
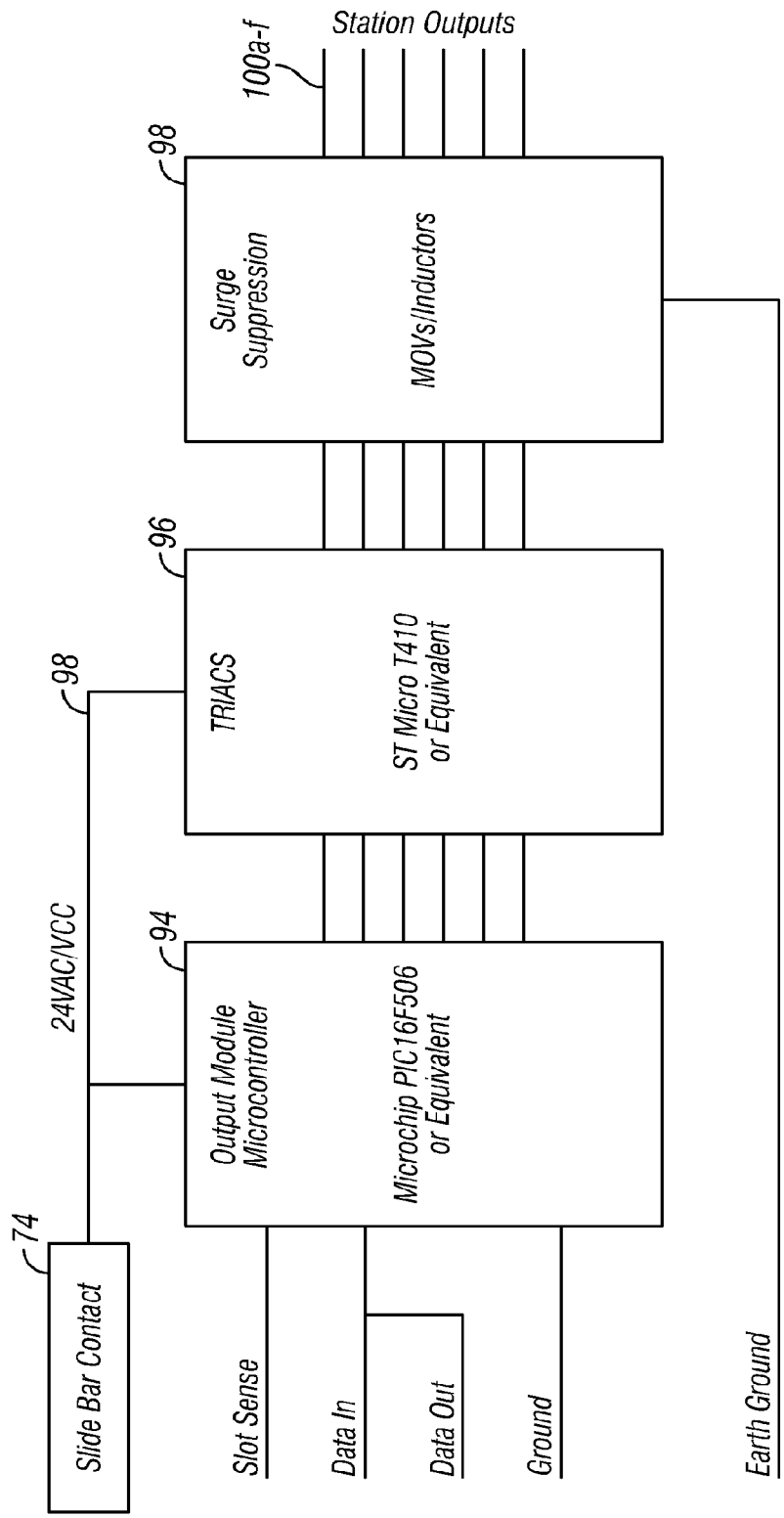

FIGS. 7A and 7B are a block diagrams illustrating details of embodiments of the electronic circuit in each of the station modules. The station module circuit includes a microcontroller such as the Microchip™ PIC12C508 processor 94. Referring to FIG. 7A, the station module circuit further includes triacs 96 for switching the 24VAC signal ON and OFF to three different solenoid actuated valves. The 24VAC signal is supplied to the triacs 96 via contact 74 and line 98. The 24VAC signal from each of the triacs 94 is routed through an inductor/metal oxide varistors (MOV) network 98 including Epcos Inc. S10K35 MOV's for surge suppression to three field valve lines 100*a-c*, each of which can be connected to a corresponding solenoid actuated valve. The valves are each connected to the valve common return line 88. The 24VAC signal is also supplied to a rectifier/filter circuit 90. The unregulated DC signal from the rectifier/filter circuit 102 is supplied to a National Semiconductor LM7905 voltage regulator 104 which supplies five volt DC power to the microcontroller through a conductor (not illustrated).

Referring to FIG. 7B, the station module circuit further includes triacs 96 for switching the 24VAC signal ON and OFF to six different solenoid actuated valves. The 24VAC signal is supplied to triac 96 via contact 74 and line 98. The 24VAC signal from each triac 94 is routed through an inductor/MOV network 98 including Epcos Inc. SIOK35 MOV's for surge protection to six field valve lines 100*a-f*, each of which can be connected to a corresponding solenoid actuated valve.

Figure 8A:
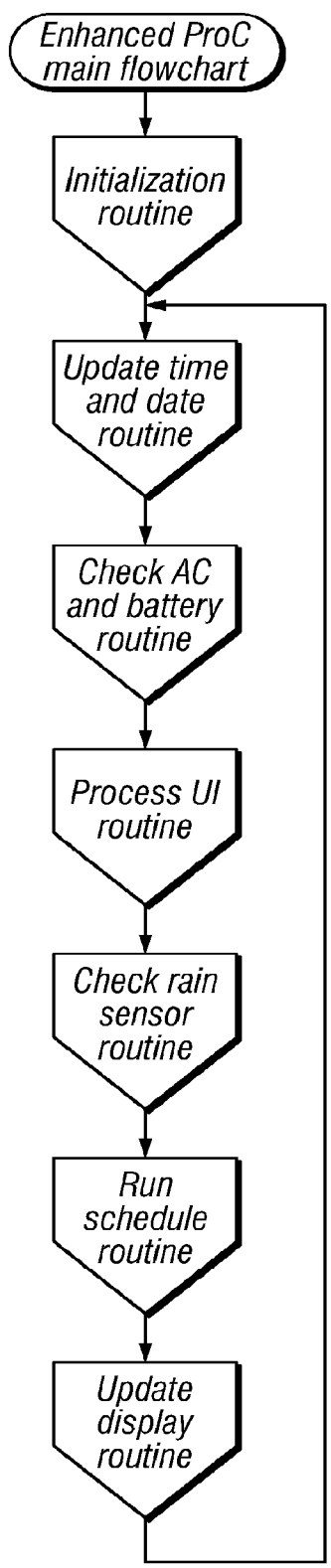
FIGS. 8AA-8AW are flow diagrams illustrating the operation of the stand alone irrigation controller, according to an embodiment.
Figure 8A:
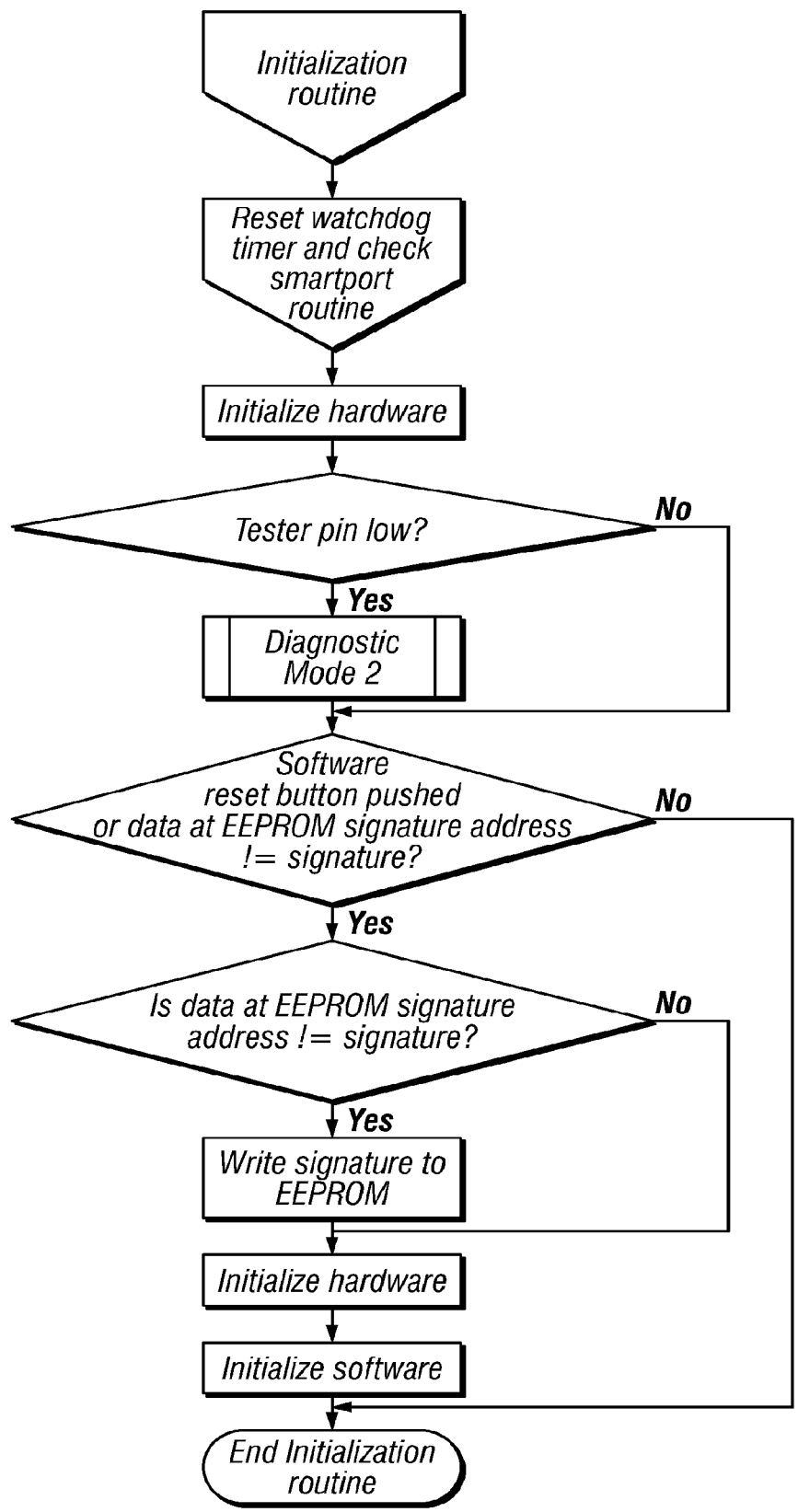
Figure 8A:
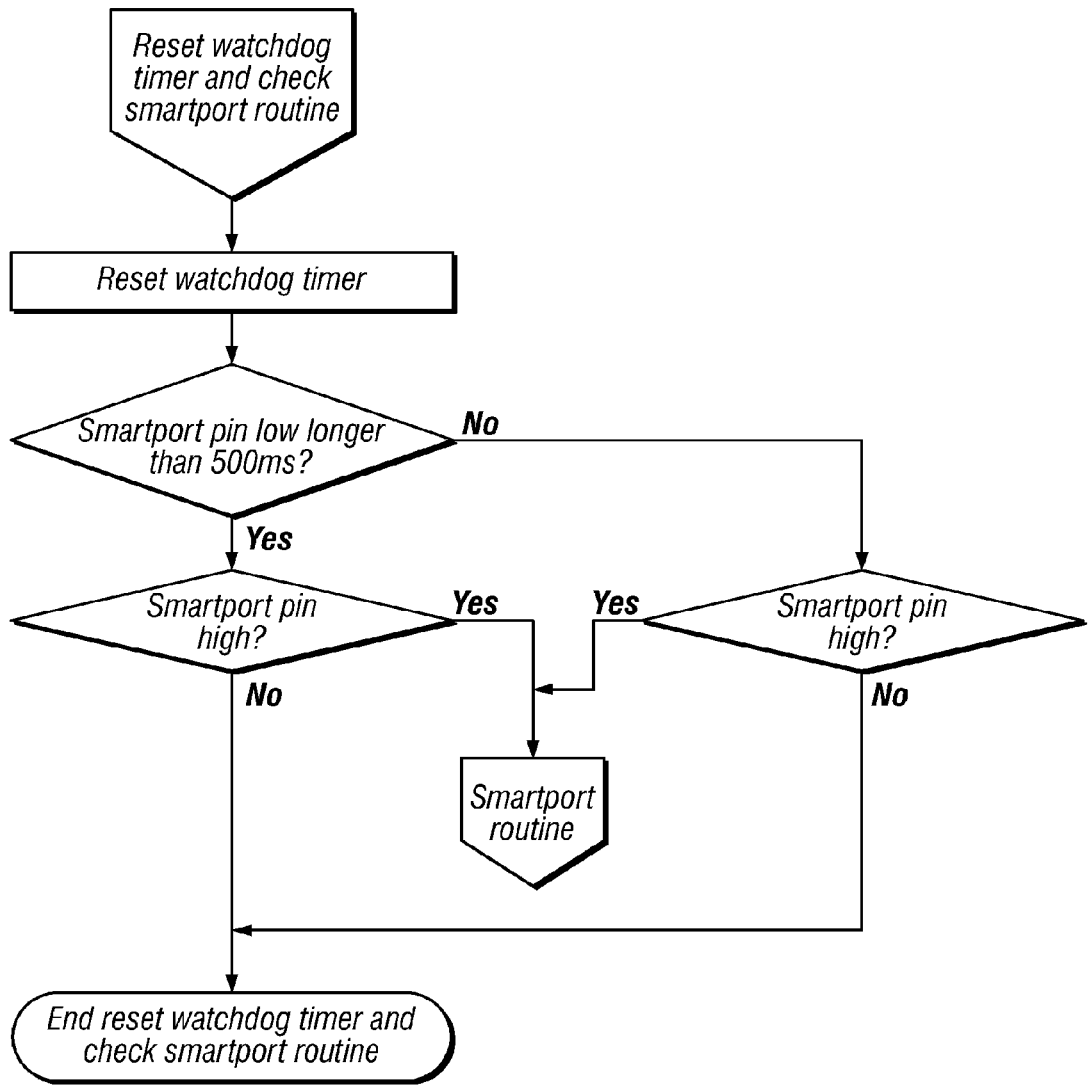
Figure 8A:
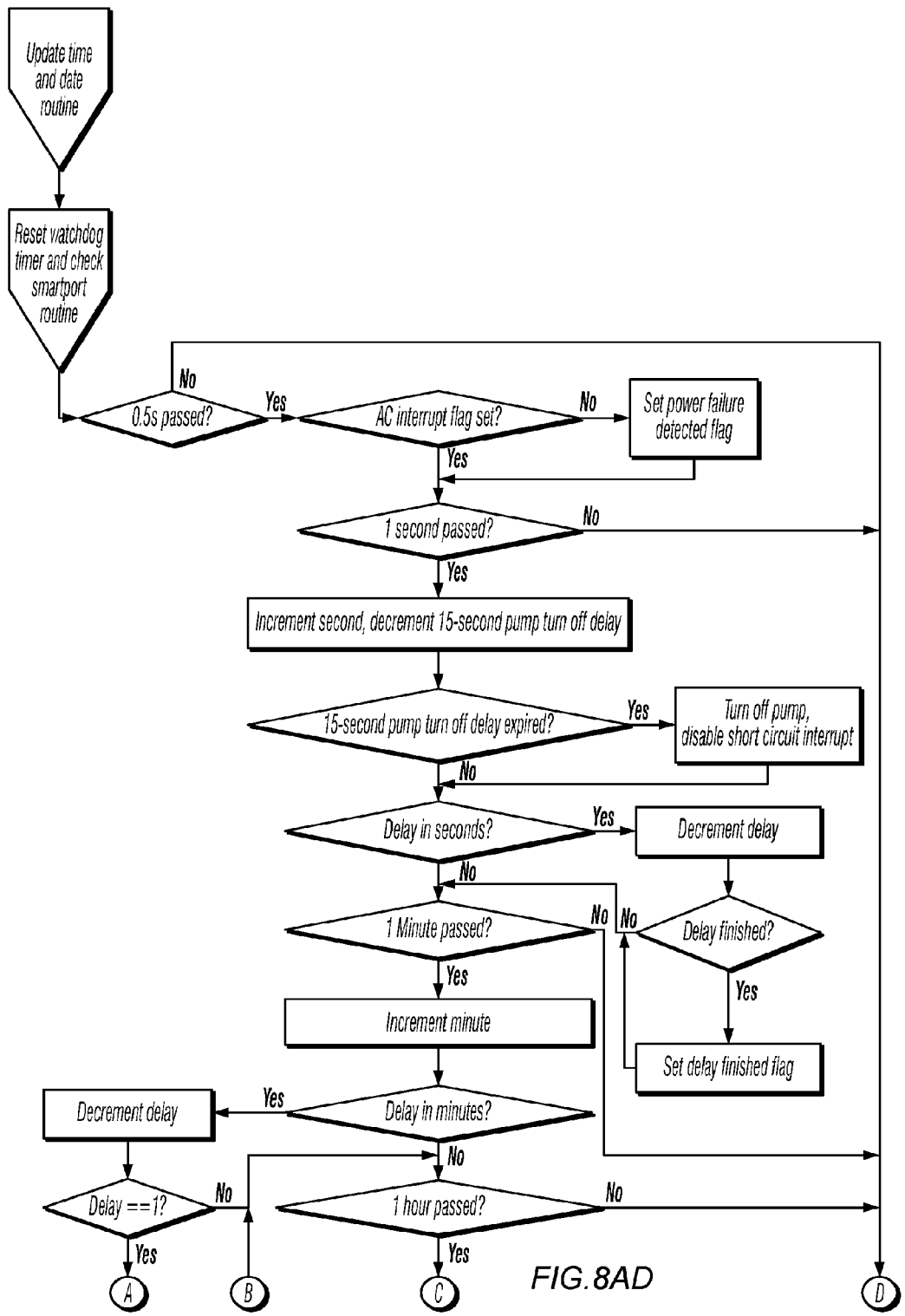
Figure 8A:
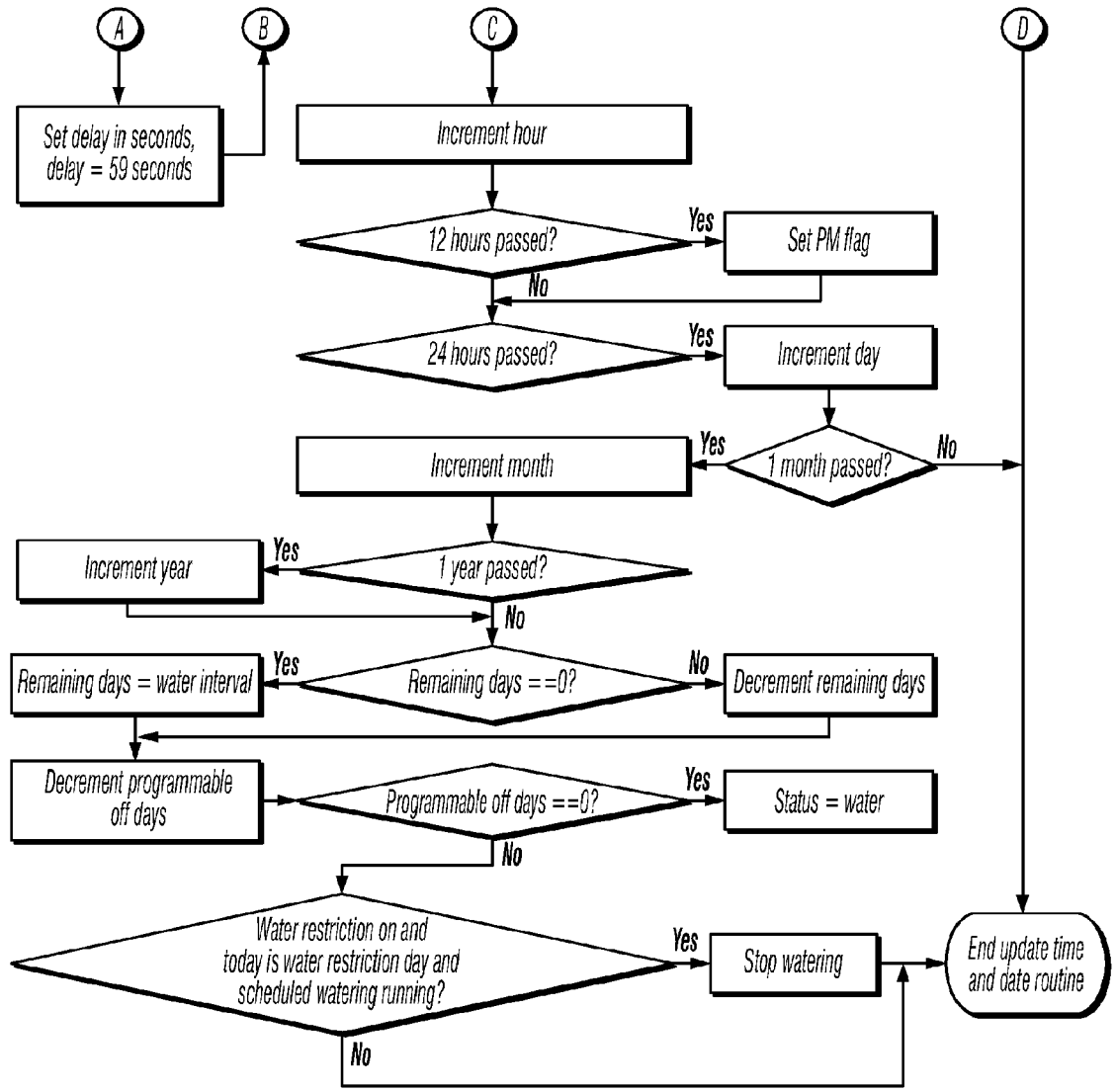
Figure 8A:
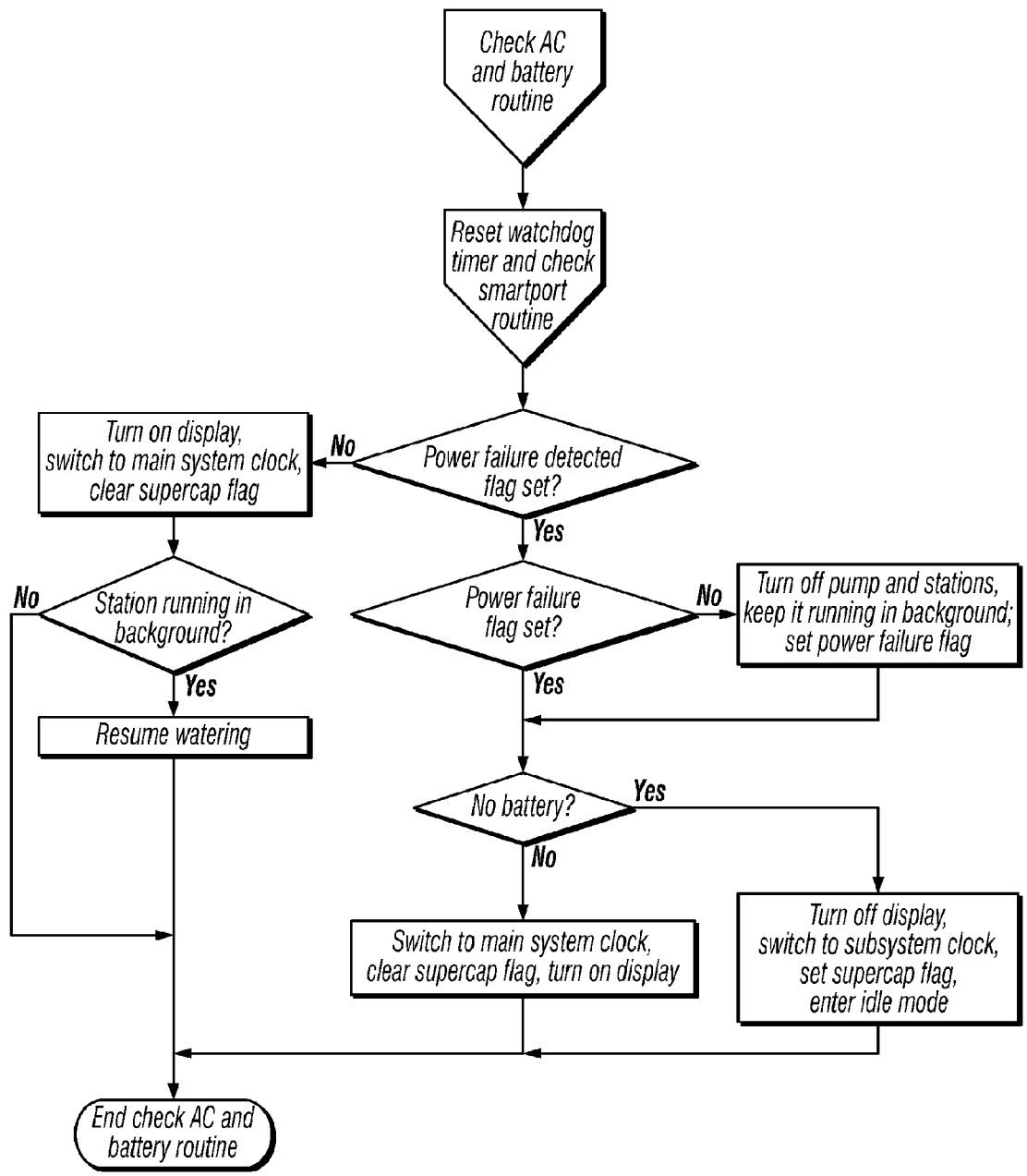
Figure 8A:
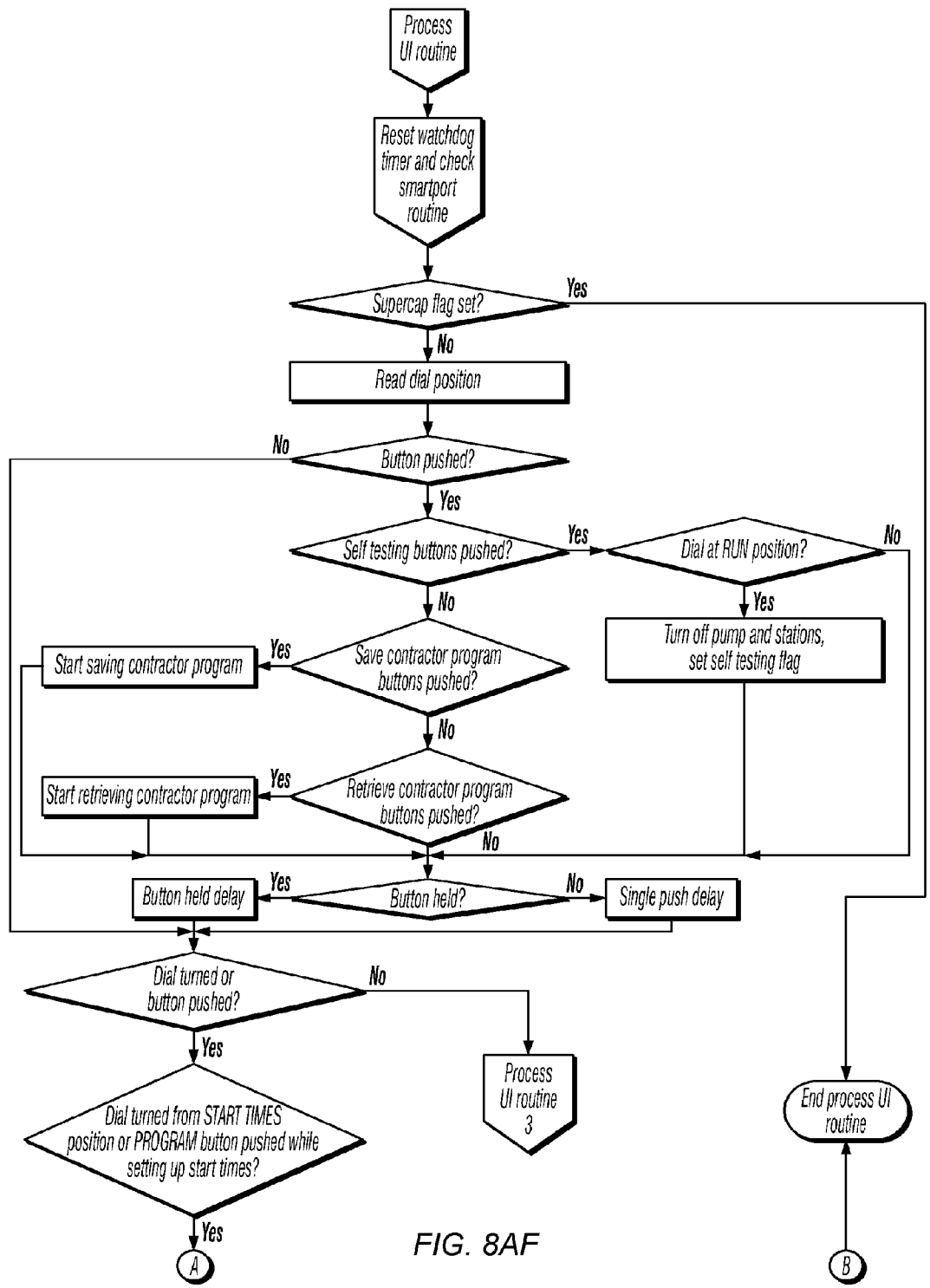
Figure 8A:
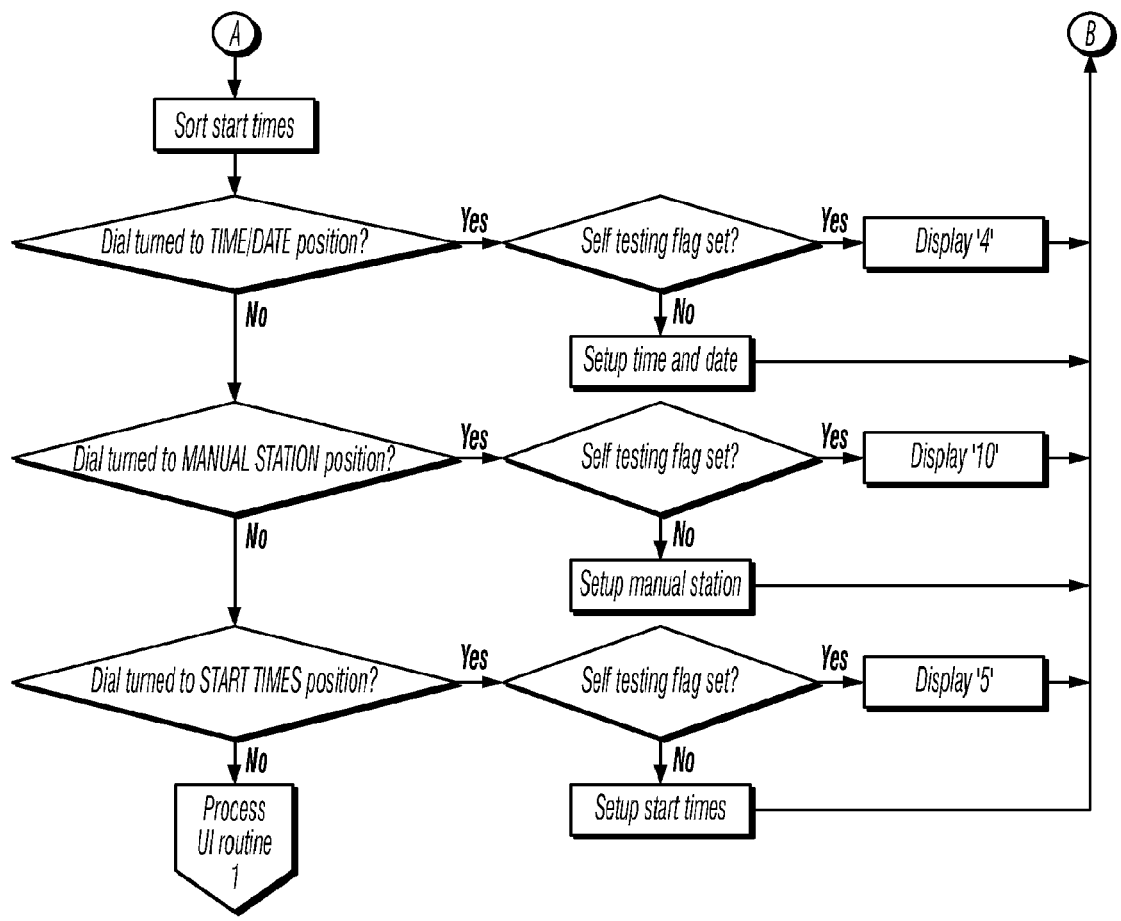
Figure 8A:
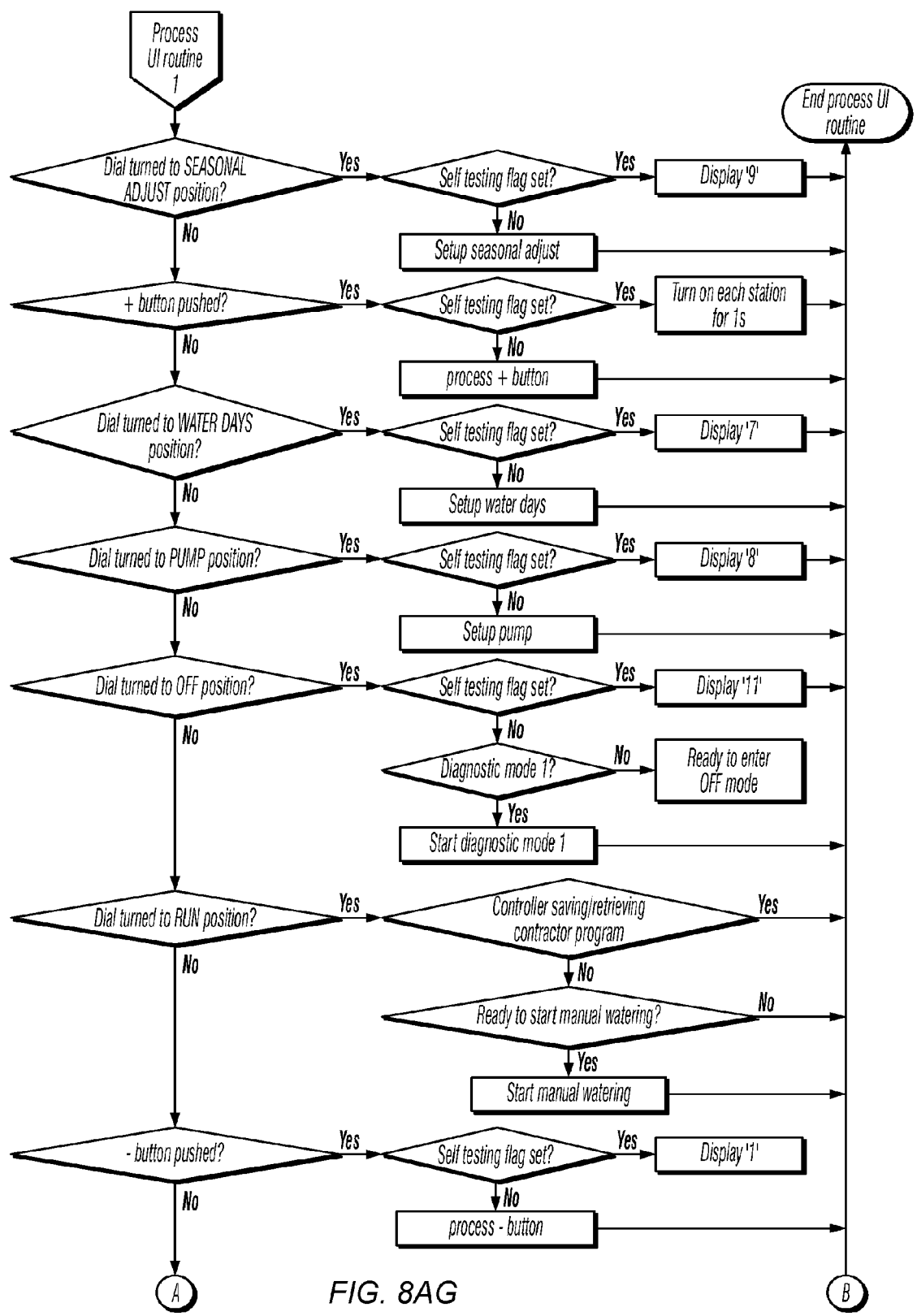
Figure 8A:
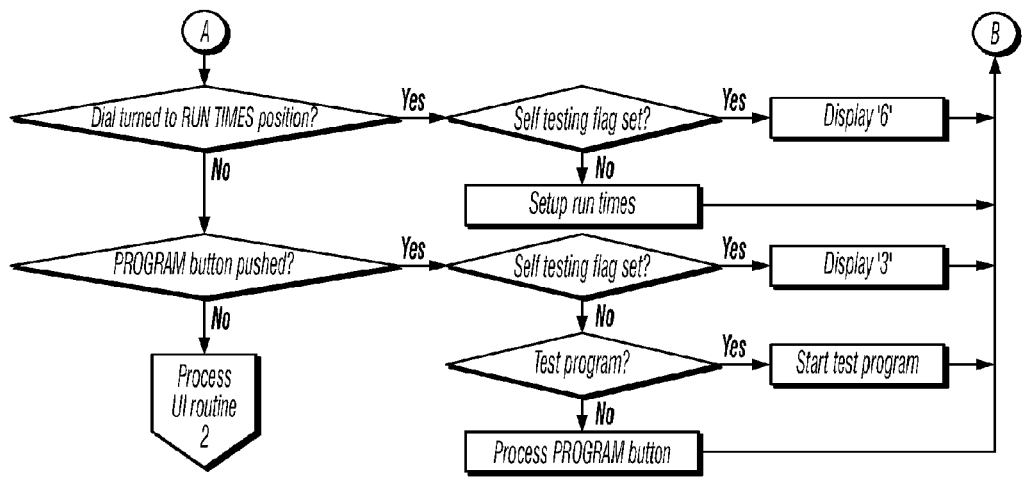
Figure 8A:
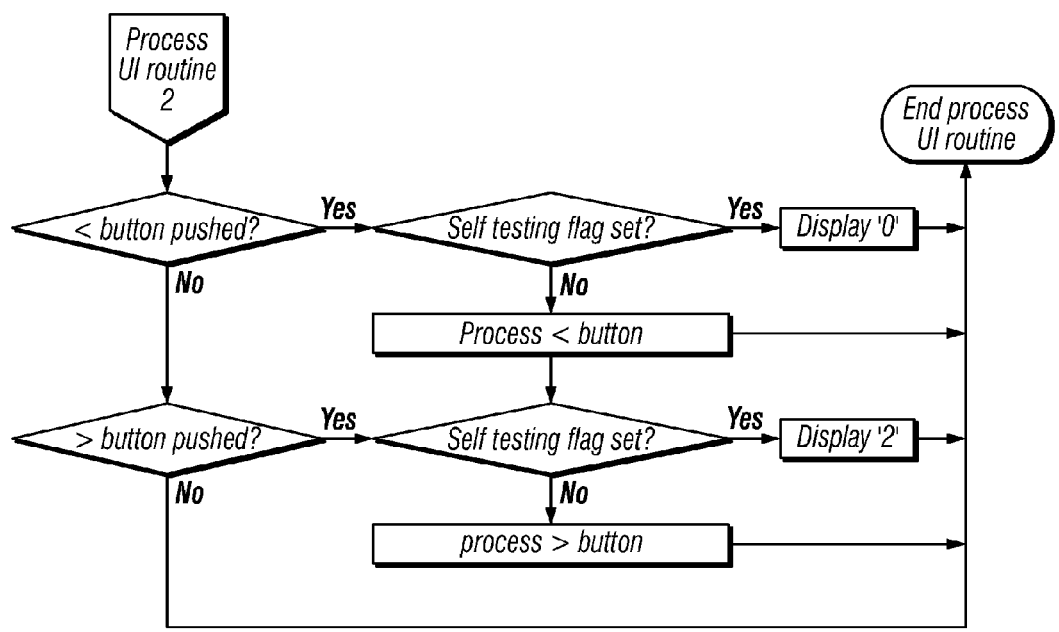
Figure 8A:
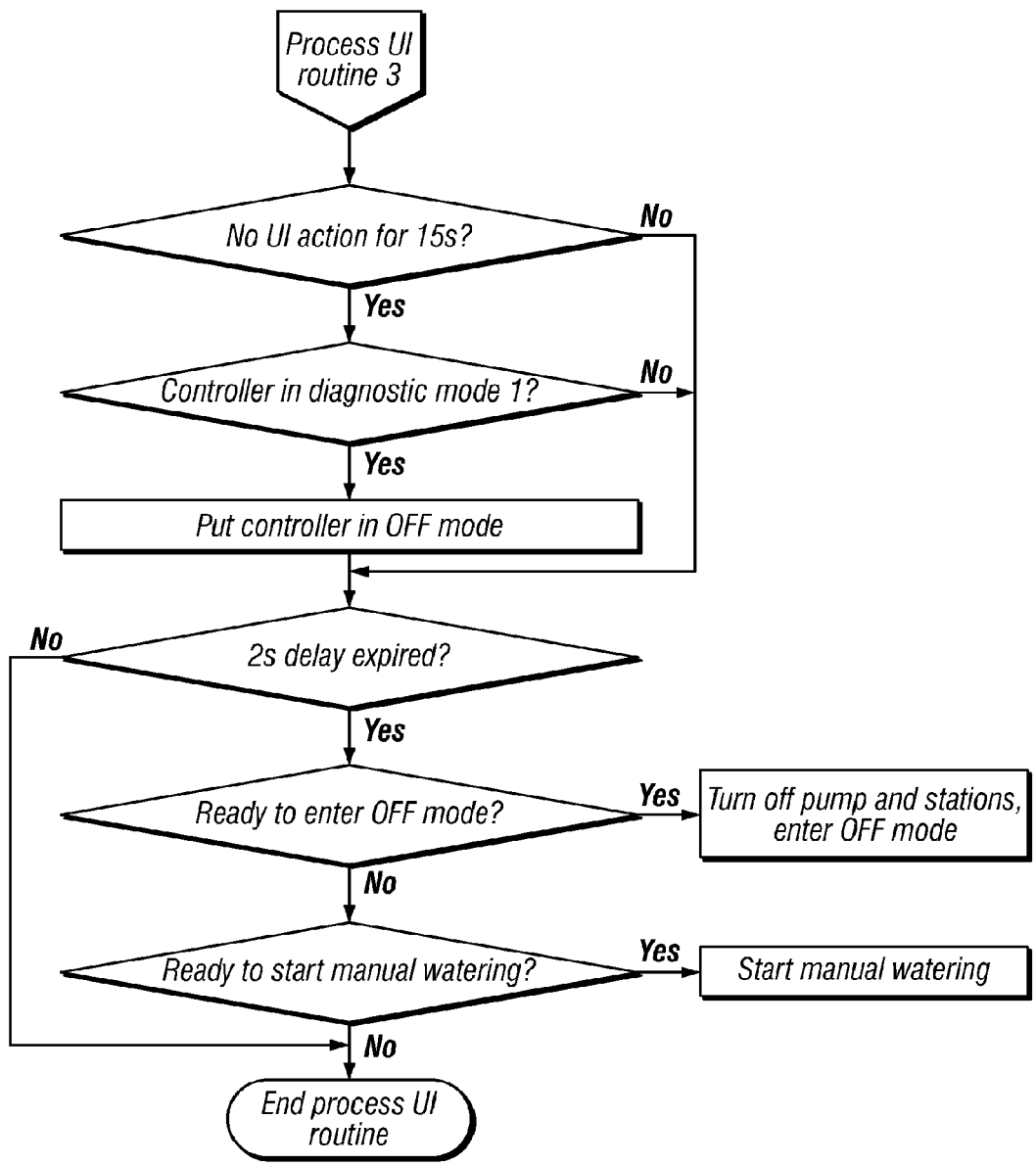
Figure 8A:
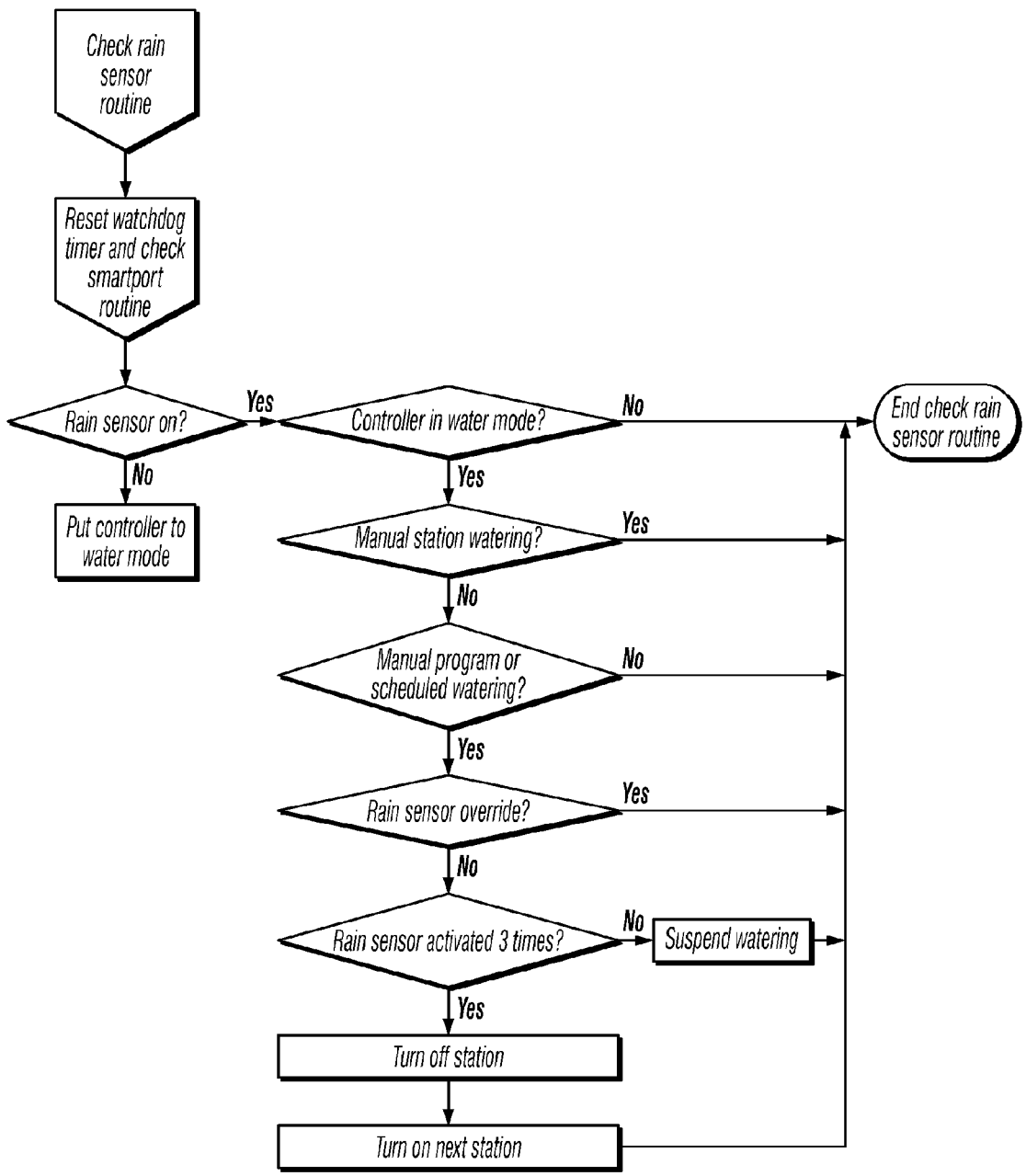
Figure 8A:
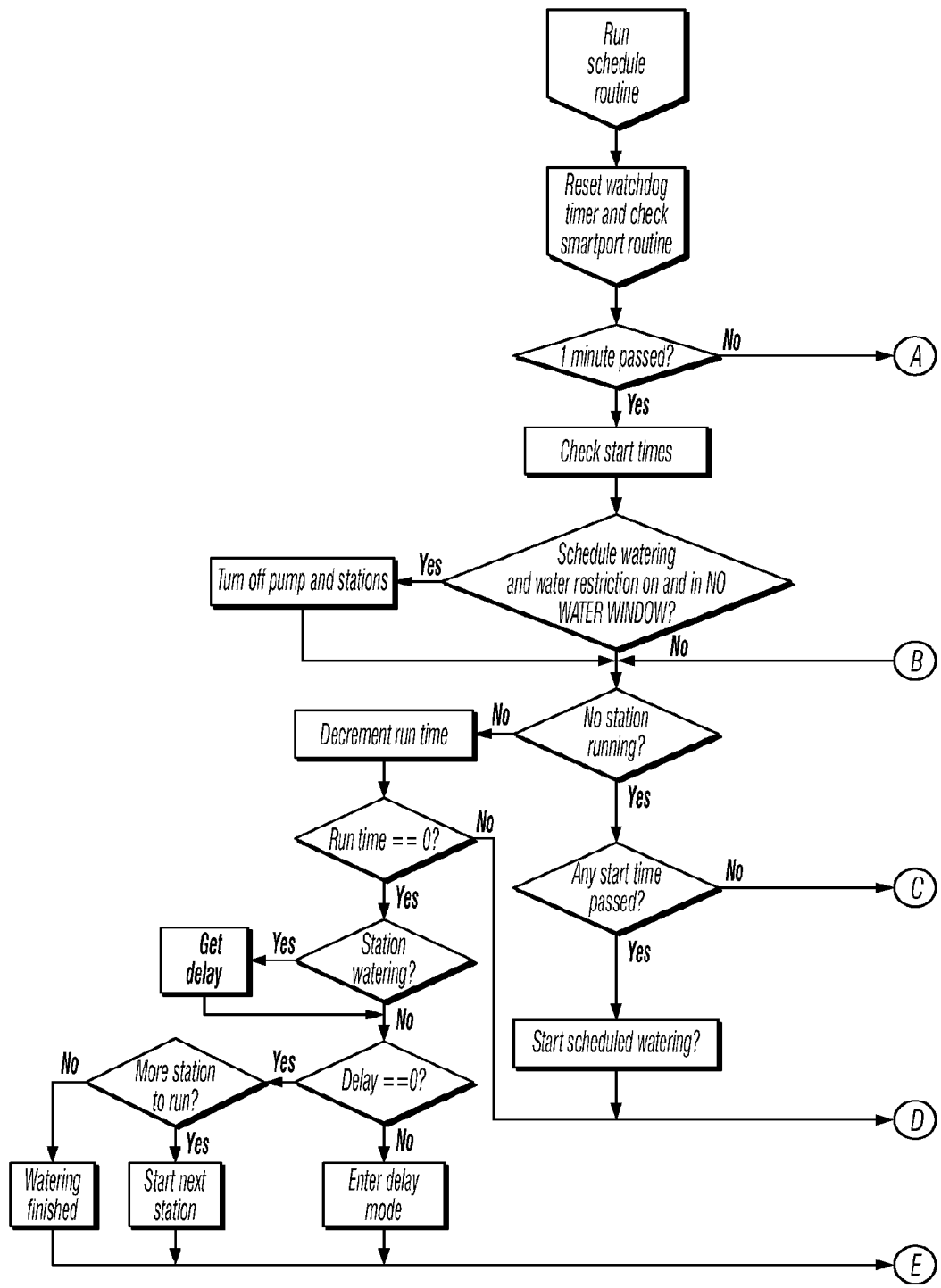
Figure 8A:
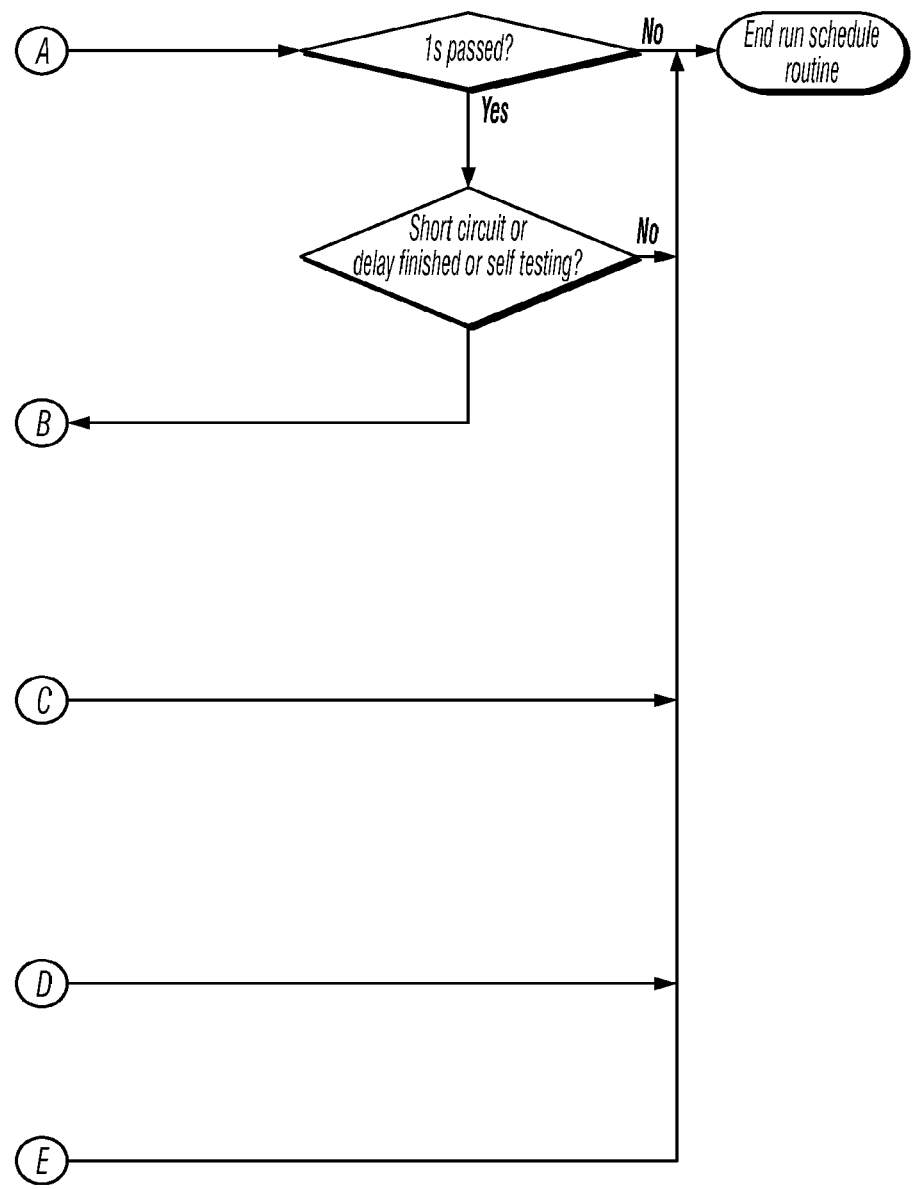
Figure 8A:
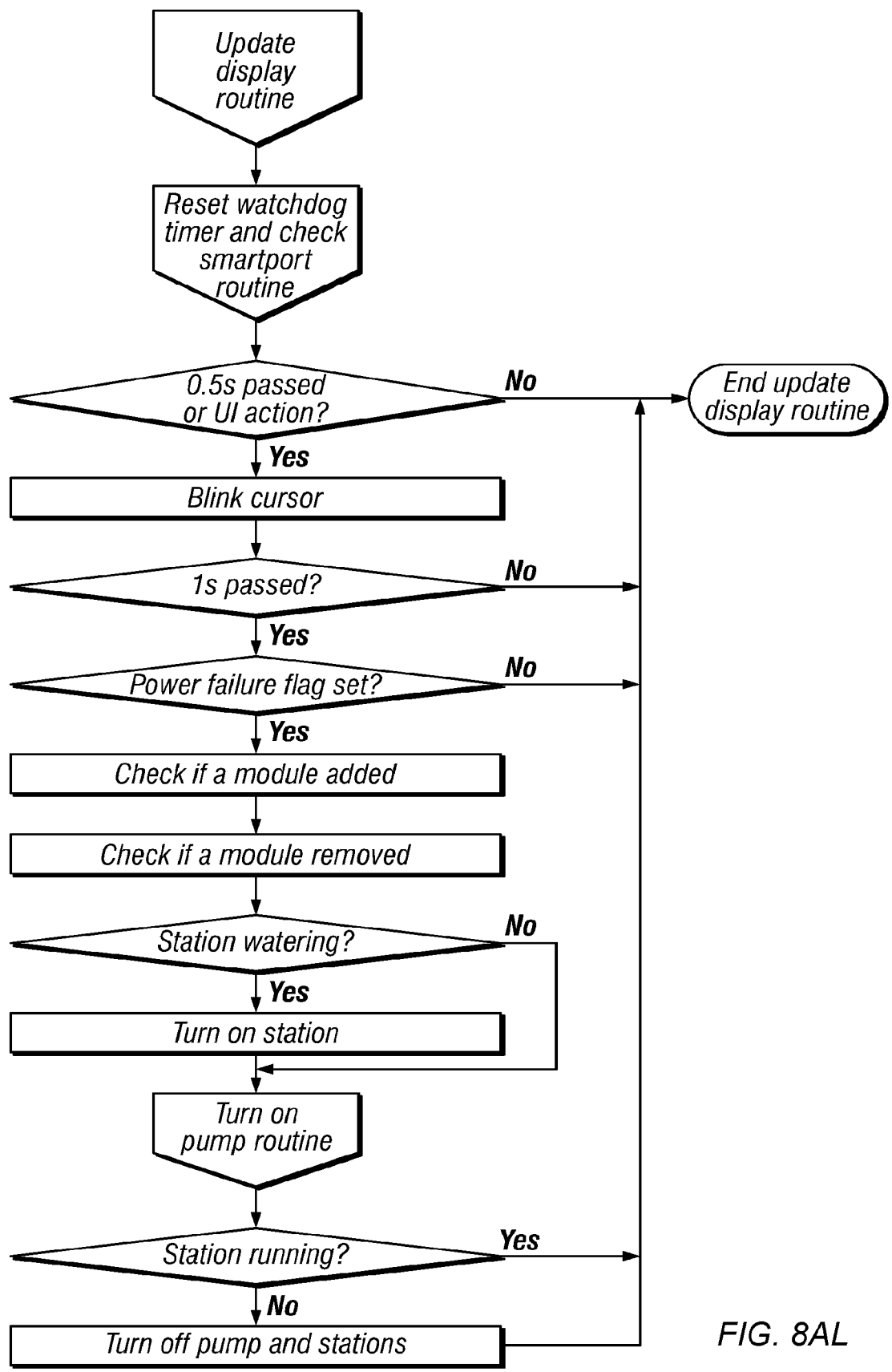
Figure 8A:
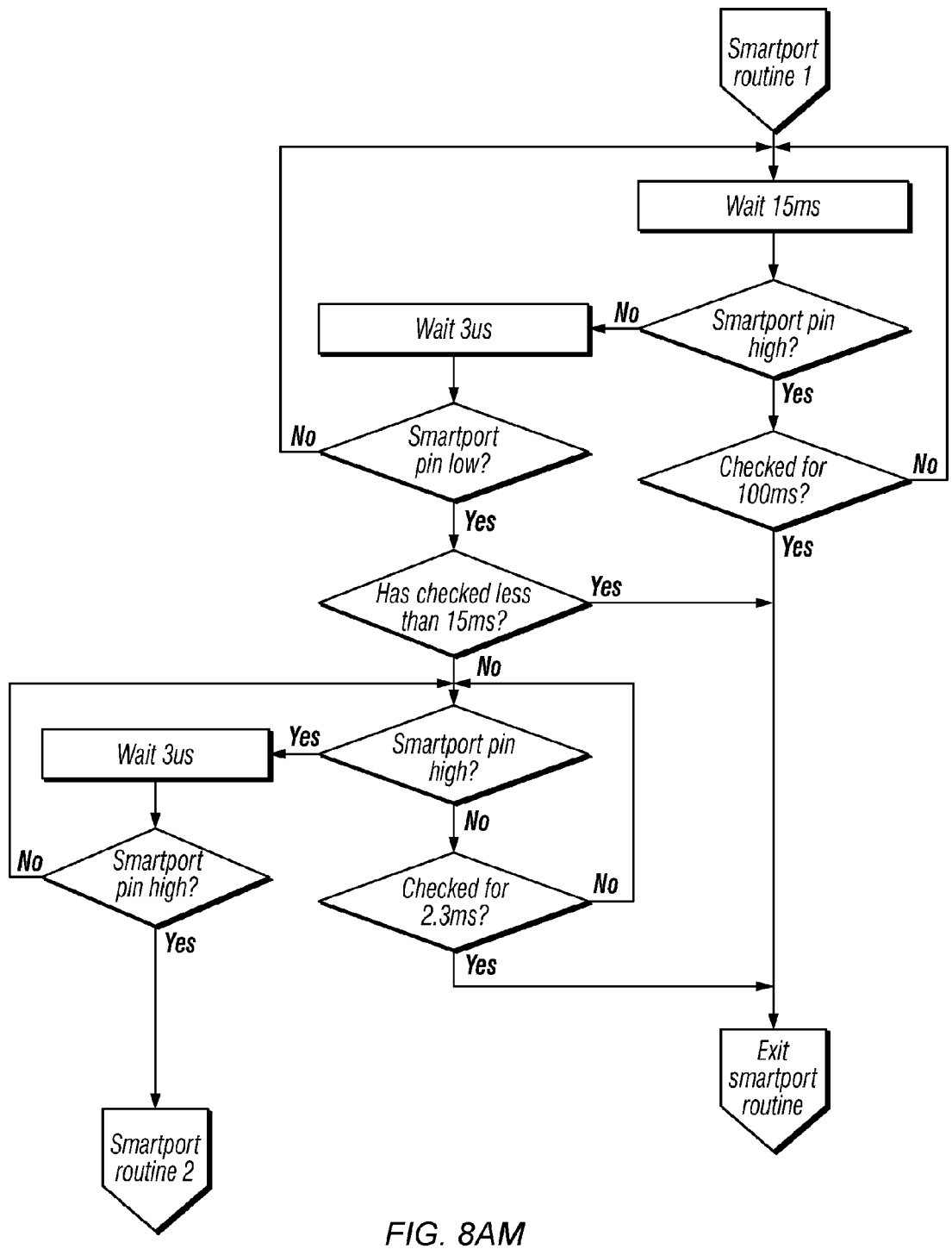
Figure 8A:
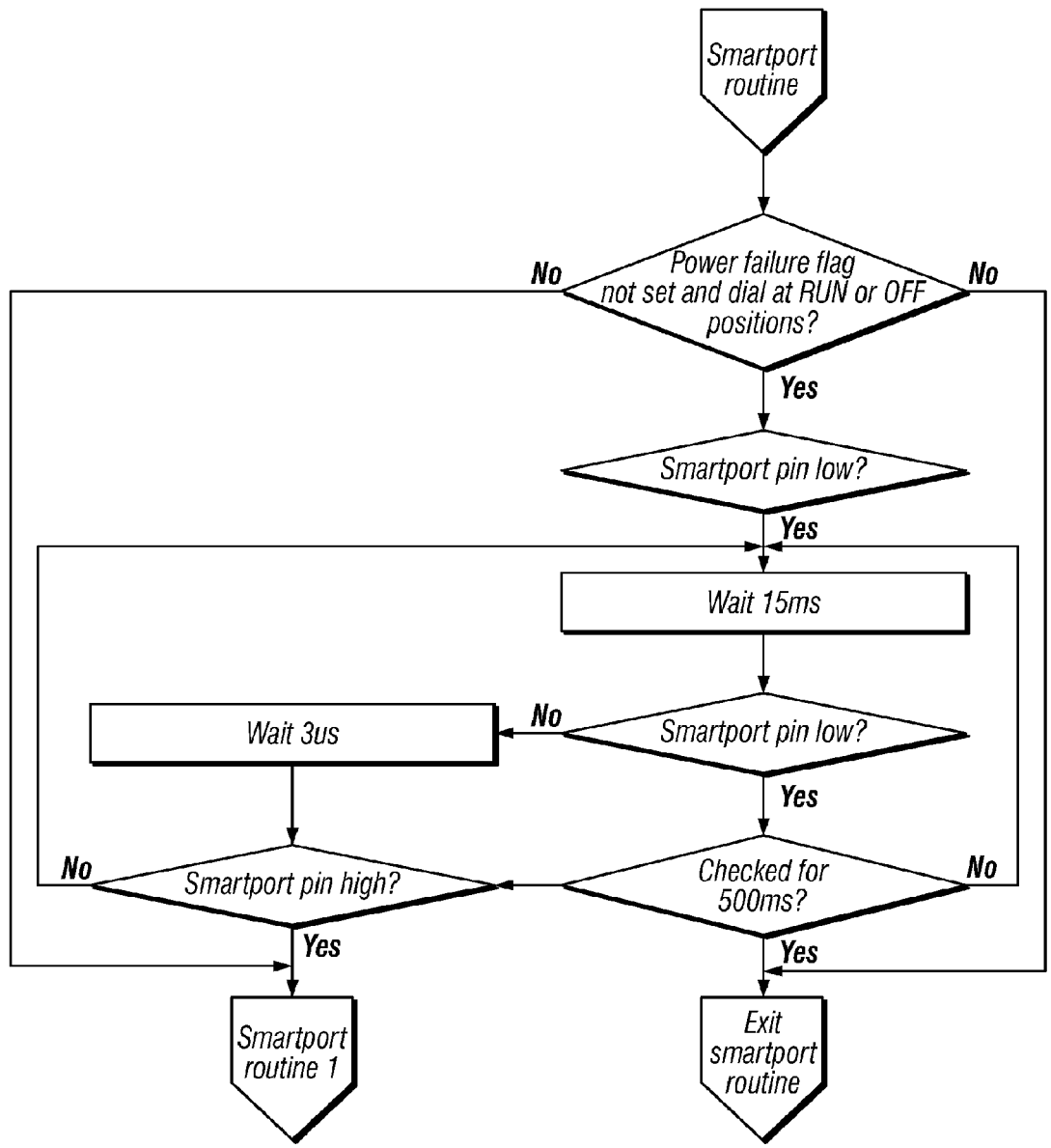
Figure 8A:
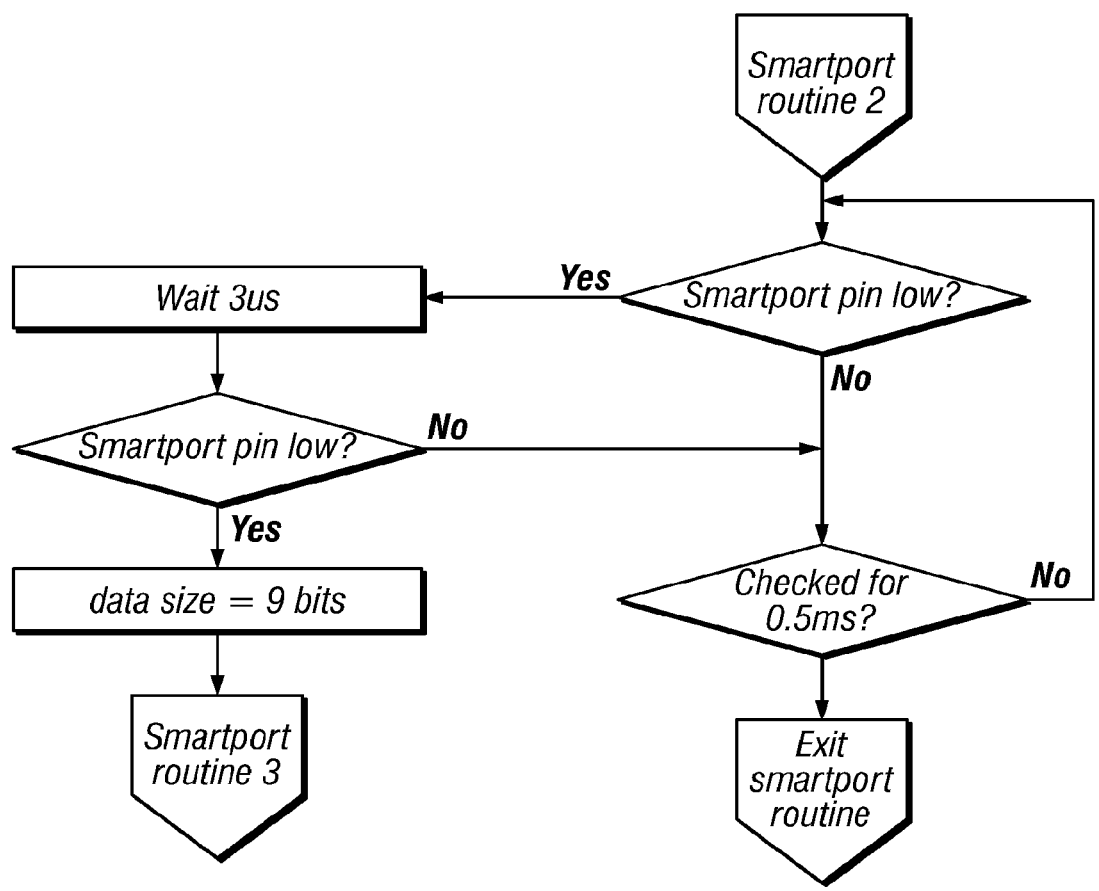
Figure 8A:
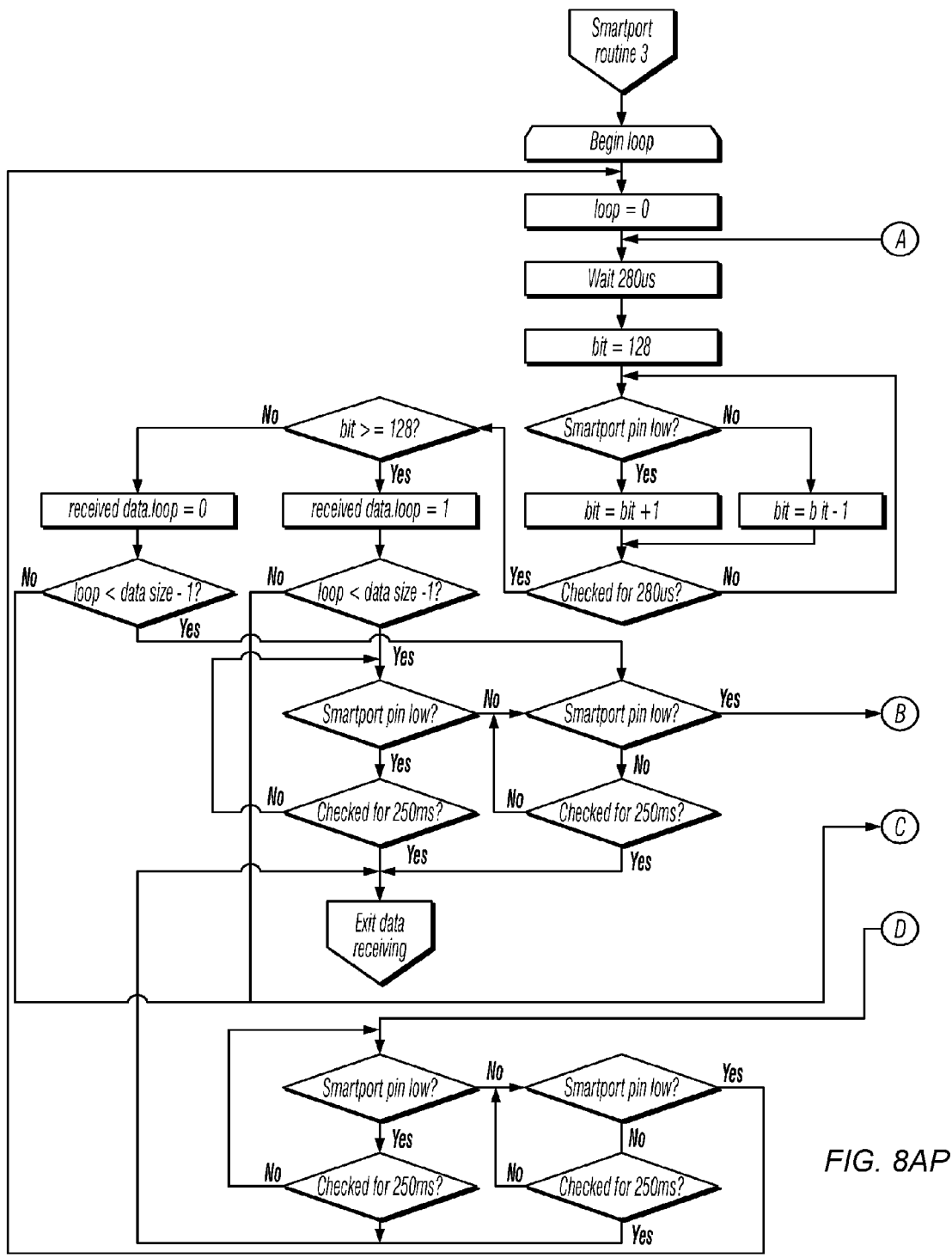
Figure 8A:
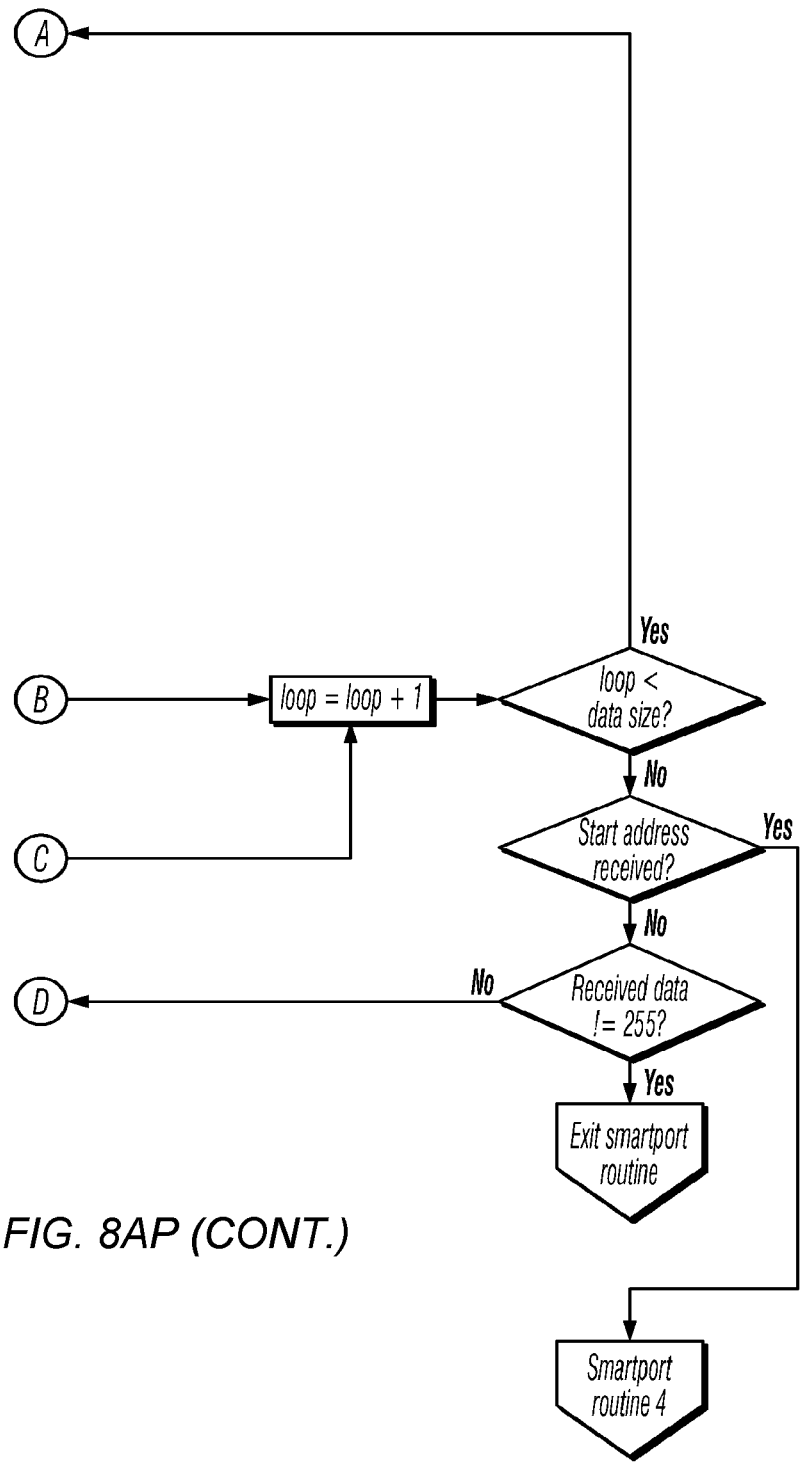
Figure 8A:
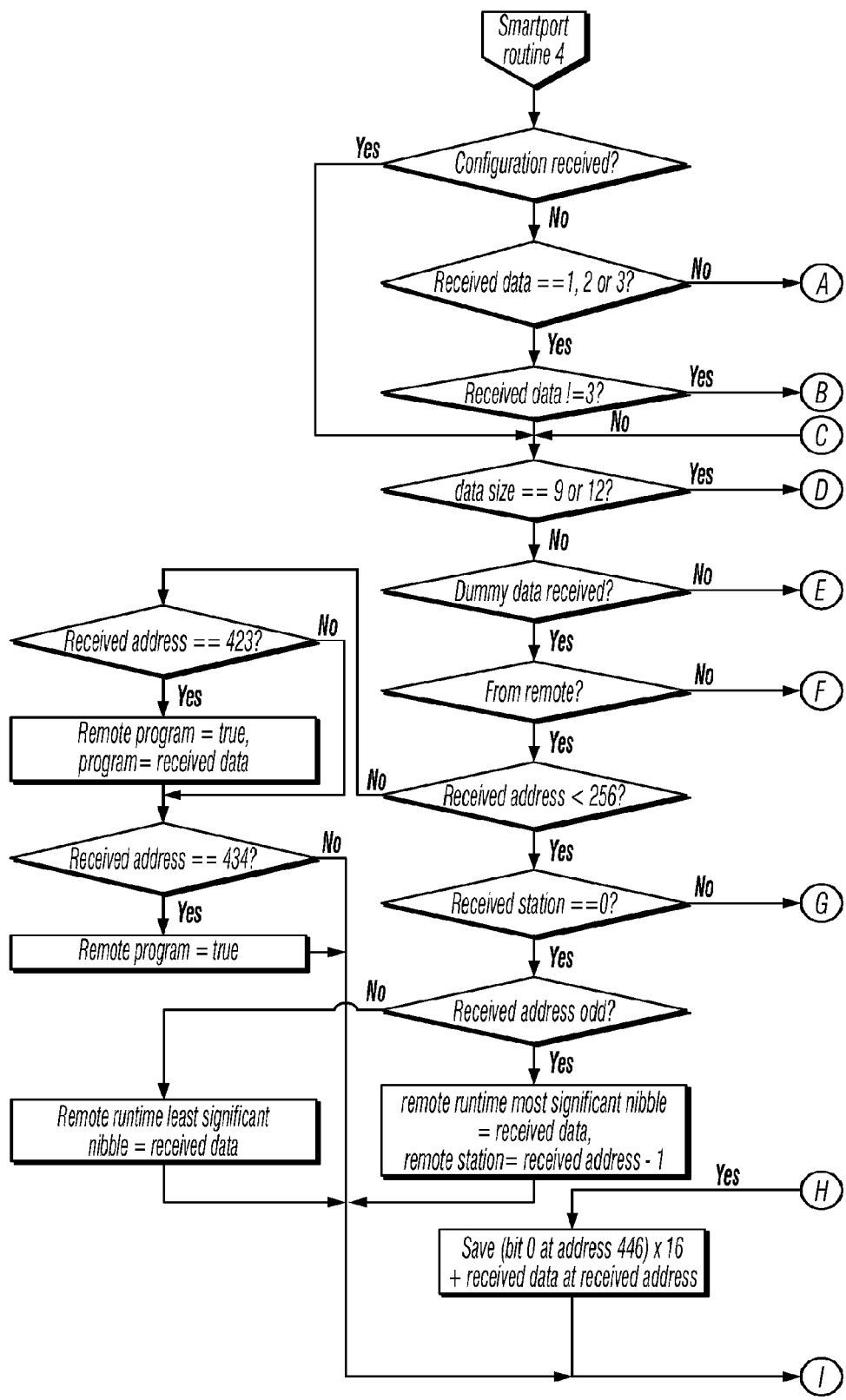
Figure 8A:
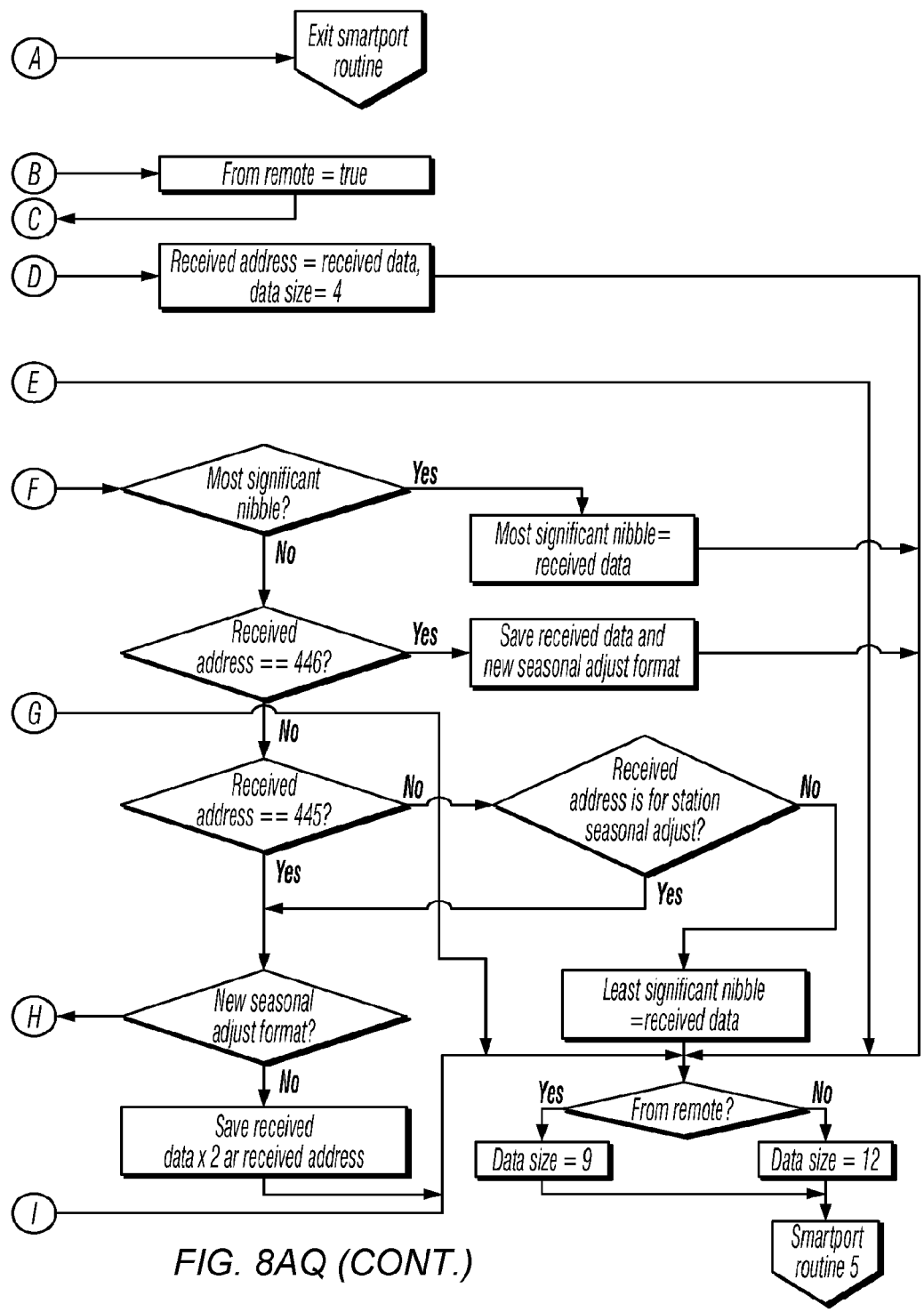
Figure 8A:
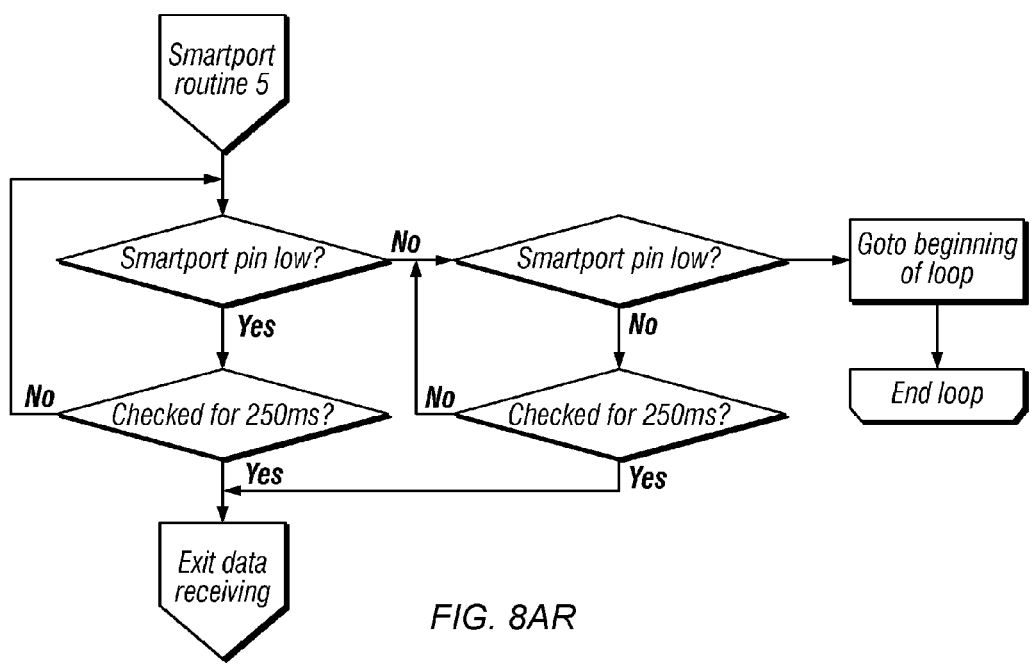
Figure 8A:
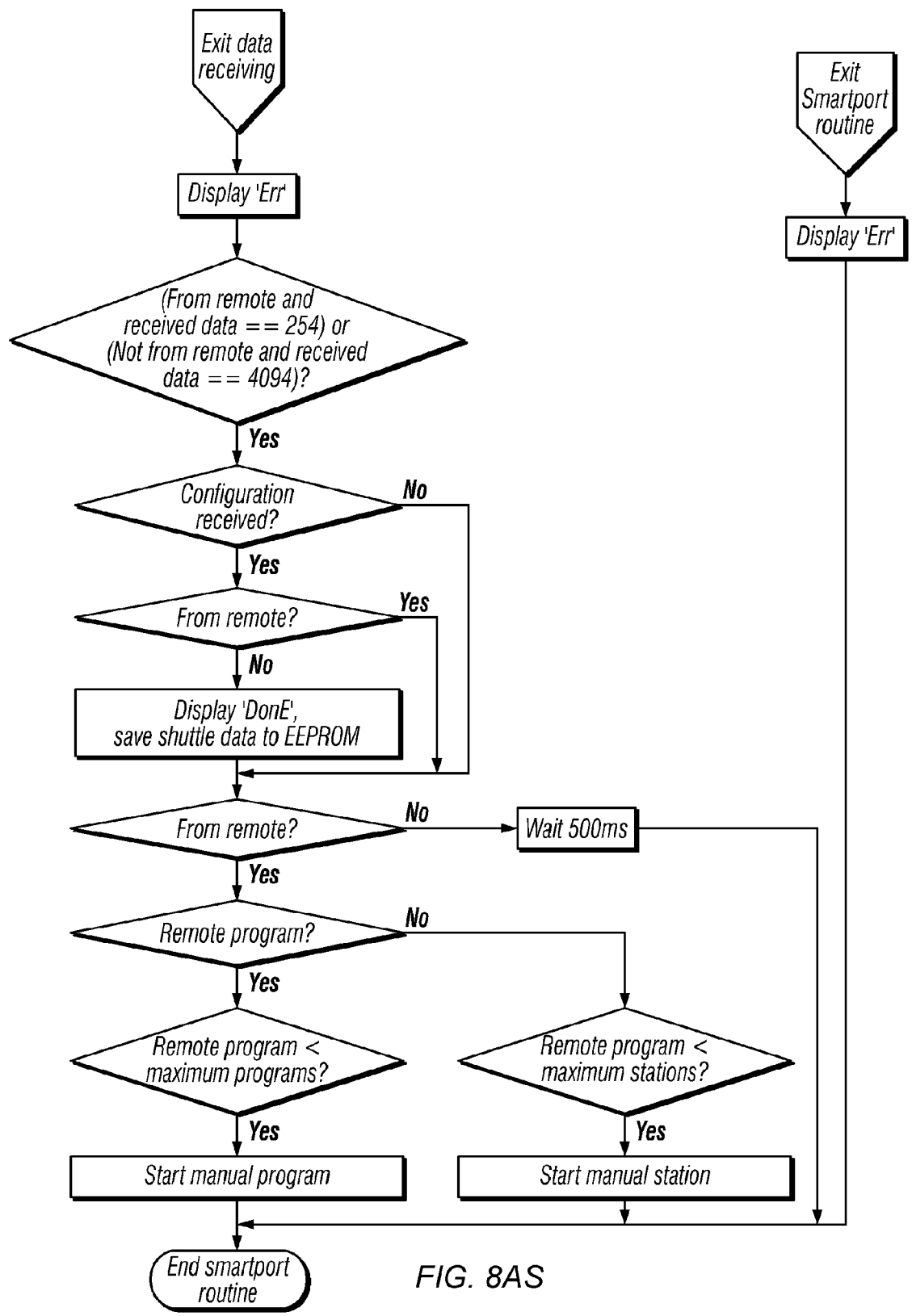
Figure 8A:
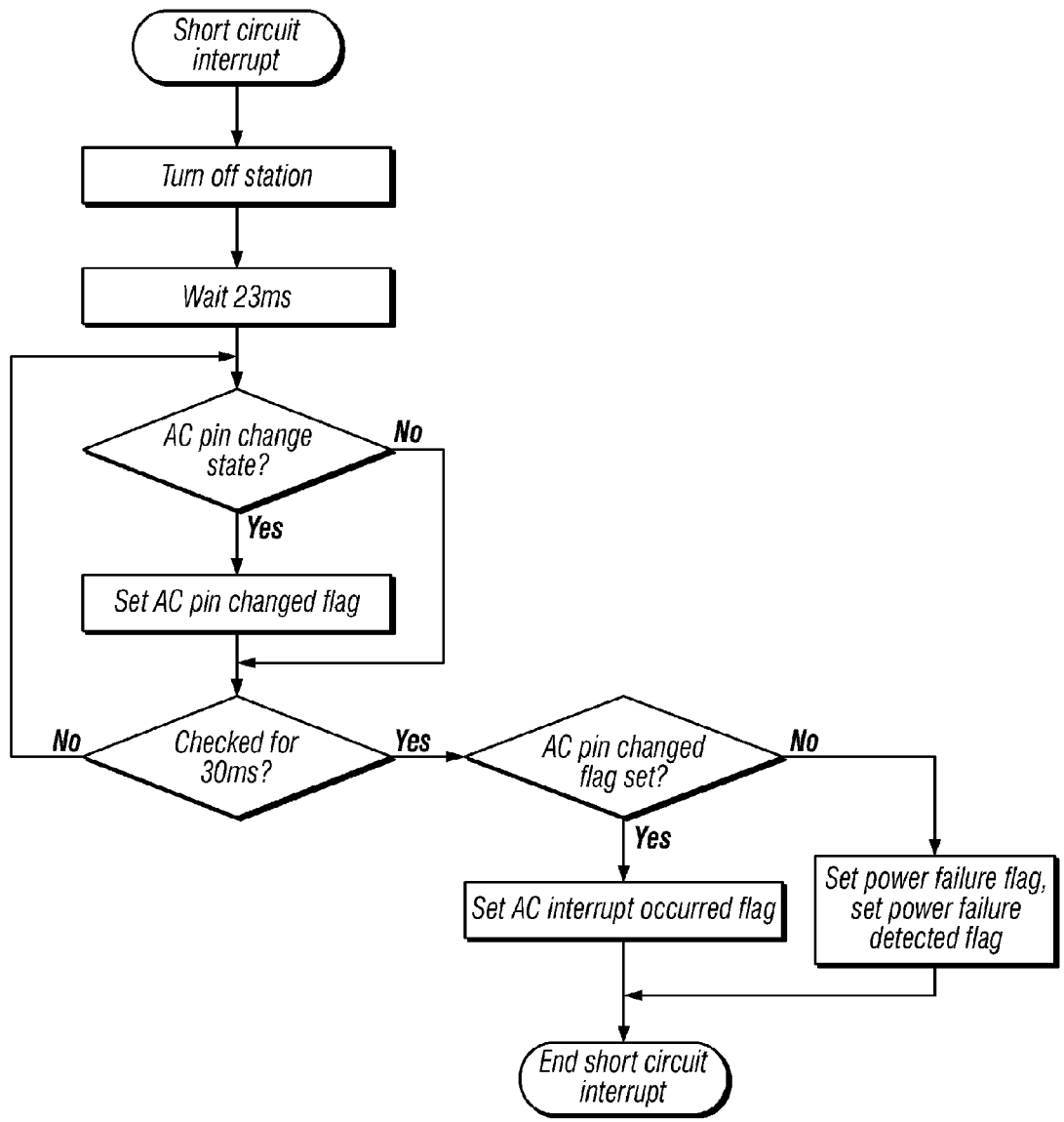
Figure 8A:
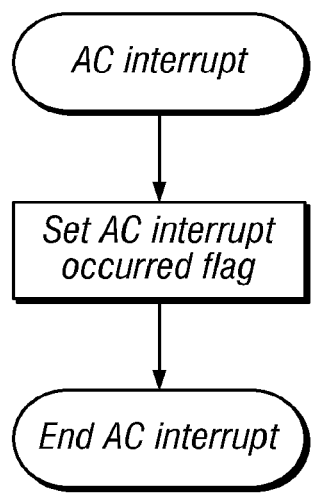
Figure 8A:
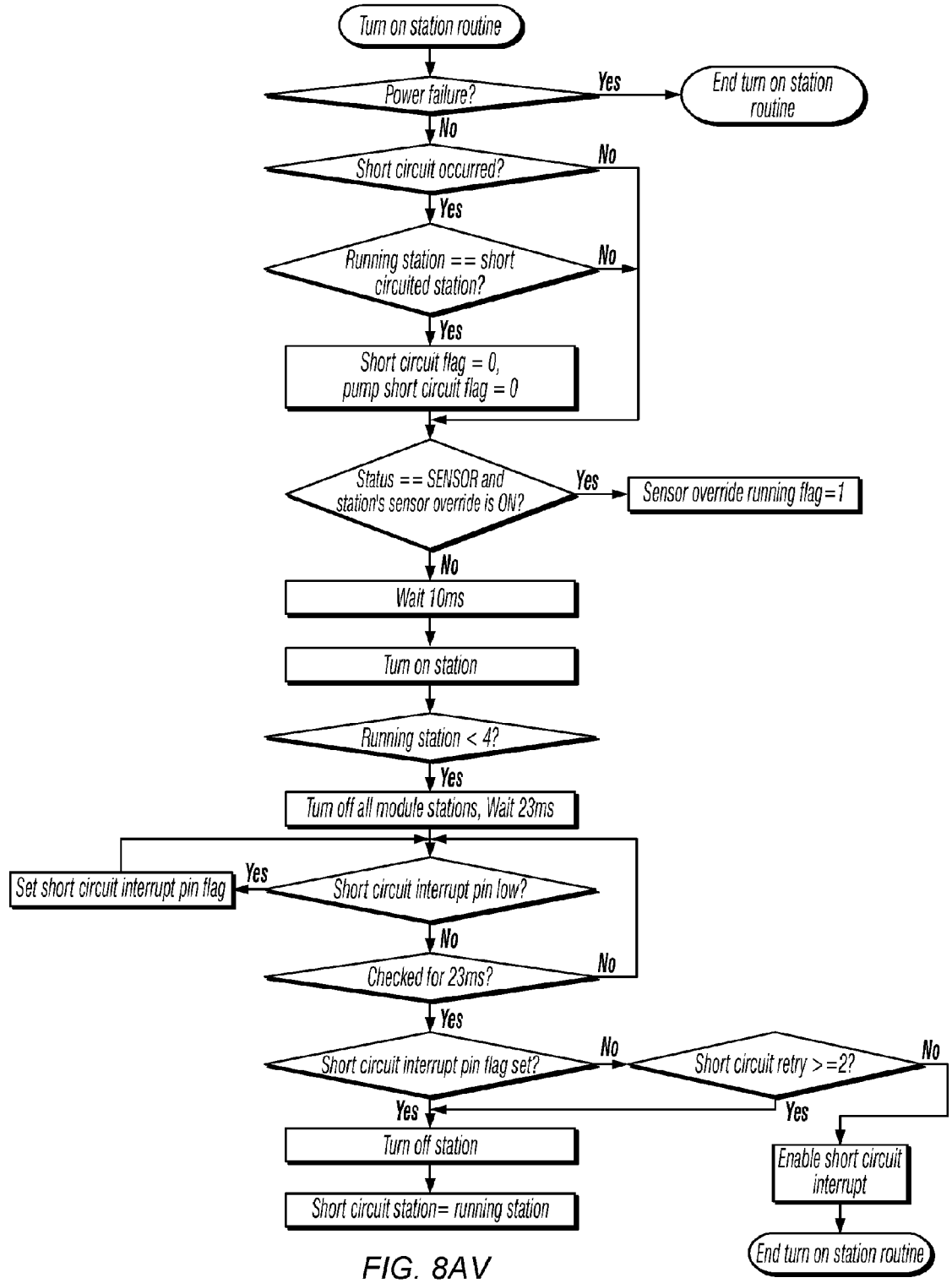
Figure 8A:
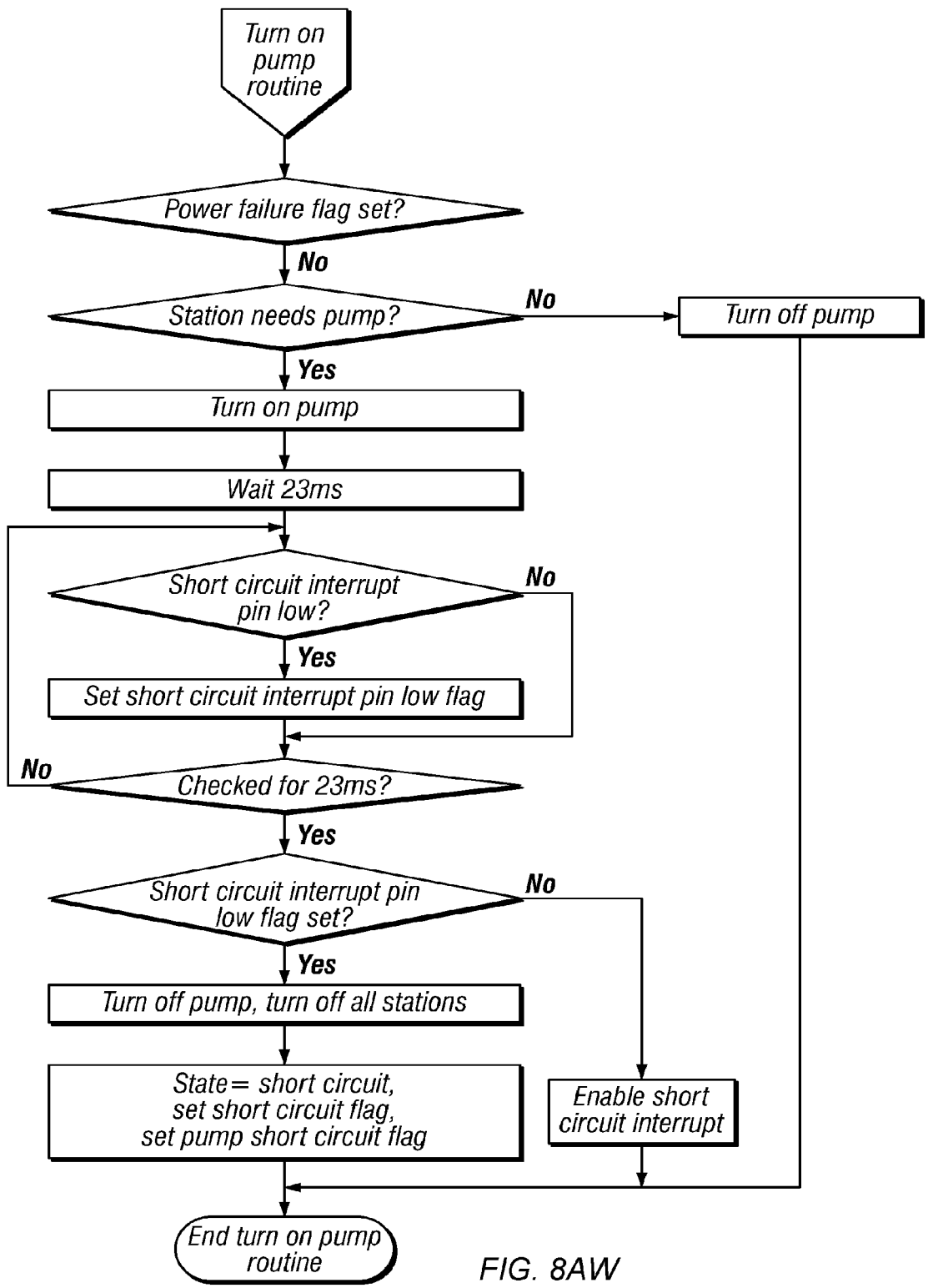
Figure 8B:
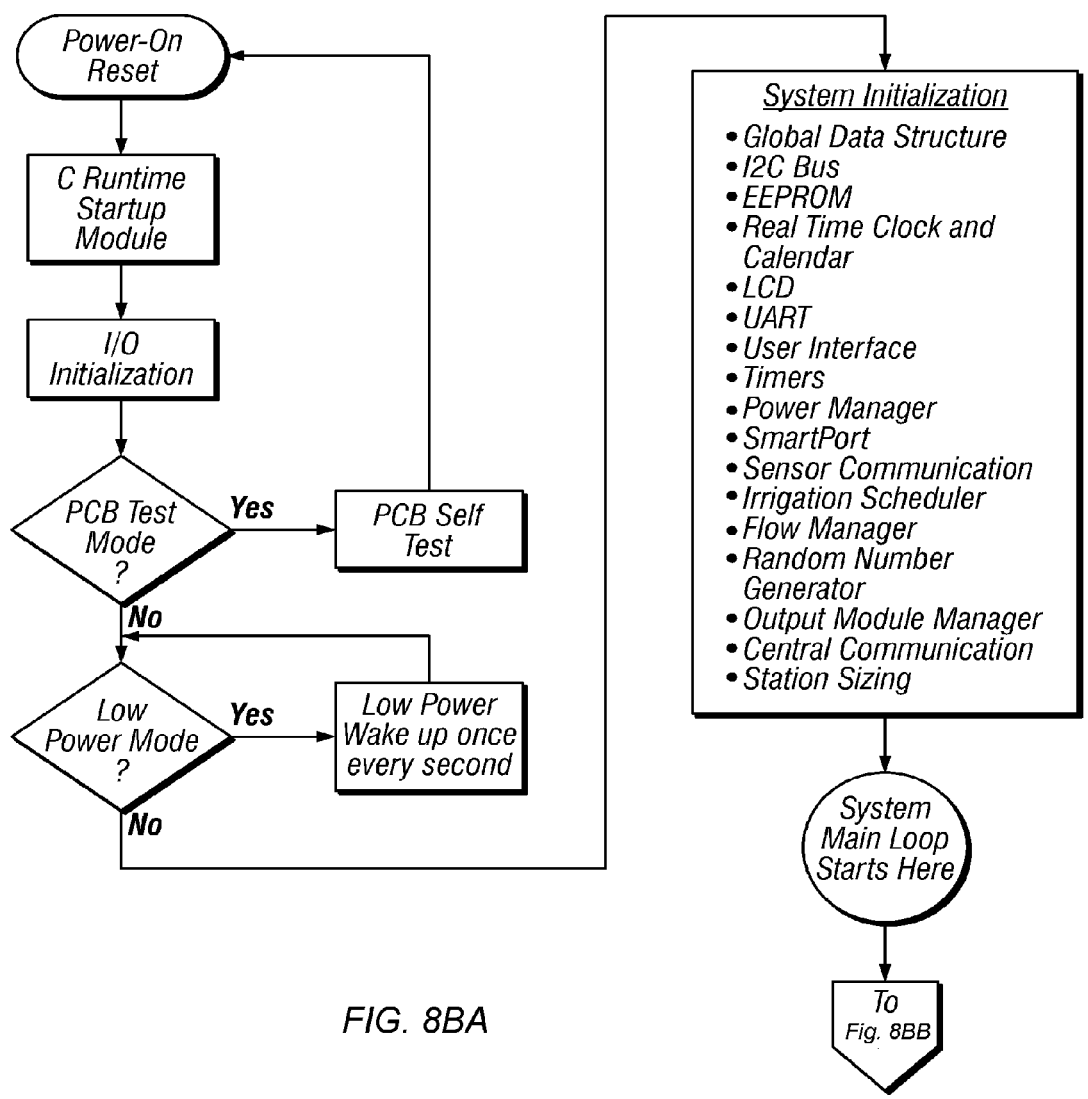
FIGS. 8BA-8BP are detailed flow diagrams illustrating the operation of the stand alone irrigation controller, according to another embodiment.
Figure 8B:
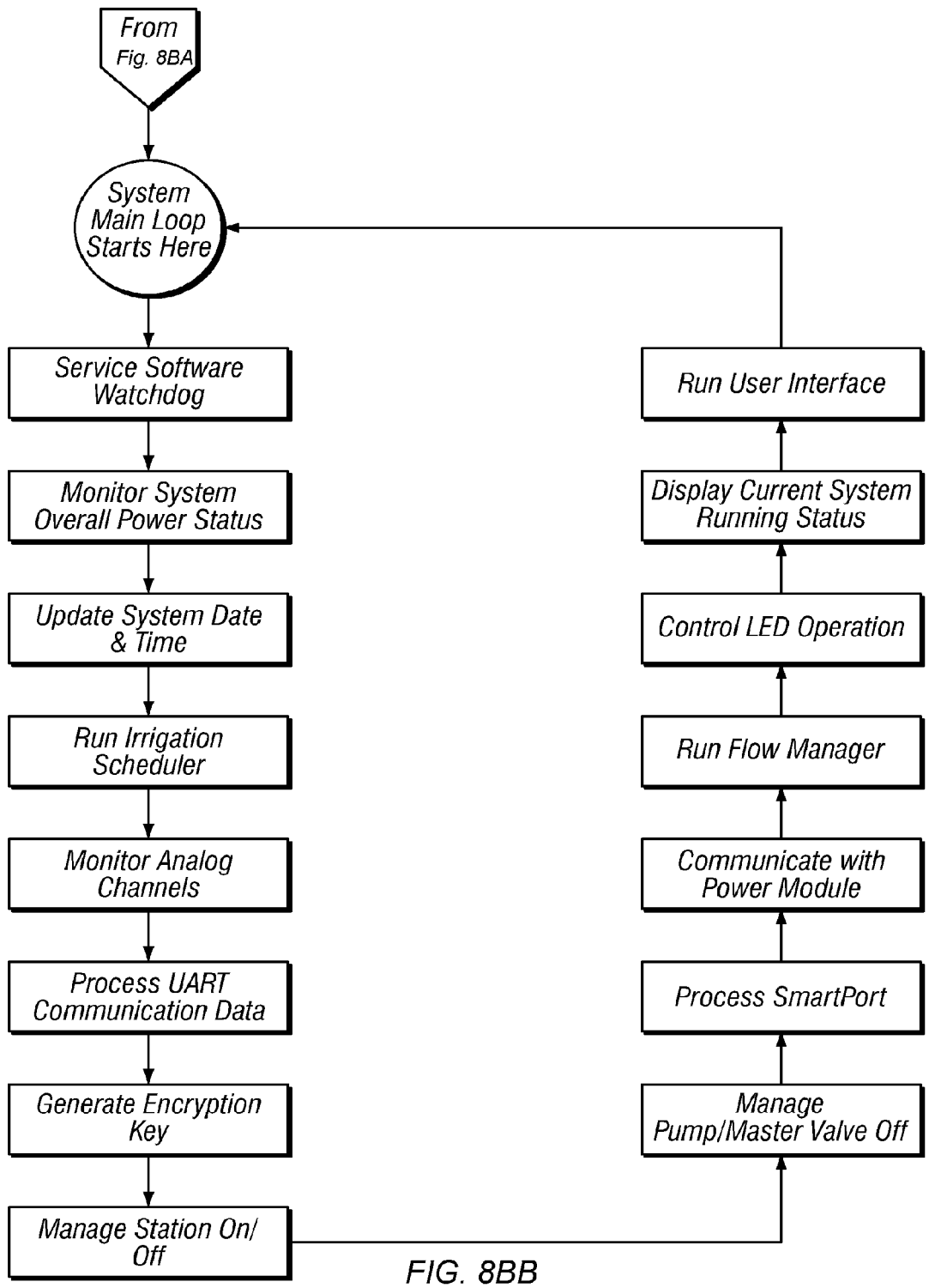
Figure 8B:
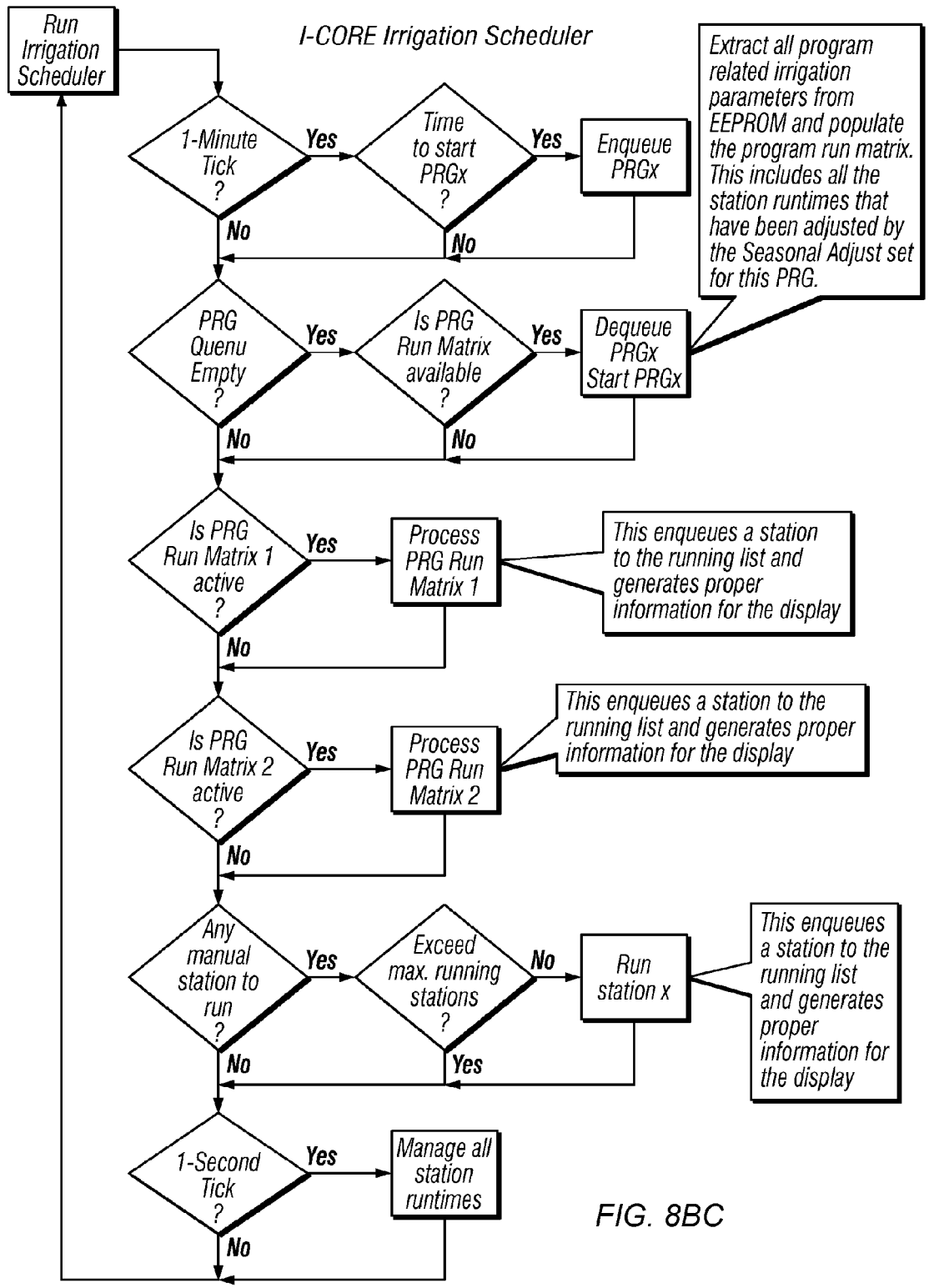
Figure 8B:
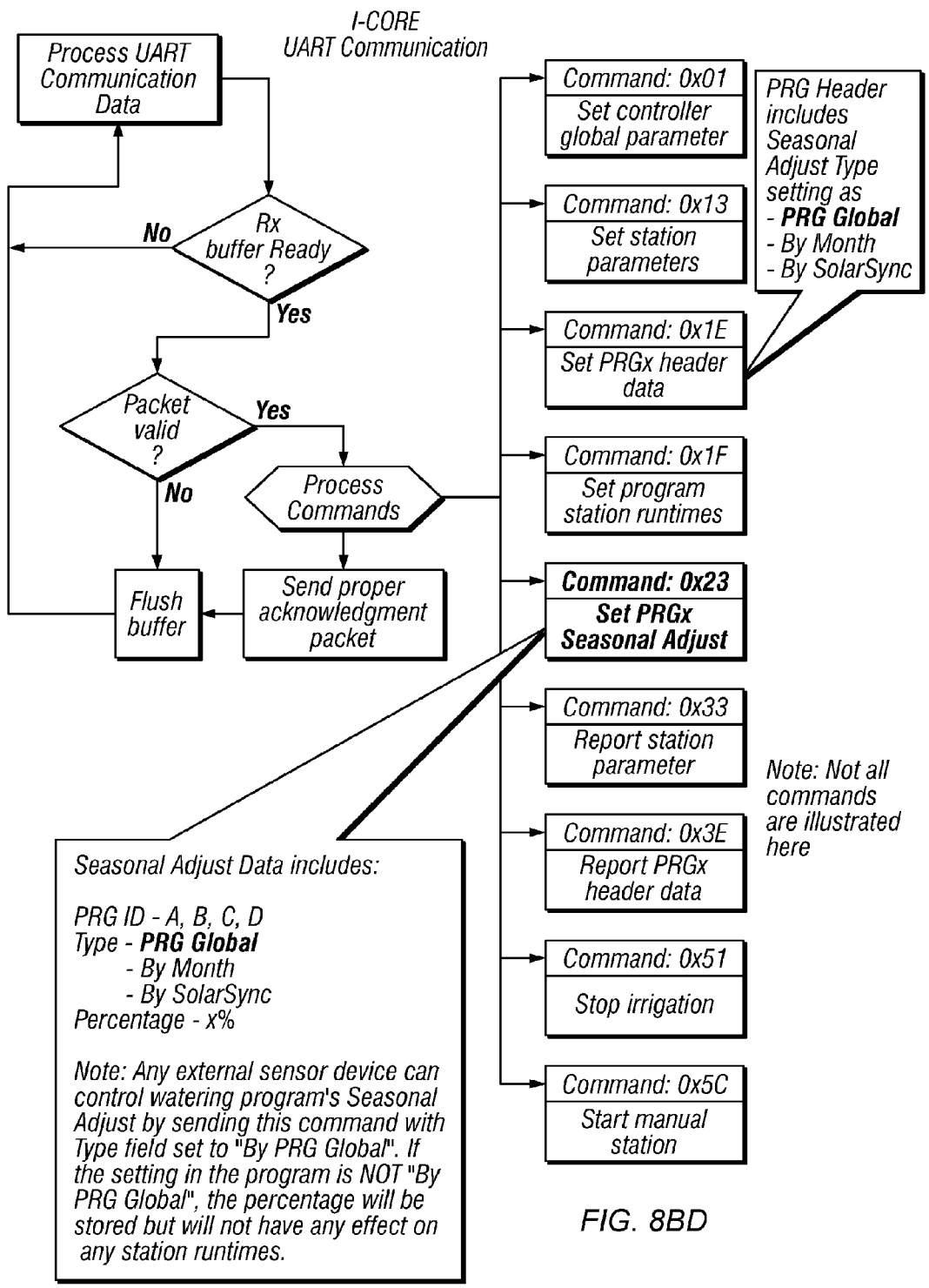
Figure 8B:
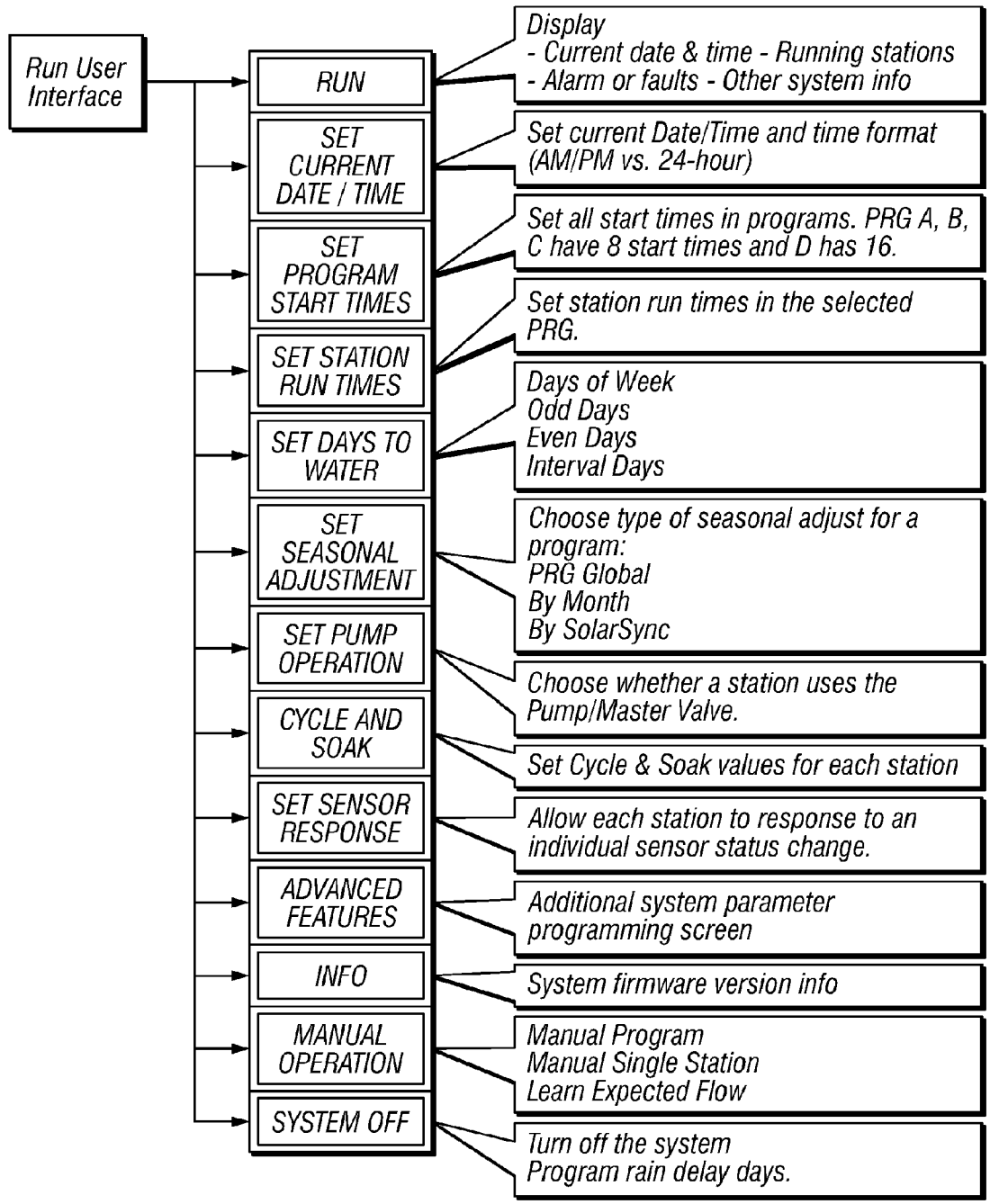
Figure 8B:
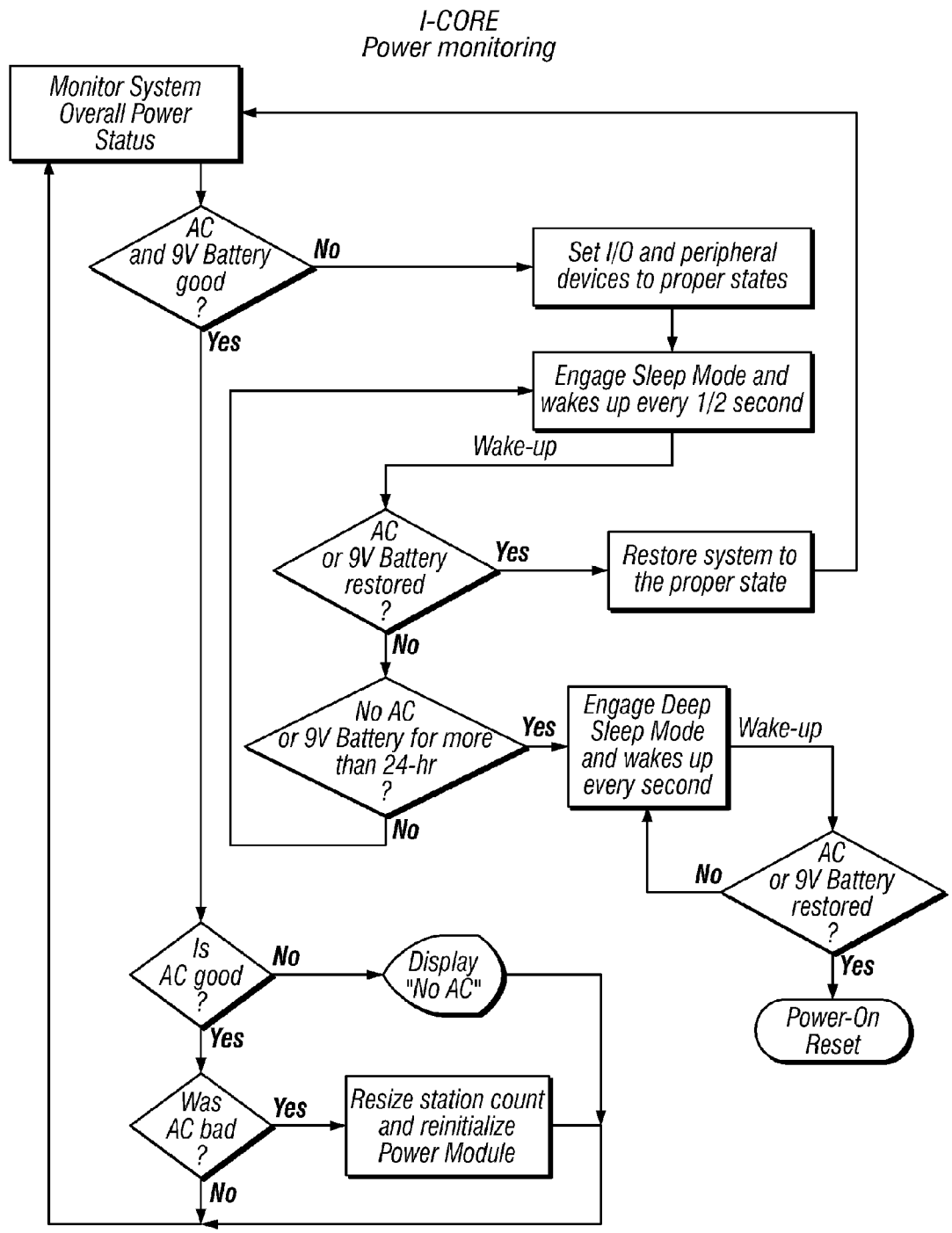
Figure 8B:
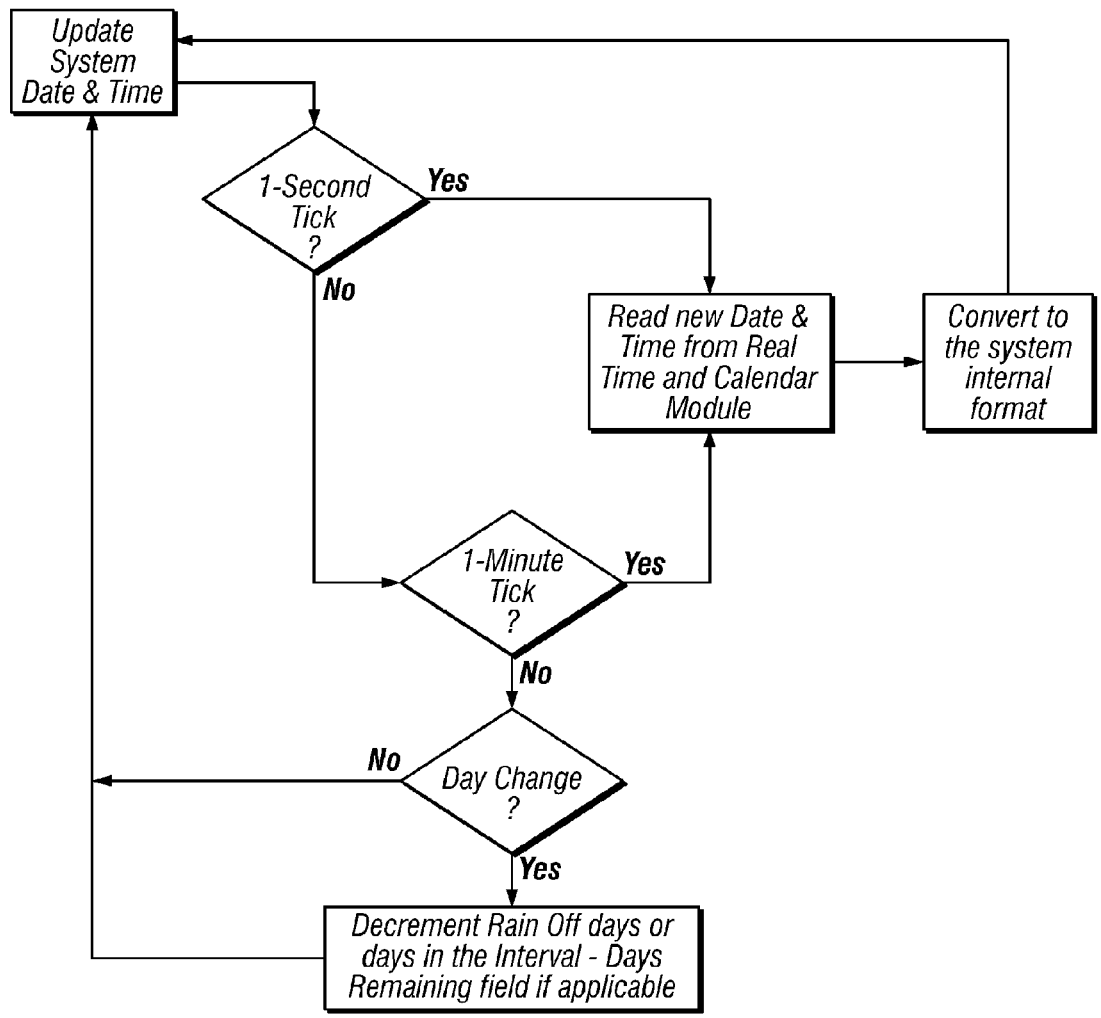
Figure 8B:
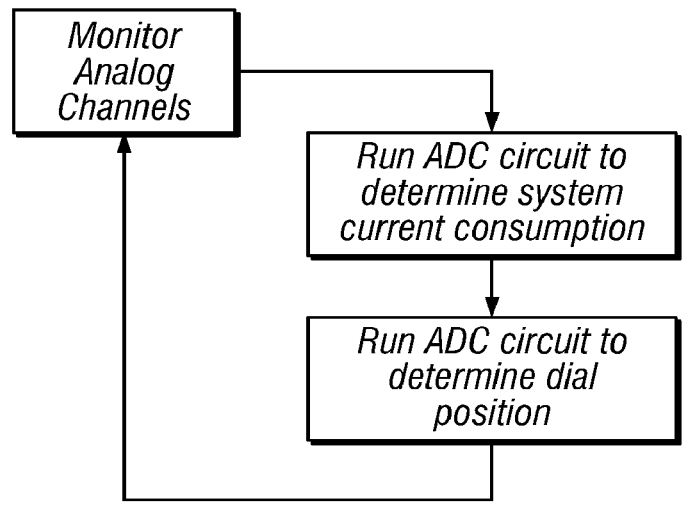
Figure 8B:
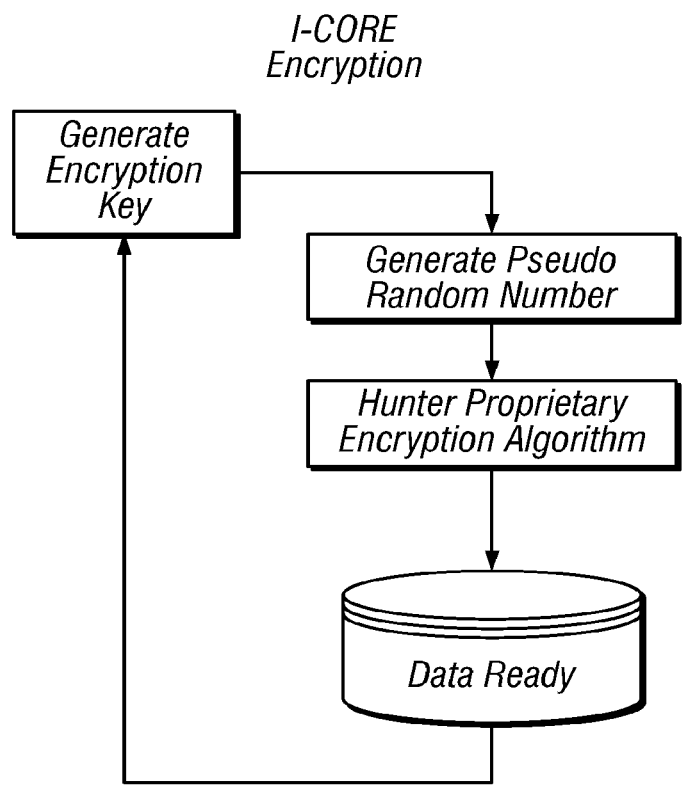
Figure 8B:
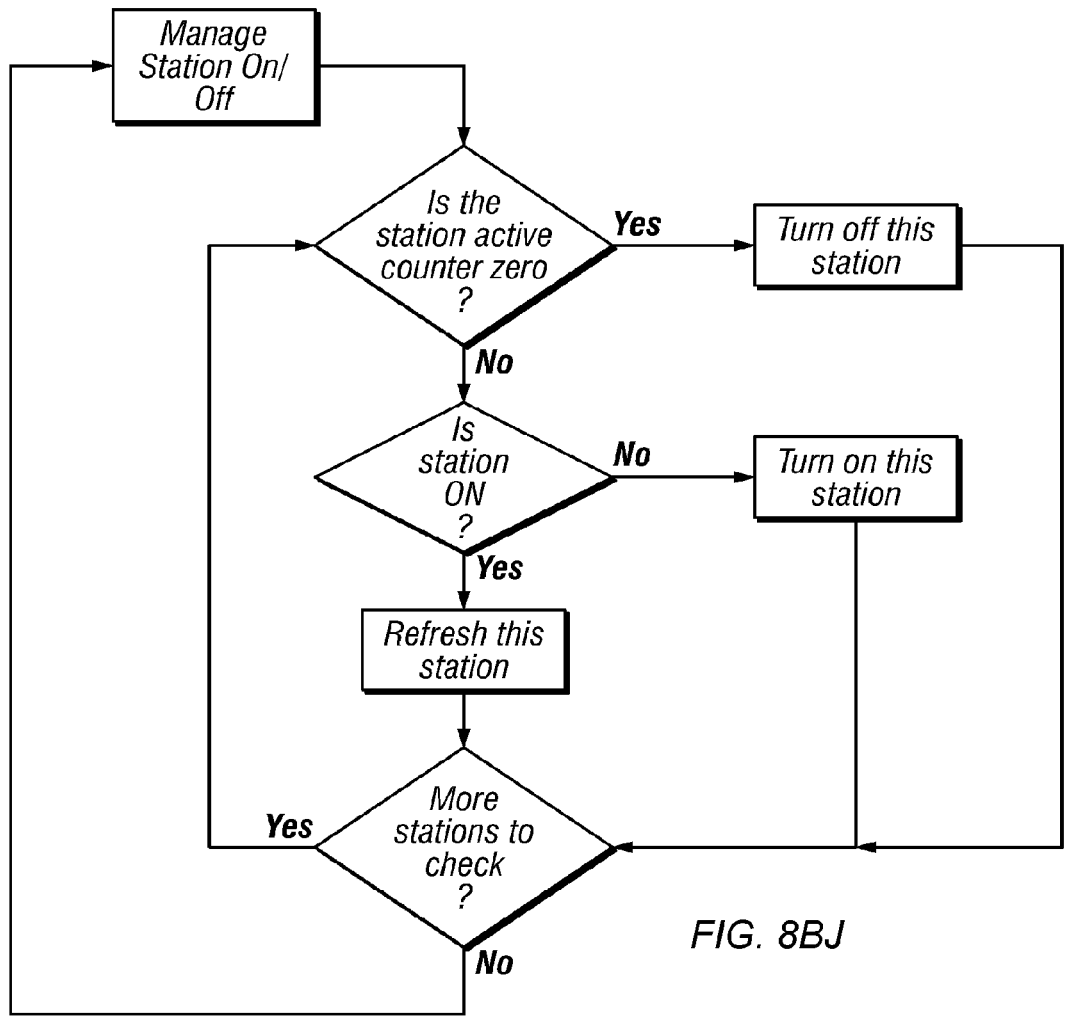
Figure 8B:
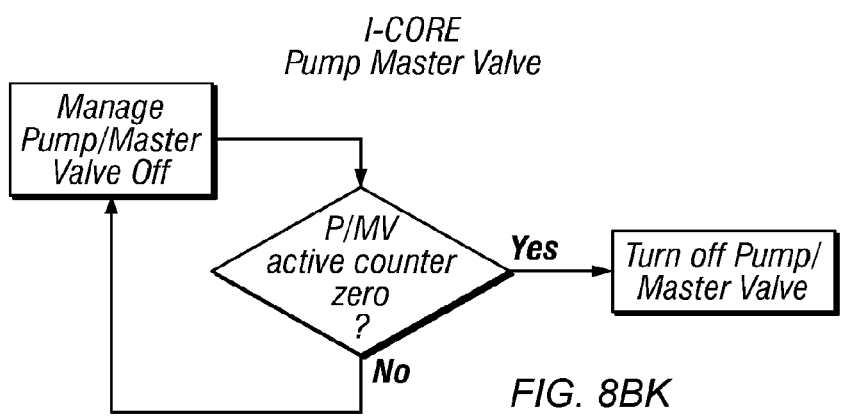
Figure 8B:
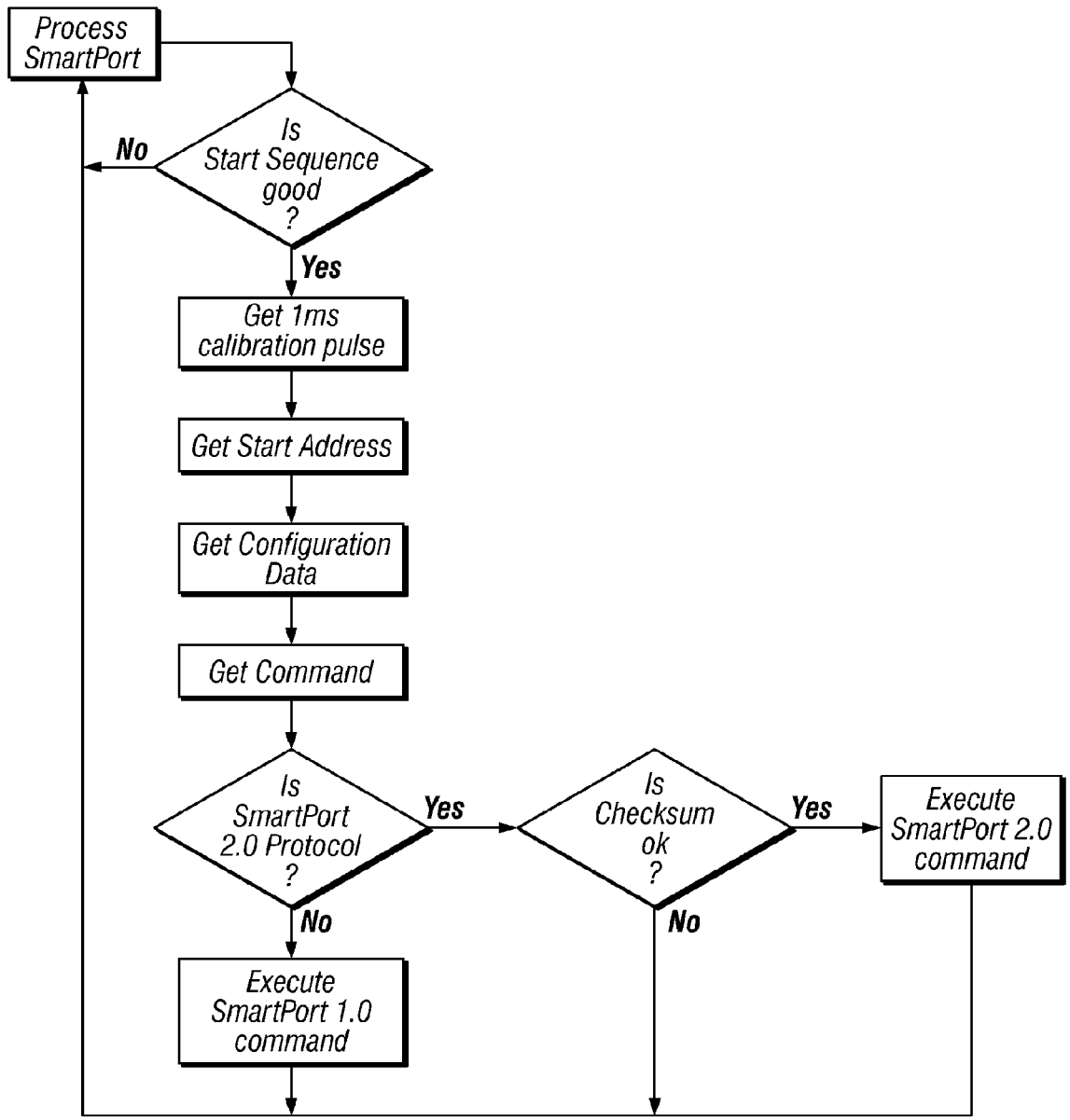
Figure 8B:
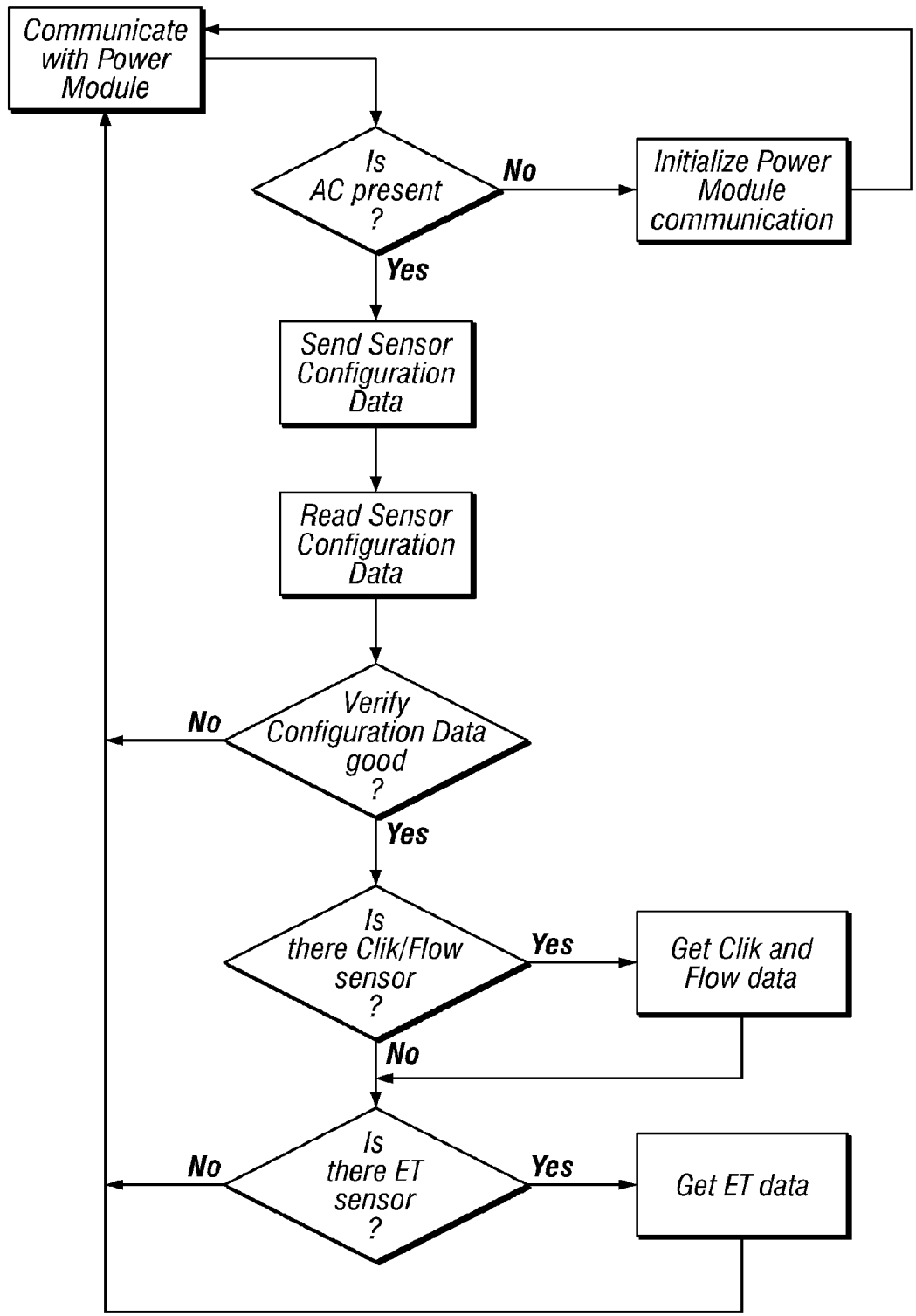
Figure 8B:
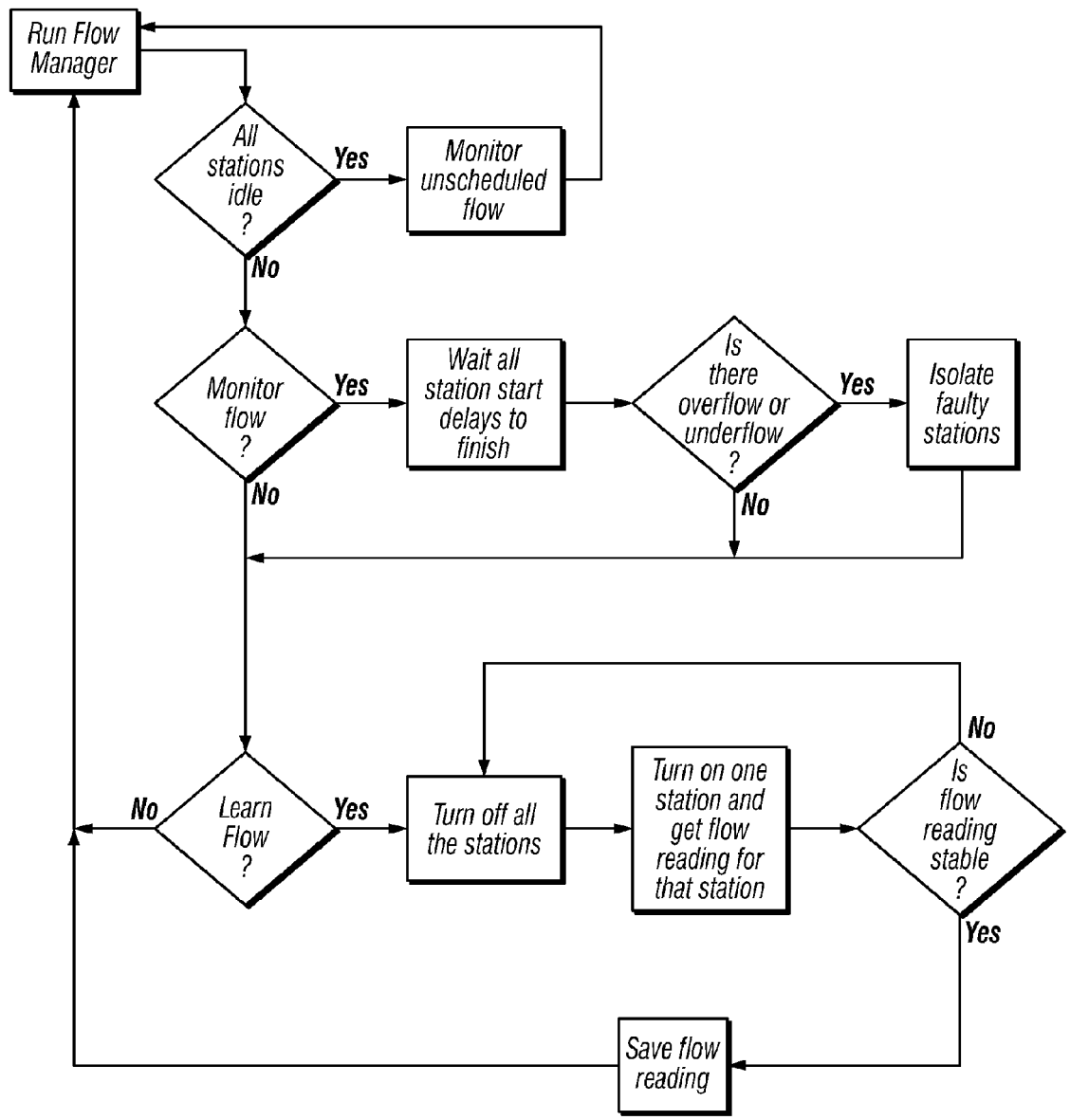
Figure 8B:
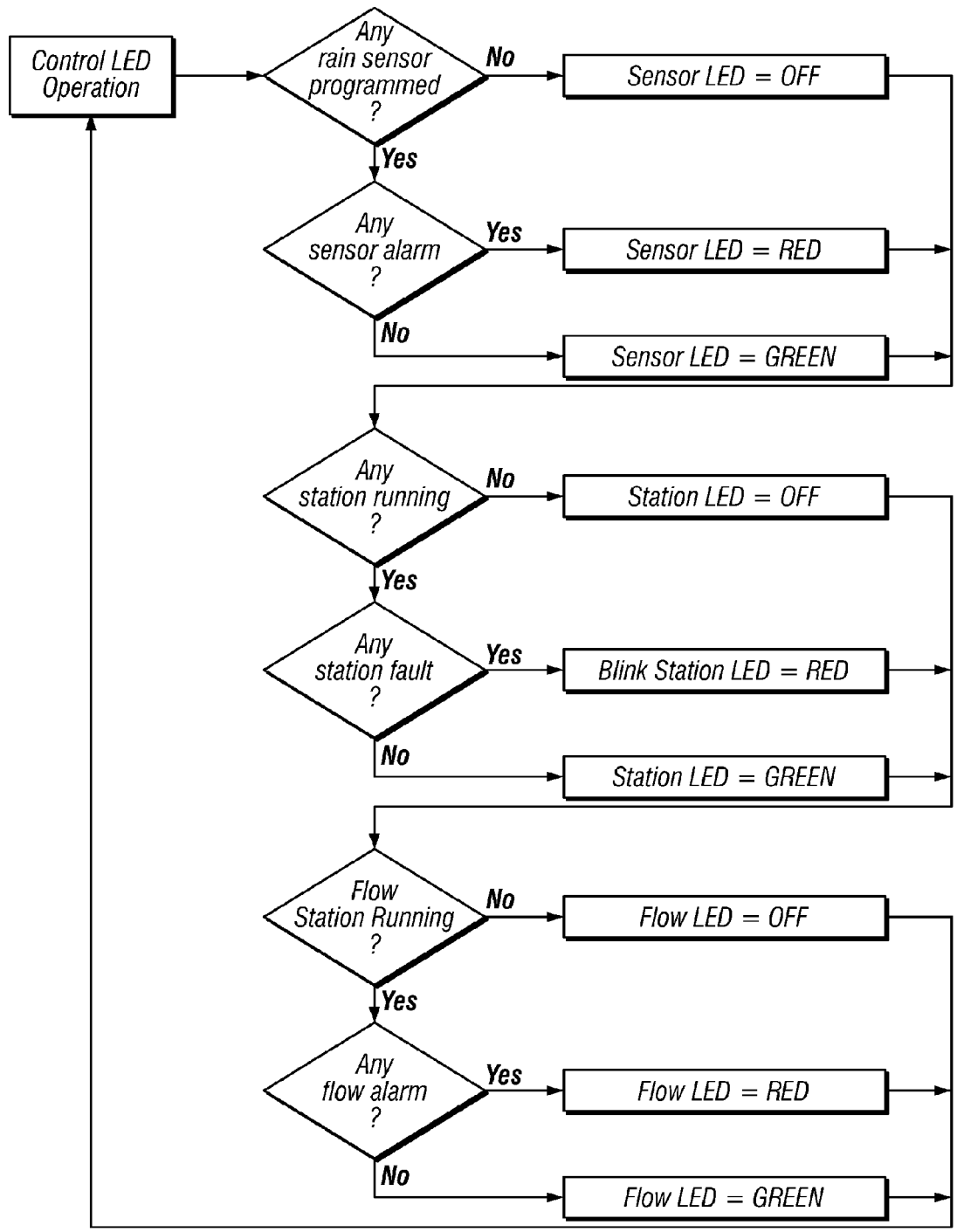
Figure 8B:
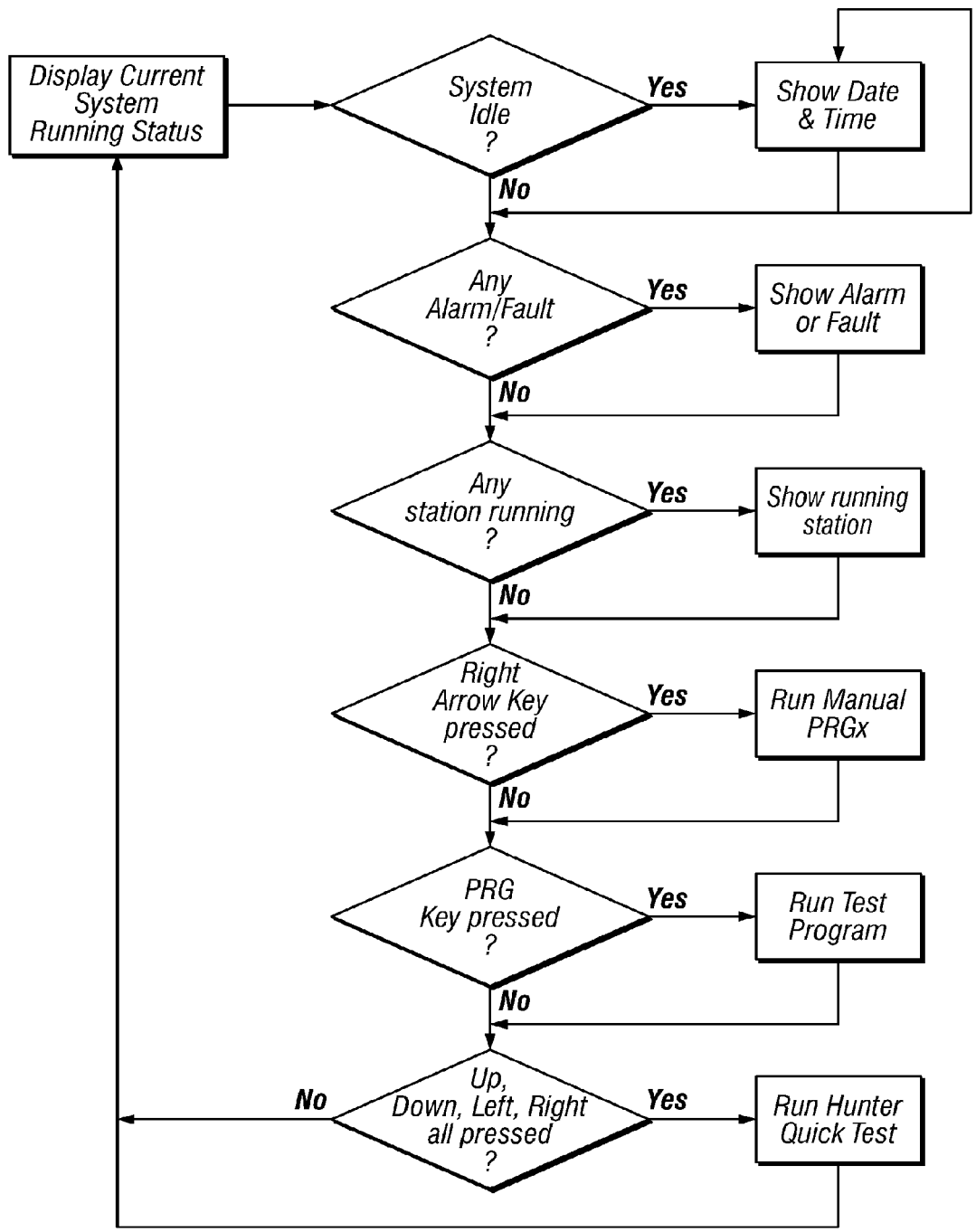

FIGS. 8AA-8AW are flow diagrams illustrating the operation of the stand alone irrigation controller according to one embodiment and FIGS. 8BA-8BP are detailed flow diagrams illustrating the operation of the stand alone irrigation controller, according to another embodiment. Those skilled in the art of designing and programming irrigation controllers for residential and commercial applications will readily understand the logical flow and algorithms that permit the processor 40 to execute the watering program stored in the memory 42.

Referring to FIGS. 8AA-AW, this watering program enables the processor 40 to generate commands for selectively turning the plurality of valves ON and OFF in accordance with the selected or entered watering schedules. The watering program includes a seasonal adjustment feature that provides the capability for automatically modifying the watering schedules to thereby conserve water while maintaining plant health. By actuating one of the push buttons 32*c* or 32*d* the user can increase or decrease the run types for all stations by a selected scaling factor, such as ten percent, to account for seasonal variations in temperature and rainfall.

Referring to FIGS. 8BA-BP, these watering programs enables the processor 40 to generate commands for selectively turning the plurality of valves ON and OFF in accordance with the selected or entered watering schedules. The watering programs each include one or more seasonal adjustment features that provides the capability for automatically modifying the watering schedules to thereby conserve water while maintaining plant health. By actuating one of the push buttons 32*c* or 32*d* the user can increase or decrease the run times for the assigned stations by a selected scaling factor, such as ten percent, to account for seasonal variations in temperature and rainfall. Different watering programs may be programmed for different zones. A zone is typically an area of turf or plantings watered by one or more sprinklers supplied with water from the same solenoid actuated valve. In accordance with the present invention, the soil moisture sensors 20*a-d* are each physically buried in the soil of a corresponding zone so that the signal output therefrom can be used to calculate a soil moisture requirement value for that zone.

Figure 9:
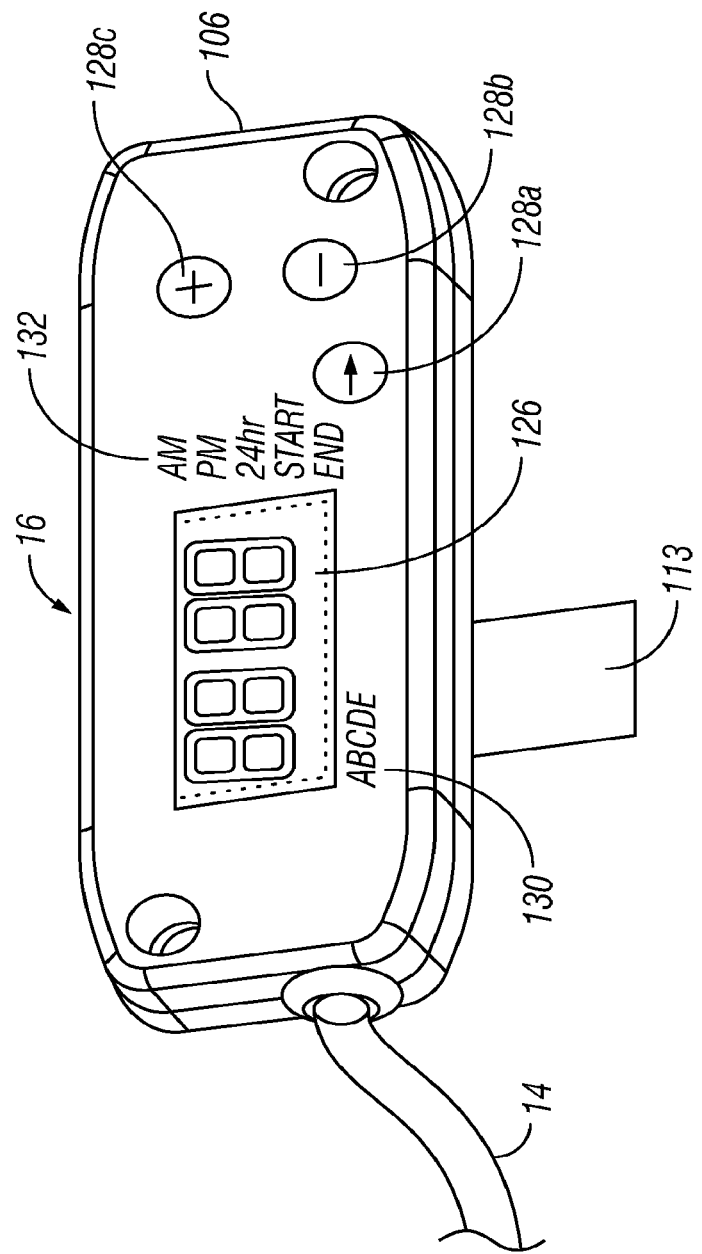
FIG. 9 is a perspective view of the stand alone sensor control unit of the system of FIG. 1, according to certain embodiments.
Figure 10:
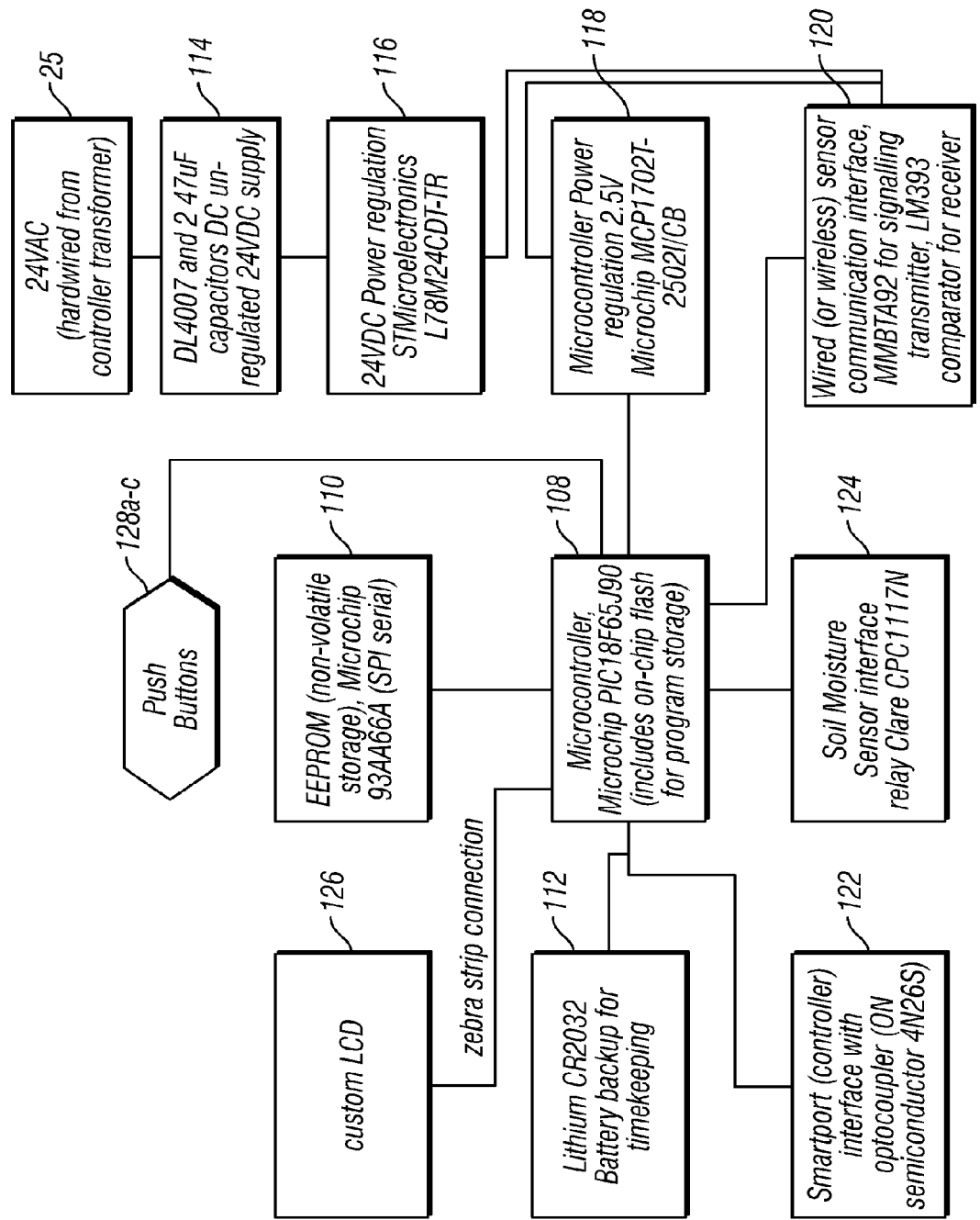
FIG. 10 is a block diagram of the electronic portion of the stand alone sensor control unit of FIG. 9, according to certain embodiments.

Referring to FIG. 9, the stand alone sensor control unit 16 includes a rectangular outer plastic housing 106 enclosing a printed circuit board (not illustrated) which supports the electronic circuit of the sensor control unit 16 that is illustrated in the block diagram of FIG. 10. A microcontroller 108 such as a Microchip PIC18F65J90 processor executes firmware programming stored in a memory 110 such as an industry standard 93AA66A EEPROM memory. The microcontroller 108 can receive DC power from a lithium battery 112 such as an industry standard CR2032 battery, which allows accurate time keeping in the event of a power failure. Insulating strip 113 (must be manually pulled out to establish an operative connection of the battery 112. External power for the sensor control unit 16 is supplied from the transformer 25 (FIG. 1) via the cable 14. The 24VAC power from the transformer 25 is supplied to a rectifier/filter circuit 114 (FIG. 10) which supplies twenty-four volt DC power to a power regulation circuit 116 which may be an STMicroelectronics L78M24CDT-TR regulator. Power from the power regulation circuit 116 is fed to a microcontroller power regulator 118 which may be a Microchip MCP 1702T-25021/CB regulator. Power from the power regulation circuit 116 is also fed to a wired or wireless sensor communications device 120 that may include, by way of example, an industry standard MMBTA92 for the signal transmitter and an industry standard LM393 comparator for the receiver.

FIG. 10 is a block diagram of an embodiment of the electronic portion of the stand alone soil moisture control unit of FIG. 9. The microcontroller 108 interfaces with the SmartPort™ connector of the irrigation controller 12 with a combination interface/optocoupler 122 which may be provided by an industry standard 4N26S device. The microcontroller 108 interfaces with sensor 20. An LCD display 126 is mounted in the housing 106. Three manually actuable controls in the form of push buttons 128*a-c* (FIG. 9) are mounted in the housing 106 for enabling the user to make selections when setting up and modifying the operation of the sensor control unit 16 in conjunction with information indicated on the display 126 which is facilitated by column and row indicia 130 and 132, respectively, affixed to the housing 106 adjacent the horizontal and vertical margins of the display 126. Row indicia 132 include, from top to bottom, AM, PM, 24 HR, START and END which are printed, painted, molded or otherwise applied to the outer plastic housing such as by a sticker.

Column indicia 130 are illustrated diagrammatically as A-E in FIG. 9 due to space constraints in the drawing. The sensor control unit 16 can be manufactured to work with a variety of different sensors 20. Different sensors 20 may have different set up requirements. As a result, A-E may be labeled differently depending on which type of sensor 20 it is designed to control. The labels of A-E may be selected from, but not limited to TIME, REGION, MOISTURE SENSOR TYPE, SOIL TYPE, SENSOR DEPTH, TEMPERATURE SENSOR TYPE, CALIBRATION, CABLE LENGTH, SET THRESHOLD, NO WATER and WATER +/− with associated icons which are printed, painted, molded or otherwise applied to the outer plastic housing 106 such as by a sticker.

Figure 11:
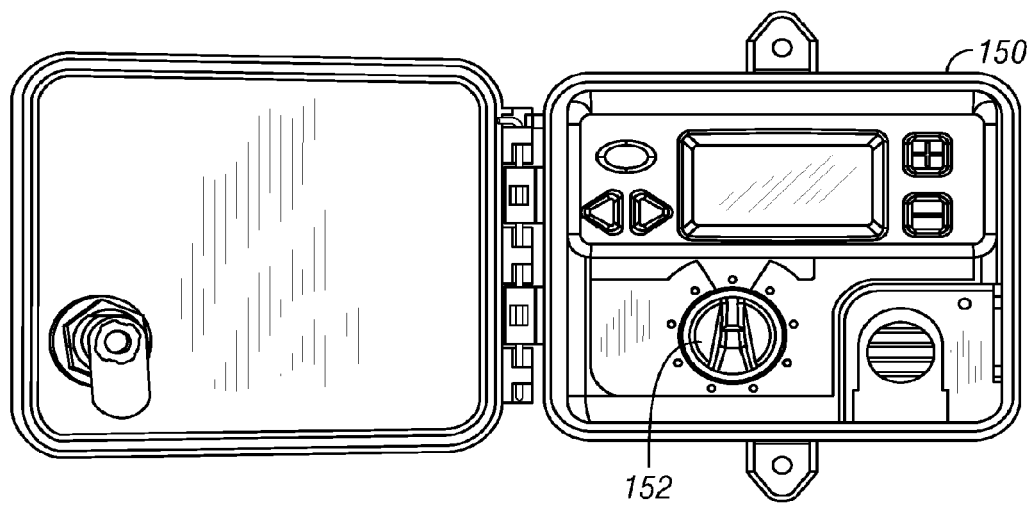
FIG. 11 is a front elevation view of an alternate embodiment of the sensor control unit.

FIG. 11 is an alternate embodiment of the sensor control unit 16. This alternated embodiment controller 150 may perform essentially the same functions as the described sensor control unit 16 with the added benefit of a rotary control knob 152 added to the push button switches. This rotary control knob 152 allows for more complex programming and the programming using push buttons alone is too cumbersome. This is particularly beneficial when many sensors are hooked up to the sensor control unit 16 and when communications need to be set up for wireless systems.

Figure 12:
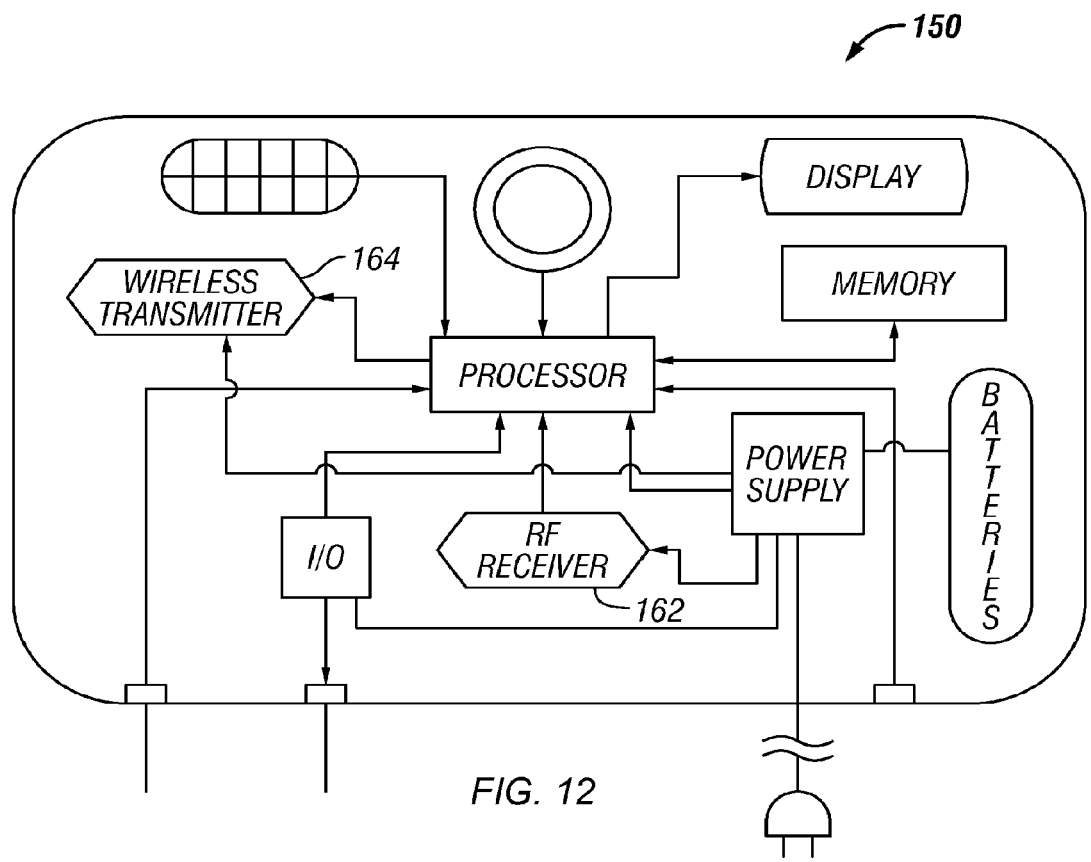
FIG. 12 is a block diagram of the circuitry of the sensor control unit of FIG. 11, according to certain embodiments.
Figure 13A:
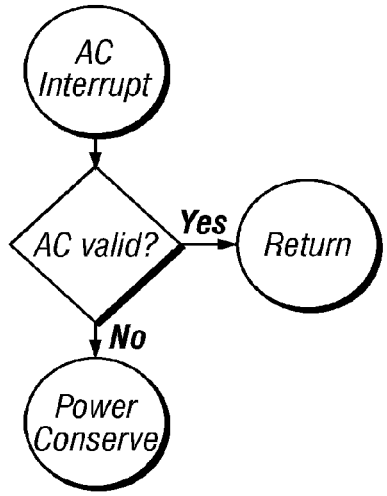
FIGS. 13A-13D are flow diagrams illustrating the operation of the stand alone sensor control unit of FIG. 9, according to certain embodiments.
Figure 13B:
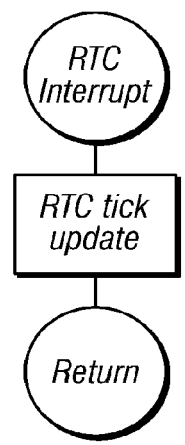
Figure 13C:
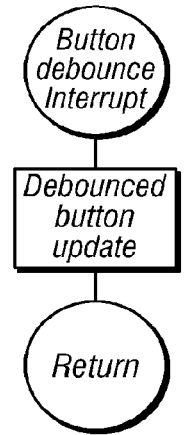
Figure 13D:
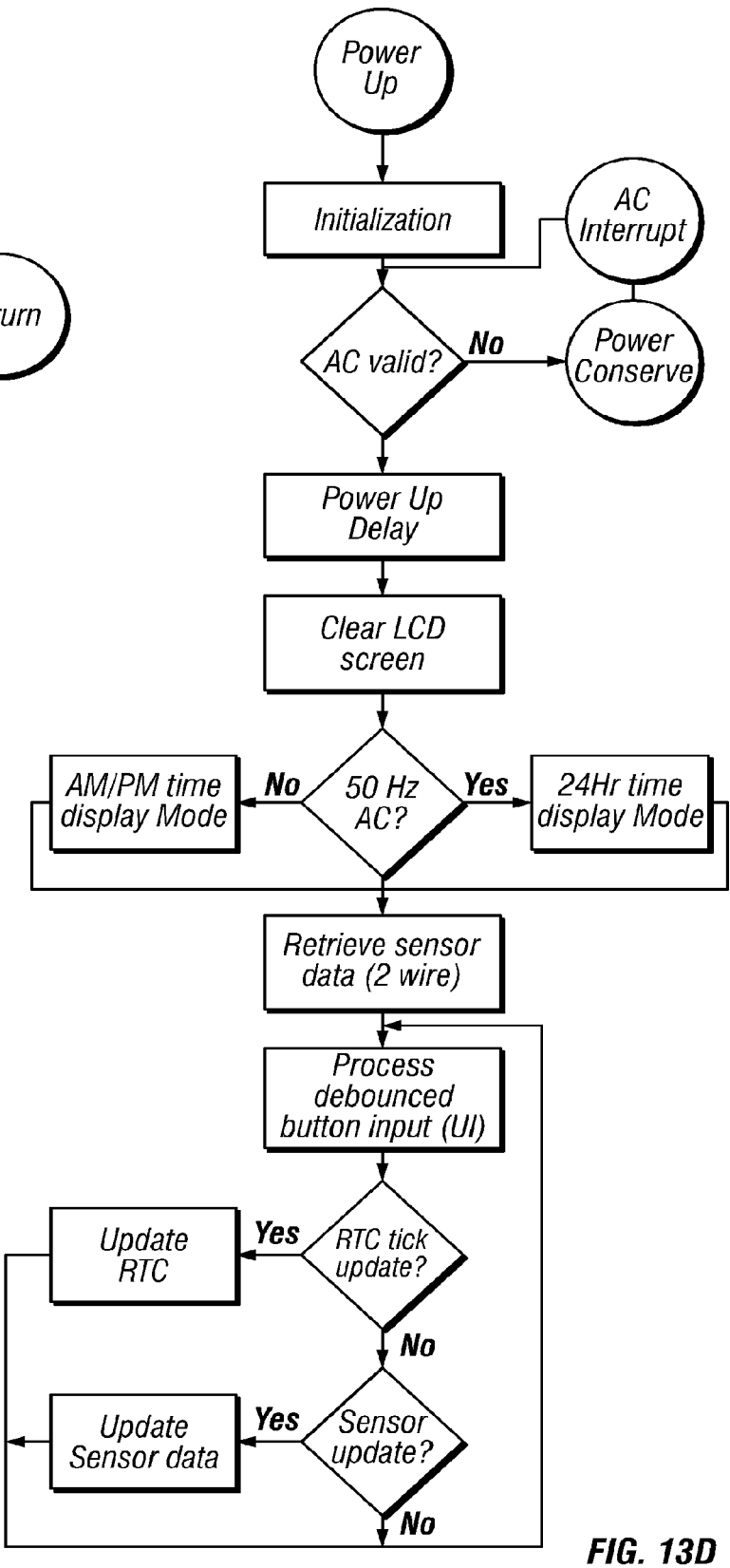

FIG. 12 is a block diagram of the circuitry of the alternate embodiment 150. This alternate embodiment also includes wireless transmitter 164 and RF receiver 162 to facilitate wireless communications to various components of the soil moisture controlled irrigation system.

FIGS. 13A-13D are flow diagrams illustrating the operation of the stand alone sensor control unit 16. A watering program in an irrigation controller may include several watering schedules that typically include inputted parameters such as start times, run times and days to water. The sensor control unit 16 can automatically set the seasonal adjustment of the irrigation controller 12 to reduce watering time or to increase watering times, based at least in part on the sensor data.

In embodiments where the sensor control unit 16 comprises an ET control unit 16 and the sensor 20 comprises a weather station 20, the ET control unit 16 utilizes actual ET data as its basis for making the modifications to the watering schedules implemented by the irrigation controller 12. However, to simplify the irrigation system 10 and reduce the costs, some of the ET parameters may be pre-programmed into the ET control unit 16 as constants. These constants may be selected from a group of geographical areas to approximately assimilate the local conditions and estimate a maximum ET value. Other climatic factors are monitored on a daily basis and are the variables. The variables may include one or more pieces of environmental data such as temperature, humidity, solar radiation, wind, and rain. In an embodiment, the measured variables are temperature and solar radiation. The variables and any constants are used by the processor 108 to calculate an estimated ET value. This estimated ET value is then used by the ET control unit 16 to automatically set the seasonal adjustment feature of the irrigation controller 12. The weather station 20 can also include a sensor that indicates a rain event. A rain event does not affect calculation of an estimated ET value. However, it does shut of the irrigation during, and for a period of time following, the rain event as a further conservation measure.

In embodiments where the sensor control unit 16 comprises a soil moisture control unit 16 and the sensor 20 comprises one or more soil moisture sensors 20, the soil moisture control unit 16 utilizes actual soil moisture data as its basis for estimating a soil moisture requirement value and making the modifications to the watering schedules implemented by the irrigation controller 12. The soil moisture control unit 16 is designed to work with one or more styles of moisture sensors 20. One example may be similar to U.S. Pat. No. 5,179,347 of Hawkins.

Another example is illustrated in the method of sensing moisture described in U.S. Publication No. 2008/0202220 of Schmidt where ambient soil temperature and temperature degradation times are used to determine the soil moisture content. Other types of soil moisture sensors 20 with or without temperature sensors may be used with various embodiments of the soil moisture control unit 16. Soil moisture sensors 20 without temperature sensing capabilities can be used alone, or with optional temperature sensing devices that can be added during the installation. Temperature sensors may be placed in the ground or may be used to measure air temperature.

If the installation includes the ability to measure the either the soil or the air temperature, this additional information can be used by the soil moisture control unit 16 to calculate the soil moisture requirement value. The soil moisture requirement value will increase or decrease in relationship to changes in the soil temperature or air temperature. The higher the recorded temperatures, the greater the evapotranspiration of the plant material will be. Furthermore, overhead irrigation is not as efficient as high temperatures because of evaporation of the spray in the air prior to it hitting the surface of the ground. Also if the temperatures are very high, a certain percentage of water that hits the ground will evaporate prior to soaking into the soil. All of these considerations can be taken in to account by the soil moisture controller to increase or decrease the amount of water that is supplied at a given time. In the case of a soil temperature measurement, this is further modified by how deep the sensor is placed into the soil because the temperature changes in the soil are reduced as the sensing depth is increased. The ability of the soil moisture control unit 16 to determine the irrigation requirements based on either air or soil temperature and moisture content allow it to automatically change the seasonal adjust of the irrigation controller 12 from as little as 0% of normal watering to more than 100% of the normal watering schedule based on the actual conditions of the soil at the irrigation site.

The user can modify the run and cycle times for individual stations in the usual manner in the irrigation controller 12. As an example, if one station is watering too much, but all of the other stations are watering the correct amount, the user can easily reduce the run time of that particular station and balance the system out. Then, for example, the soil moisture control unit 16 continues to automatically modify the watering schedules executed by the irrigation controller 12 on a global basis as a percentage of run time, based at least in part on the calculated estimated soil moisture requirement value. In another example, the ET control unit 16 continues to automatically modify the watering schedules executed by the irrigation controller 12 on a global basis as a percentage of run time, based at least in part on the calculated estimated ET value.

Irrigation controllers can be used to control landscape lighting and other non-irrigation devices such as decorative water fountains. The irrigation controller 12 may have features in it such that the sensor control unit 16 only modifies the watering schedules of the irrigation controller 12.

One of the difficulties with conventional irrigation controllers is the difficulty of fine-tuning the irrigation controller schedule based on the sensor data being received. One situation is where the irrigation schedule has been inaccurately set up. It is very common for irrigation controllers to be programmed by the end user so that the schedule tends to over or under irrigate the property. In embodiments disclosed herein, this scheduling error is automatically corrected by the sensor control unit 16.

In embodiments of the irrigation system 10 where the sensor control unit 16 comprises a soil moisture control unit 16 and the sensor 20 comprises at least one soil moisture sensor 20, the soil moisture sensor 20 is installed at the proper root zone depth of at least one of the irrigated zone. A wire connects the soil moisture control unit 16 to the output of that zone on the irrigation controller 12. Each watering program has at least one associated soil moisture sensor. There may be a plurality of watering programs associated with a landscaped area, each program having at least one zone assigned to it where at least one of the assigned zones has at least one soil moisture sensor buried in the landscaped area that is irrigated by that zone.

When a monitored zone is being watered, the soil moisture control unit 16 and the controller 12 communicate via a two way communications platform to measure how long that station operates. If the soil moisture control unit 16 has not detected the proper moisture when the irrigation cycle is complete, it can automatically increase the run time of the watering schedules within the irrigation controller 12 by adjusting the seasonal adjust feature higher. It may continue to do this over time until operation of that zone runs long enough for the soil moisture sensor 20 to sense the moisture in the soil. A maximum run time may manually or automatically be entered into the program. This will be a value that is higher than the programmed run time. This will restrict the controller from excessive over watering of a zone in the event that the controller does not get a signal from the sensor that the soil is moist. If this occurs, the controller may display a fault warning for that sensor.

Also, if the soil moisture control unit 16 detects that the soil is moist, but the irrigation cycle is still running, it will allow that irrigation cycle to continue. After the cycle is complete, it will calculate the amount of time the zone ran and compare that with the amount of time it took to moisten the soil. It will then automatically reduce the seasonal adjust of the irrigation controller 12 so the irrigation cycle time will match the amount of time required to irrigate the soil to the proper moisture. This is repeated each time the irrigation controller 12 operates that zone to continually fine tune the watering schedule.

The sensors 20 may not always be able to be placed in an optimum location on the irrigation site. For example, a soil moisture sensor 20 may be placed in an area that receives late afternoon shade. This will result in the calculation of an abnormally high estimated soil moisture content value for the rest of the irrigation site. The entire irrigation site may receive too little water and the plant material may become stressed from too little water if the watering schedules are based on abnormally high estimated soil moisture content. If a conventional soil moisture based irrigation controller receives input from such an incorrectly located soil moisture sensor, the user can attempt to compensate by increasing the run times for each zone to compensate for the error. This is cumbersome and makes it difficult and frustrating for the user to adjust the conventional soil moisture based irrigation controller for optimum watering.

In another example, a solar radiation sensor 20 may be placed in an area that receives late afternoon shade. This will result in the calculation of an abnormally low estimated ET value. The entire irrigation site may receive too little water and the plant material may become stressed from too little water if the watering schedules are based on an abnormally low estimated ET. If a conventional ET based irrigation controller receives input from such an incorrectly located solar radiation sensor, the user can attempt to compensate by increasing the run times for each zone by modifying precipitation rates to compensate for the error. This is cumbersome and makes it difficult and frustrating for the user to adjust a conventional ET based irrigation controller for optimum watering.

An embodiment disclosed herein globally modifies the watering schedules of the stand alone irrigation controller 12 to compensate for these types of conditions. If at any time the user realizes that the property is receiving too little water, the user can simply manually change an overall watering adjustment feature. The overall watering adjustment feature is implemented as a simple plus or minus control via actuation of an assigned pair of the push buttons 128a-c. This changes the reference point of the ET or soil moisture requirement calculation either up or down. After this adjustment is made, the adjustment executed by the sensor control unit 16 references the new setting and then automatically compensates for under watering that would otherwise occur. Likewise, if the overall watering is too much for the irrigation site, the user can simply adjust the overall watering adjustment feature down and create a new lower reference for the automatic ET or soil moisture based adjustments. The overall watering adjustment feature makes it easy for the user to fine-tune the system to the particular requirements of the irrigation site. The overall watering adjustment feature can be indicated by showing "global adjustment," or "more/less, water +/−," or similar naming conventions. In embodiments where more than one sensor is installed, this feature can be used to modify each assigned sensor independently of the others. The overall watering adjustment feature of the sensor control unit 16 directly alters the station run times executed by the irrigation controller 12.

When the user makes overall watering adjustments by pressing plus or minus push buttons on the sensor control unit 16, this affects the irrigation value that is used to reset the seasonal adjustment in the irrigation controller 12. For example, when the user makes overall watering adjustments by pressing plus or minus push buttons on the soil moisture control unit 16, this affects the soil moisture requirement value that is used to reset the seasonal adjustment in the irrigation controller 12. In calculating the estimated soil moisture requirement value, the microcontroller 108 in the soil moisture control unit 16 uses only select data points as variables (soil moisture readings and optional temperature measurements) and uses other data points that may consist of preprogrammed constants, and/or data entered by the user that defines some one or more constants of the site.

In another example, when the user makes overall watering adjustments by pressing plus or minus push buttons on the ET control unit 16, this modifies a constant that is used in the calculating the seasonal adjust value. In calculating the estimated ET, the microcontroller 108 in the ET control unit 16 uses only select data points as variables (temperature and solar radiation) and uses other data points that may consist of pre-programmed constants, and/or data entered by the user that defines some one or more constants of the site. In an embodiment, estimated ET is calculated using the Penman-Monteith formula, taking into account geographical data for peak estimated summer ET.

Another feature provided by the sensor control unit 16 is an automatic shutdown feature for irrigation that overrides any scheduled run times. For example, a rain sensor in the weather station 20 can send signals to the ET control unit 16 representing the occurrence of a rain event. The ET control unit 16 will then signal the irrigation controller 12 to shut down and suspend any watering, regardless of any scheduled irrigation. In another example, many cities require that irrigation be automatically turned off in the event of a freeze condition because during a freeze or near freeze condition, irrigation may produce ice that can be dangerous to people walking or vehicles driving. A temperature sensor in the weather station 20 can detect a freeze or near freeze condition and the ET control unit 16 will signal the irrigation controller 12 to shut down, regardless of any scheduled irrigation.

The automatic shutdown feature of the sensor control unit 16 can be utilized in geographic areas where watering agencies and municipalities impose restrictions that limit the times when irrigation can occur. The user is able to enter a no-water window into the sensor control unit 16, which consists of the times when irrigation is not allowed to take place. When a no-water window is entered by the user, the sensor control unit 16 will signal the irrigation controller 12 to shut down, regardless of any scheduled irrigation. The sensor control unit 16 permits the irrigation controller 12 to return to its normal run mode after the selected no-water window time has elapsed. The irrigation controller 12 may have sensor input terminals, as in the case of the Pro-C™ irrigation controller, which can be used to shut down all watering on receipt of a shutdown command from the sensor control unit 16.

Figure 14A:
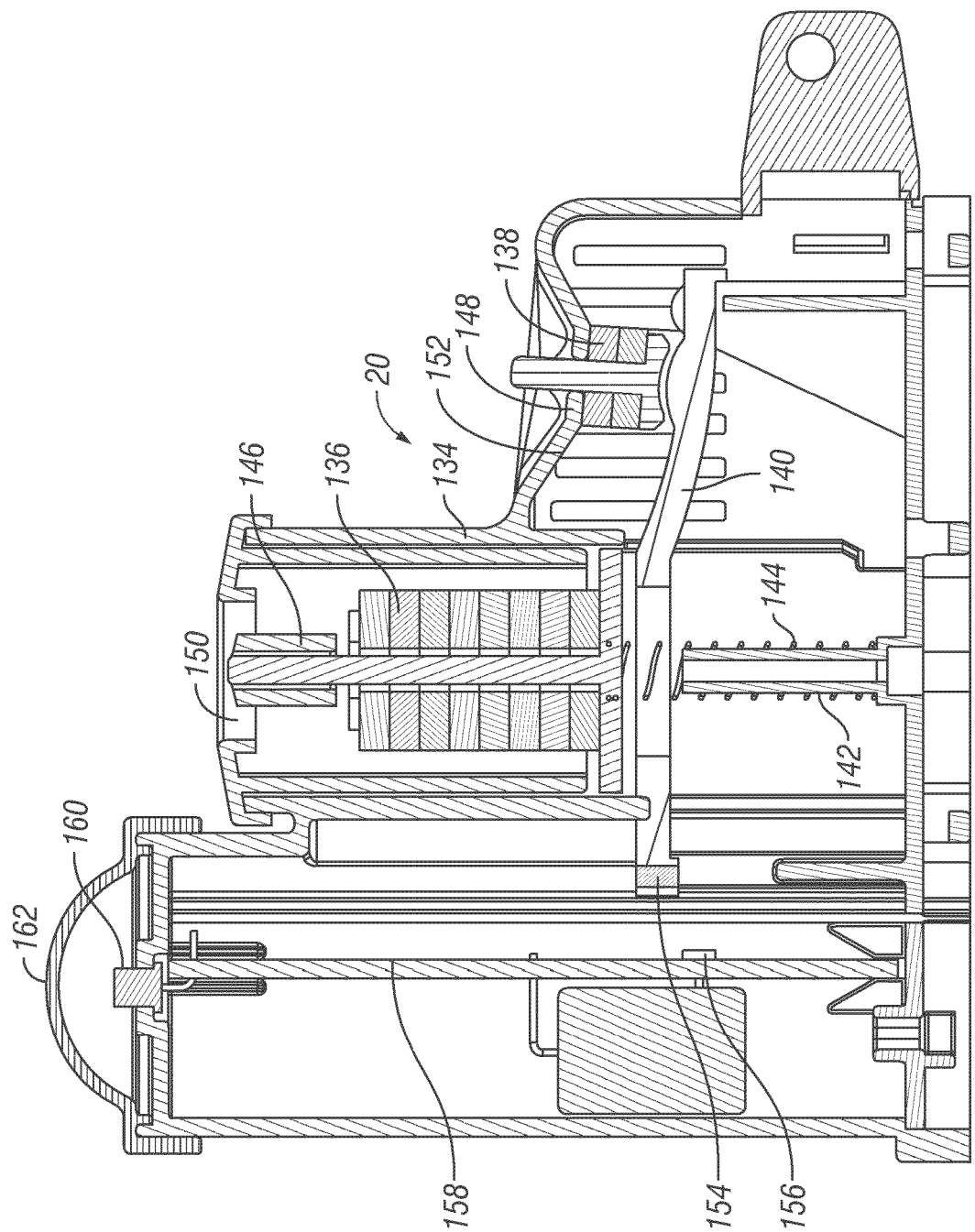
FIG. 14A is an enlarged vertical cross-section of a stand alone weather station, according to certain embodiments.
Figure 14B:
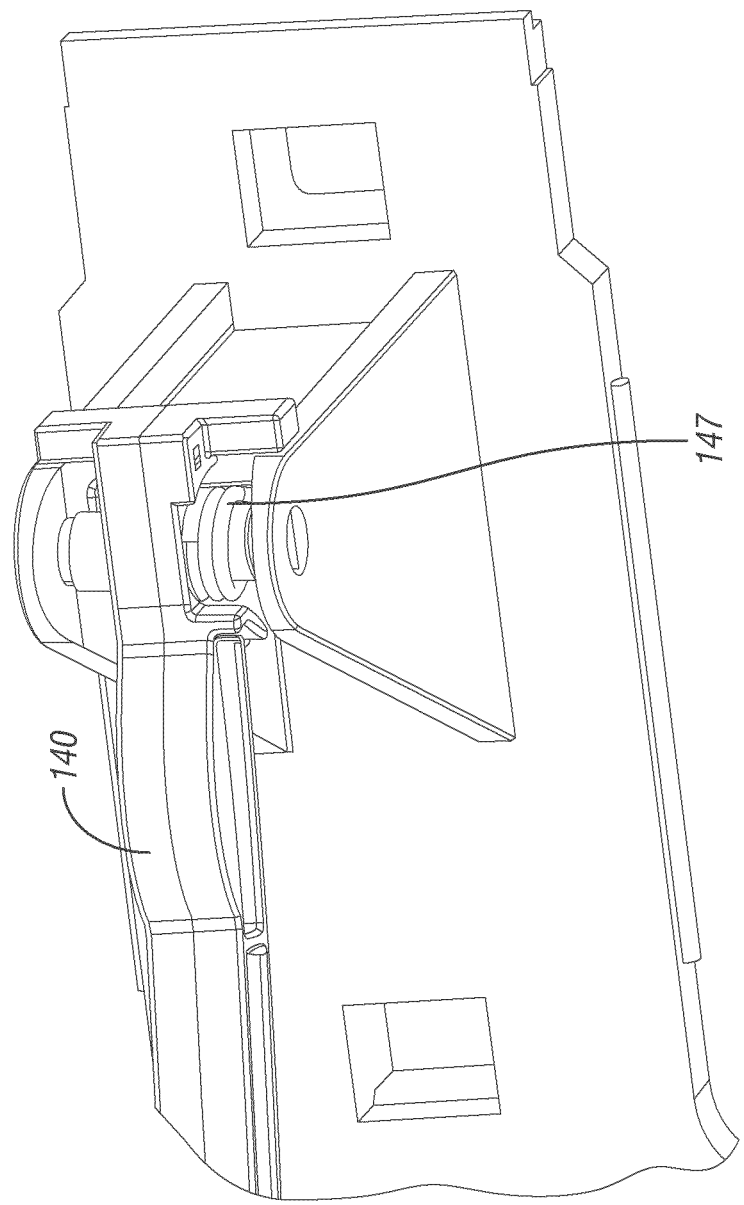
FIG. 14B is a fragmentary perspective view illustrating the spring biased arm of the stand alone weather station of FIG. 14A, according to certain embodiments.

FIG. 14A is an enlarged vertical cross-section of an embodiment of a stand alone weather station 20 and FIG. 14B is a fragmentary perspective view illustrating an embodiment of the spring biased arm of the stand alone weather station 20. The compact and inexpensive weather station 20 measures solar radiation, ambient air temperature, and detects a rain event. The weather station 20 is a one-piece unit that readily attaches to an exterior side of a building structure, a fence, or a rain gutter. The weather station 20 can be hard wired to the ET control unit 16 via cable 18, or the communications between the weather station 20 and the ET control unit 16 may take place via wireless communications link 24. The basic construction of the weather station 20 is similar to that disclosed in U.S. Pat. No. 6,570,109 granted May 27, 2003 to Paul A. Klinefelter et al. entitled QUICK SHUT-OFF EXTENDED RANGE HYDROSCOPIC RAIN SENSOR FOR IRRIGATION SYSTES, and U.S. Pat. No. 6,977,351 granted Dec. 20, 2005 to Peter J. Woytowitz entitled MOISTURE ABSORPTIVE RAIN SENSOR WITH SEALED POSITION SENSING ELEMENT FOR IRRIGATION WATERING PROGRAM INTERRUPT, the entire disclosures of both of which are incorporated herein by reference. Both of the aforementioned U.S. patents are assigned to Hunter Industries, Inc.

The weather station 20 includes an outer injection molded plastic housing 134 that encloses a pair of moisture absorbing members in the form of a larger stack 136 of moisture absorbing hygroscopic discs and a smaller stack 138 of moisture absorbing hygroscopic discs. These discs are typically made of untreated wood fibers pressed together into a material that resembles cardboard in appearance. One suitable commercially available hygroscopic material is Kraft Press Board which is made from cellulose pulp.

The stacks 136 and 138 of hygroscopic discs are supported on a common pivot arm 140 for vertical reciprocal motion relative to a vertical shaft 142 that extends through the arm 140. A coil spring 144 surrounds the shaft 142 and normally pushes the stack 136 upwardly against stop 146. A torsion spring 147 associated with the pivot axis of the arm 140 lifts the arm 140 and the stack 138 upward to a fixed stop (not illustrated). When rain water enters the housing 134 via aperture 150 and funnel 152 the hygroscopic discs of the stacks 136 and 138 absorb water and swell, pushing the arm 140 downwardly. A magnet 154 is mounted on one end of the arm 140. A stationary linear Hall effect sensor 156 mounted on a vertically mounted printed circuit board 158 generates a signal representative of the position of the magnet 154 that is proportional to the amount of rain water that has entered the weather station 20. The Hall effect sensor 156 may be provided by part number A1395SEHLT-T manufactured by Alegro. The small stack 138 absorbs water quickly via funnel 148 so that a rain event will be quickly detected. The large stack 136 dries out slowly so that the rain interrupt signal from the weather station 20 will not be terminated too quickly as the hydroscopic discs dry out. A solar radiation sensor 160 is mounted on one end of the printed circuit board 158 and receives solar radiation through a clear plastic dome 162 snap fit over the uppermost part of the housing 134. The solar radiation sensor 160 may be an industry standard PDB-C 131 photodiode with low current leakage.

Figure 15:
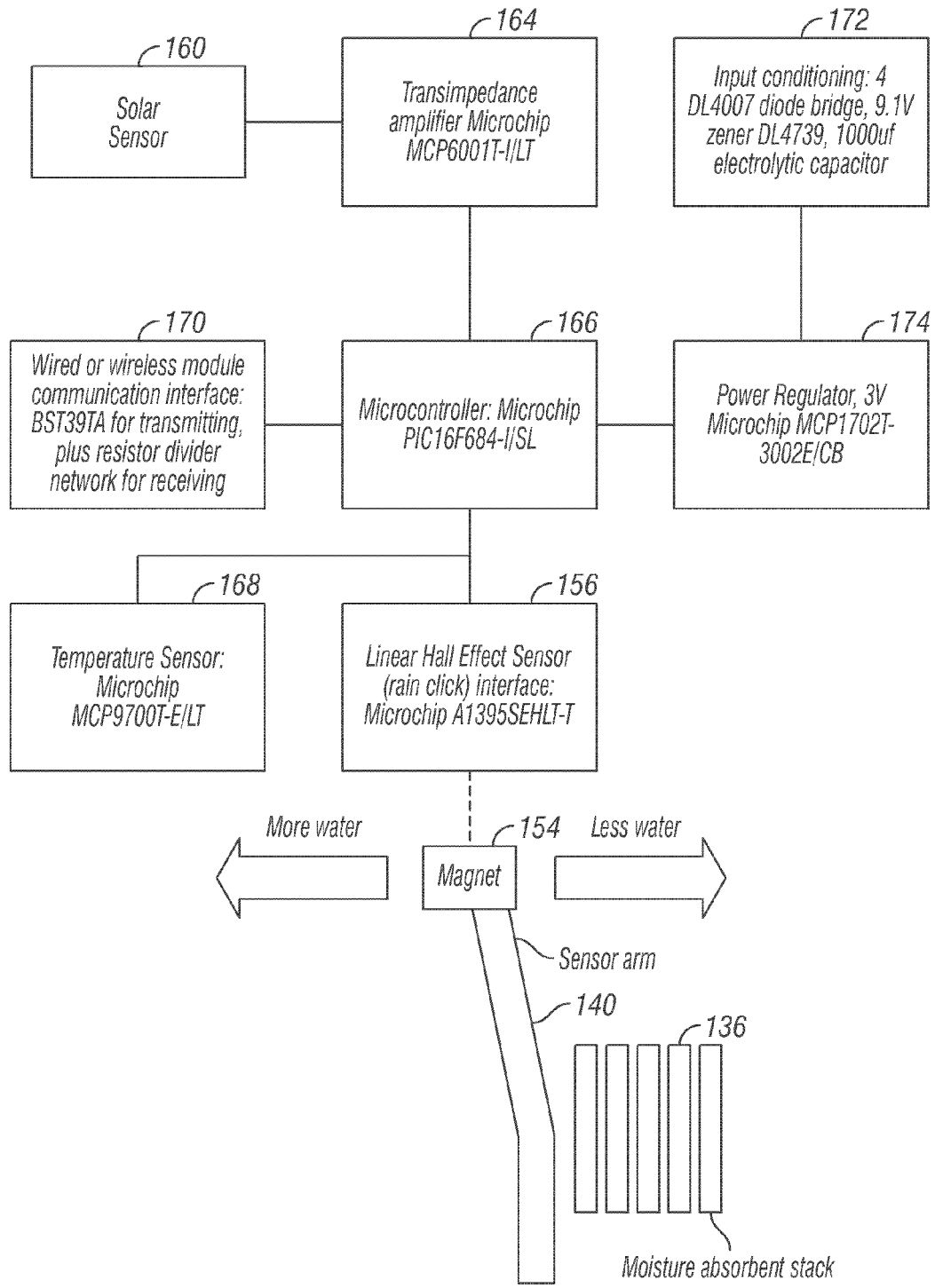
FIG. 15 is a block diagram illustrating the electronic portion of the stand alone weather station of FIG. 14A, according to certain embodiments.

FIG. 15 is a block diagram illustrating an embodiment of the electronic circuit of the stand alone weather station 20 that is mounted on the printed circuit board 158. The solar radiation sensor 160 which may comprise a PDB-C131 photodiode that is connected to a Microchip MCP6001T-I/LT transimpedance amplifier 164 that is in turn connected to a Microchip PIC-16F684-I/SL microcontroller 166. A Microchip MCP9700T-E/LT temperature sensor 168 with an ND interface is also connected to the microcontroller 166. The microcontroller 166 also receives the output signal from the Hall effect sensor 156. The Hall effect sensor 156 may comprise a Microchip A1395SEHLT-T Hall effect sensor and interface circuit. The communications interface 170 between the microcontroller 166 and the ET unit control 16 may be a hard wire interface, or more preferably, a wireless interface that may comprise a Microchip Technology RFPIC675 transmitter and a Maxim MAX1473 receiver. The transmitter sends signals representative of actual components of ET data across the irrigation site to the ET unit 16. Power for the hard wired weather station 20 is derived from the communications link to the ET unit control 16 and is fed to an input conditioner 172 which feeds a Microchip MCP1702T-3002E/CB power regulator 174. The power regulator 174 supplies three volt DC power to the microcontroller 166. Power for a wireless weather station is supplied by a dedicated battery (not illustrated) installed within the weather station.

Figure 16:
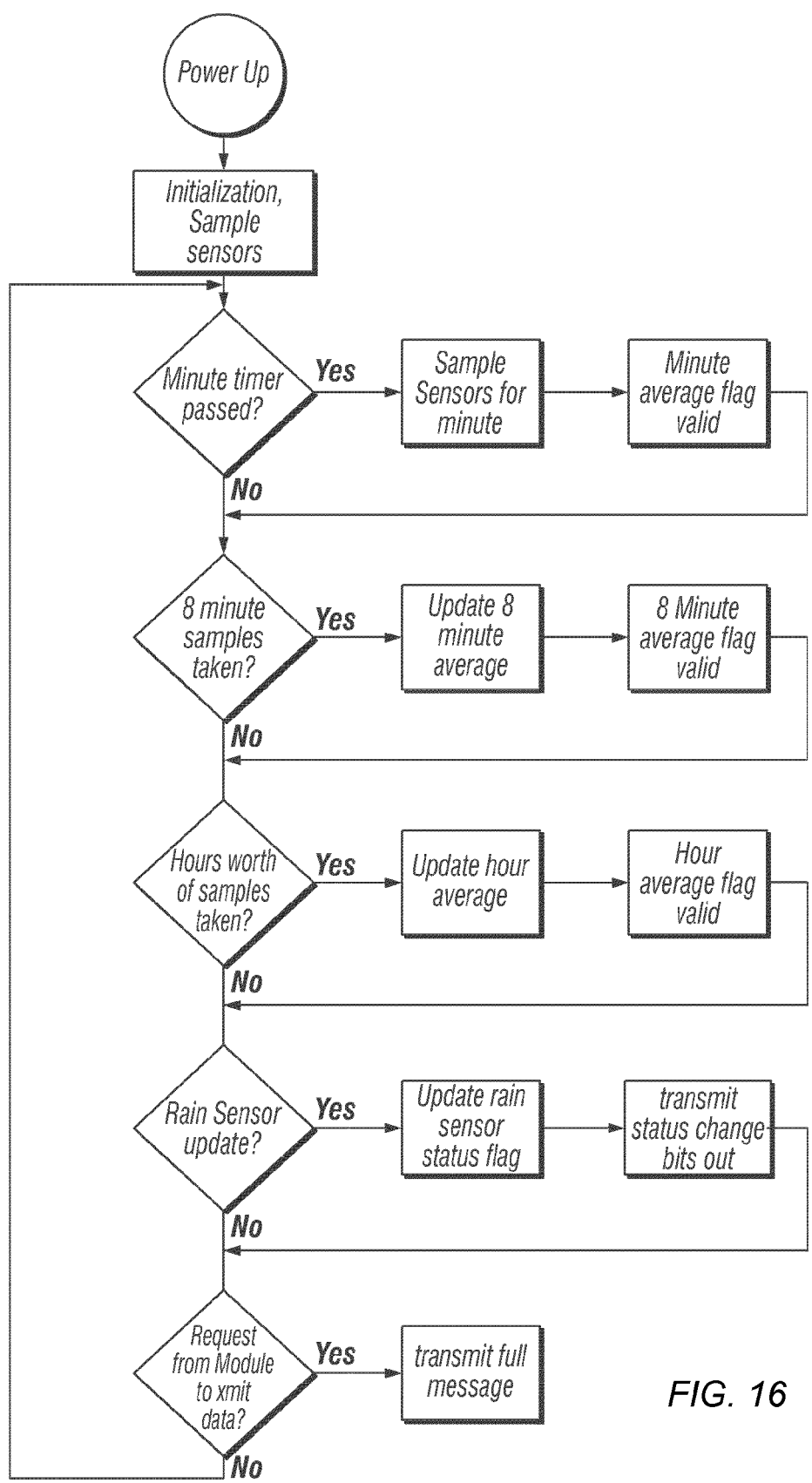
FIG. 16 is a flow diagram illustrating the operation of the stand alone weather station of FIG. 14A, according to certain embodiments.

FIG. 16 is a flow diagram illustrating an embodiment of the operation of the stand alone weather station 20. Firmware executed by the microcontroller 166 allows the weather station 20 to perform the logical operations illustrated in the flow diagram. These include periodic sampling of the outputs from the solar radiation sensor 162, temperature sensor 168 and Hall effect sensor 156, averaging readings, and responding to requests for sensor data that are periodically transmitted by the ET unit 16.

While a soil moisture sensor of any type can be combine with some intelligence (microcontroller) at the sensor itself, and made to communicate with the control unit via the MMBTA92 and LM393 as discussed earlier, it may be more cost effective to deal with the "raw" sensor interface, than to add this intelligence in every sensor. An example of this approach for a resistive soil moisture sensor 20 is illustrated in FIGS. 17 and 18.

Figure 17:
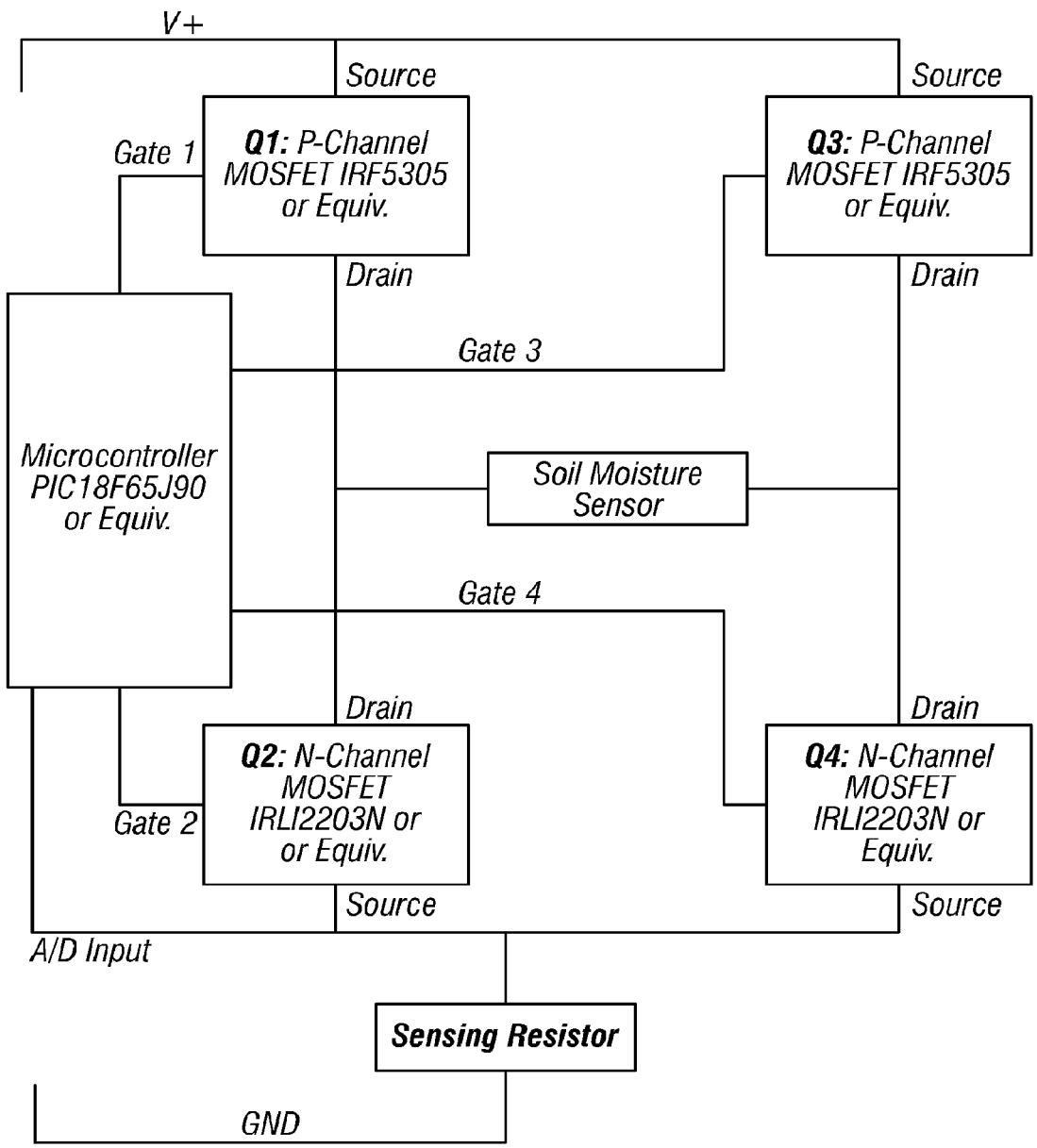
FIG. 17 is a schematic diagram of an interface circuit for use with a resistive soil moisture sensor, according to certain embodiments.
Figure 18:
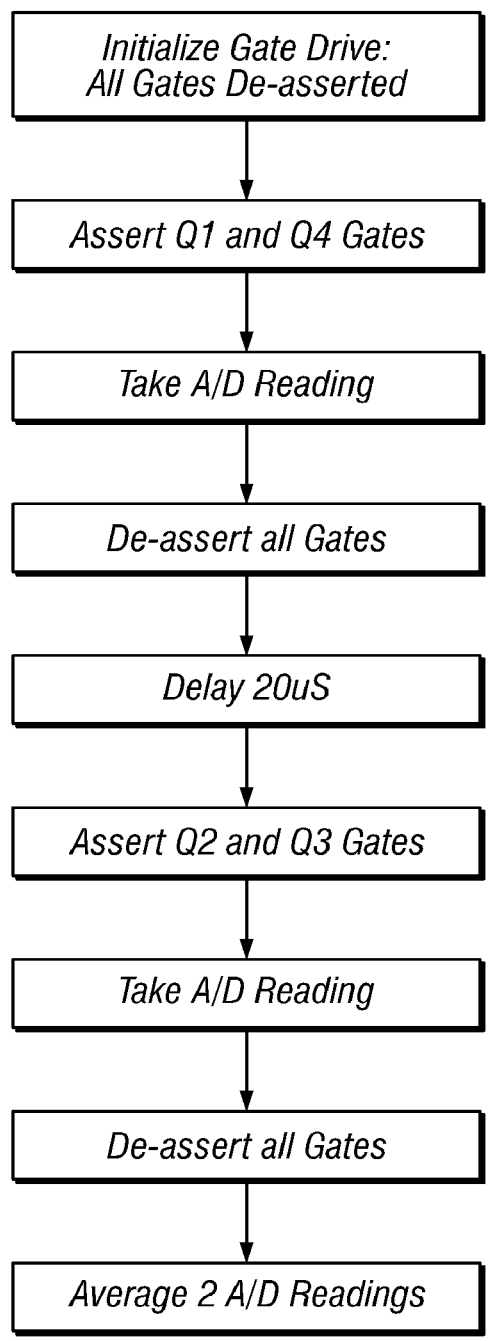
FIG. 18 is a flow diagram illustrating the operation of the interface circuit of FIG. 17, according to certain embodiments.

FIG. 17 is a schematic diagram of an embodiment of an interface circuit for use with a resistive soil moisture sensor and FIG. 18 is a flow diagram illustrating an embodiment of the operation of the interface circuit of FIG. 17. The resistive soil moisture sensor 20 varies its resistance based on the amount of moisture in the soil. It is very important that there be no DC potential between any metallic part of the sensor, and earth ground. If such a potential exists, the sensor will disintegrate due to the well-known process of galvanic corrosion.

Referring to FIG. 17, and the flowchart of FIG. 18, it will be understood that first transistors Q1 and Q4 turn ON, and the resistance of the sensor is measured using the sensing resistor and an A/D input of the microcontroller. Then, Q1 and Q4 are turned OFF and transistors Q2 and Q3 are turned ON and the measurement repeated. Both readings should be about the same, but are averaged to increase accuracy. During the first measurement, a DC voltage of one polarity is applied to the sensor. During the second measurement, an opposite polarity DC voltage is applied to the sensor. Thus the time-average DC voltage that the sensor sees is approximately zero. Furthermore, during the vast majority of the time, when no readings are being taken, all transistors are OFF and there is no potential on the sensor. This approach eliminates the galvanic corrosion that would otherwise occur.

The relationship of resistance to soil moisture is typically non-linear, thus the microcontroller can apply a polynomial expansion, or lookup table function to determine the amount of moisture in the soil from the resistance reading.

Figure 19A:
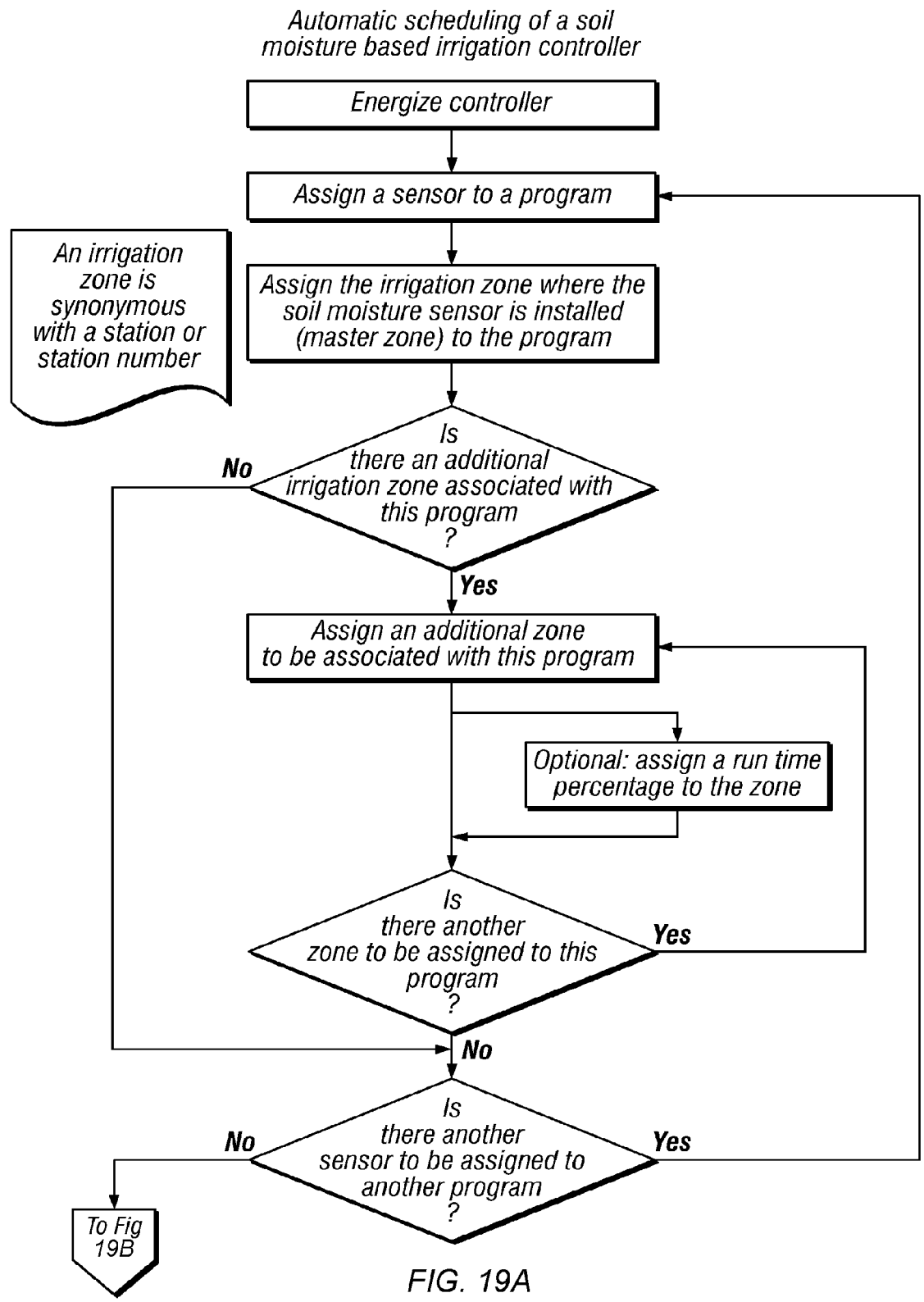
FIGS. 19A-19C are flow diagrams illustrating a method that may be employed by a soil moisture sensor based irrigation controller for automatically entering the watering schedule based on learned data, according to certain embodiments.
Figure 19B:
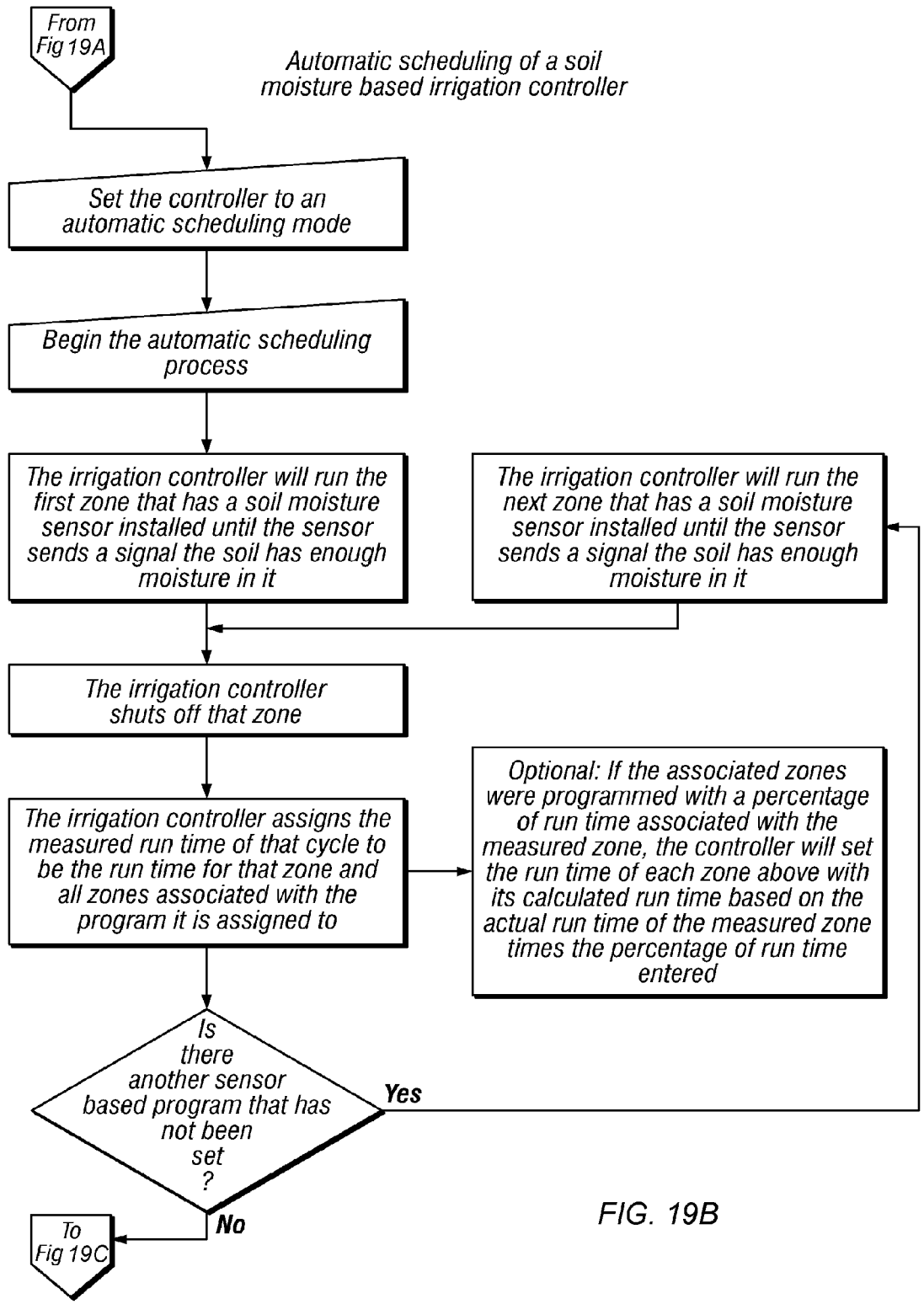
Figure 19C:
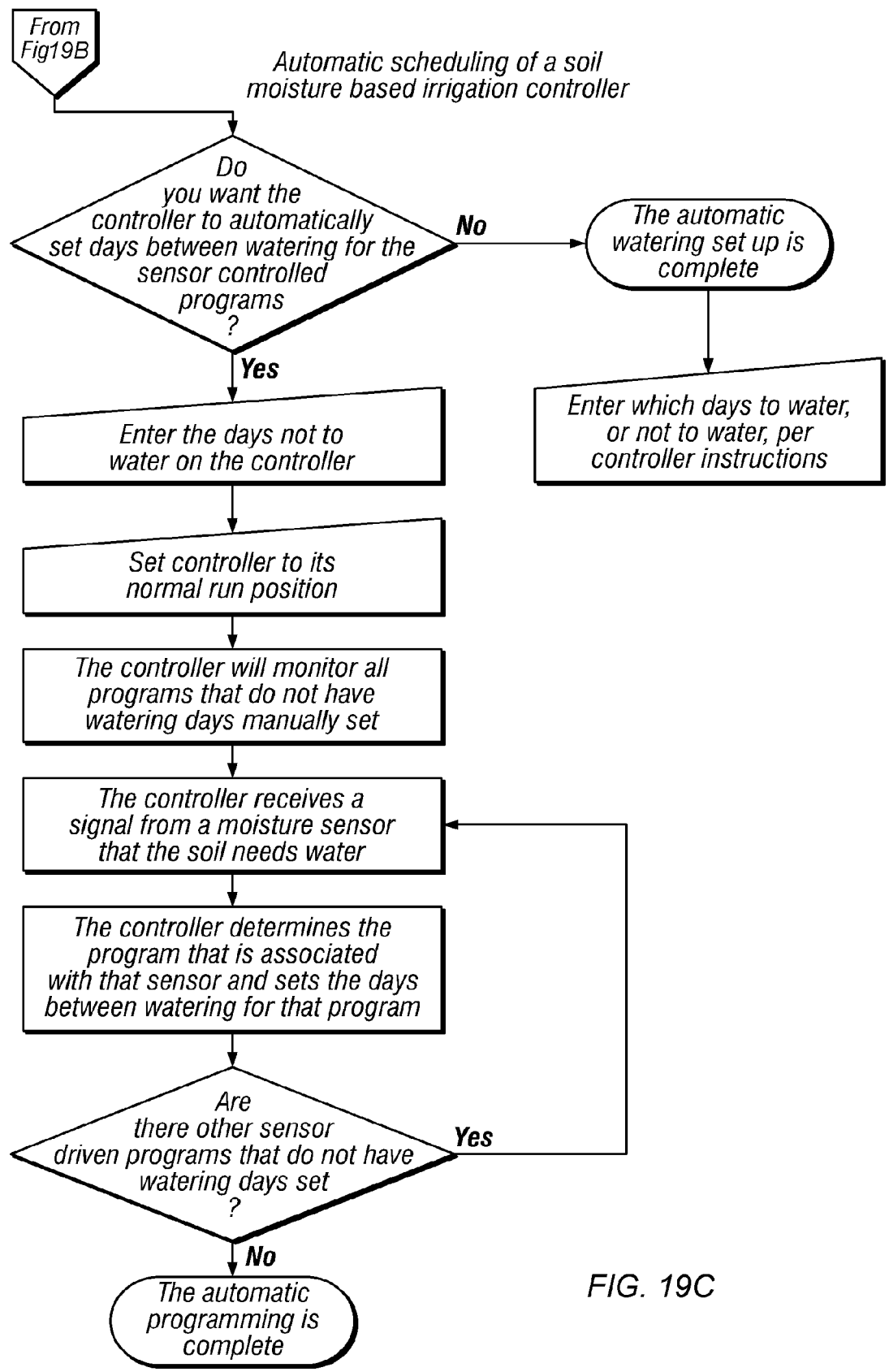

Embodiments also provides a unique method to automatically develop irrigation programs using soil moisture based control technology. FIGS. 19A-19C are flow charts that illustrate how an irrigation controller that uses soil moisture sensors can establish the irrigation programs automatically. The controller has the ability to automatically establish all of the watering schedules for each program that has a soil moisture sensor associated with it. After the user has completed the wiring and installation of all of the irrigation components and sensors, the user will do some simple entries on the controller to associate certain zones with certain programs. This may include the steps of assigning one or more master zones with each master zone having a soil moisture sensor communicating to it. Each master zone will be assigned to a program. Then the user then assigns associated zones to each program. The user may for example assign all of the stations that irrigate turf in the sun to one program. If all of the zones that irrigate turf in the sun have sprinklers that wet the area at the same precipitation rate, then only one sensor is necessary in only one of the zones. This zone is referred to as the master zone. Likewise, all stations that water turf in the shade may be assigned to another seasonal adjustment. This may continue to add other zones such as those used for potted plants, those used for planters with overhead watering, those used for planters with drip, those used for watering trees, etc. Each associated zone can be programmed to run the same time as the master zone, or a percentage higher or lower than the master zone. This allows the user to vary the times of each zone as may be required by different precipitation rates, or other environmental factors affecting that zone.

The method illustrated in FIGS. 19A-19C further includes the step of starting the controllers' irrigation in an automatic programming mode. In the automatic programming mode, the controller runs the first master zone until the soil moisture sensor senses that the soil is moist. The controller then sets this time as the run time for the first master zone and calculates the run time for each associated zone assigned to it. The controller repeats this function for each of the remaining master zones. Once the time values have been established for each of the zones, the user set the controller to run automatically. The controller will monitor each automatically programmed master zone to determine how many days it takes for the sensor to dry out. When each of the sensors sense that the zone associated with it is dry, the controller will set the delay time between watering values for that program and begin irrigating according to the watering schedule.

Figure 20A:
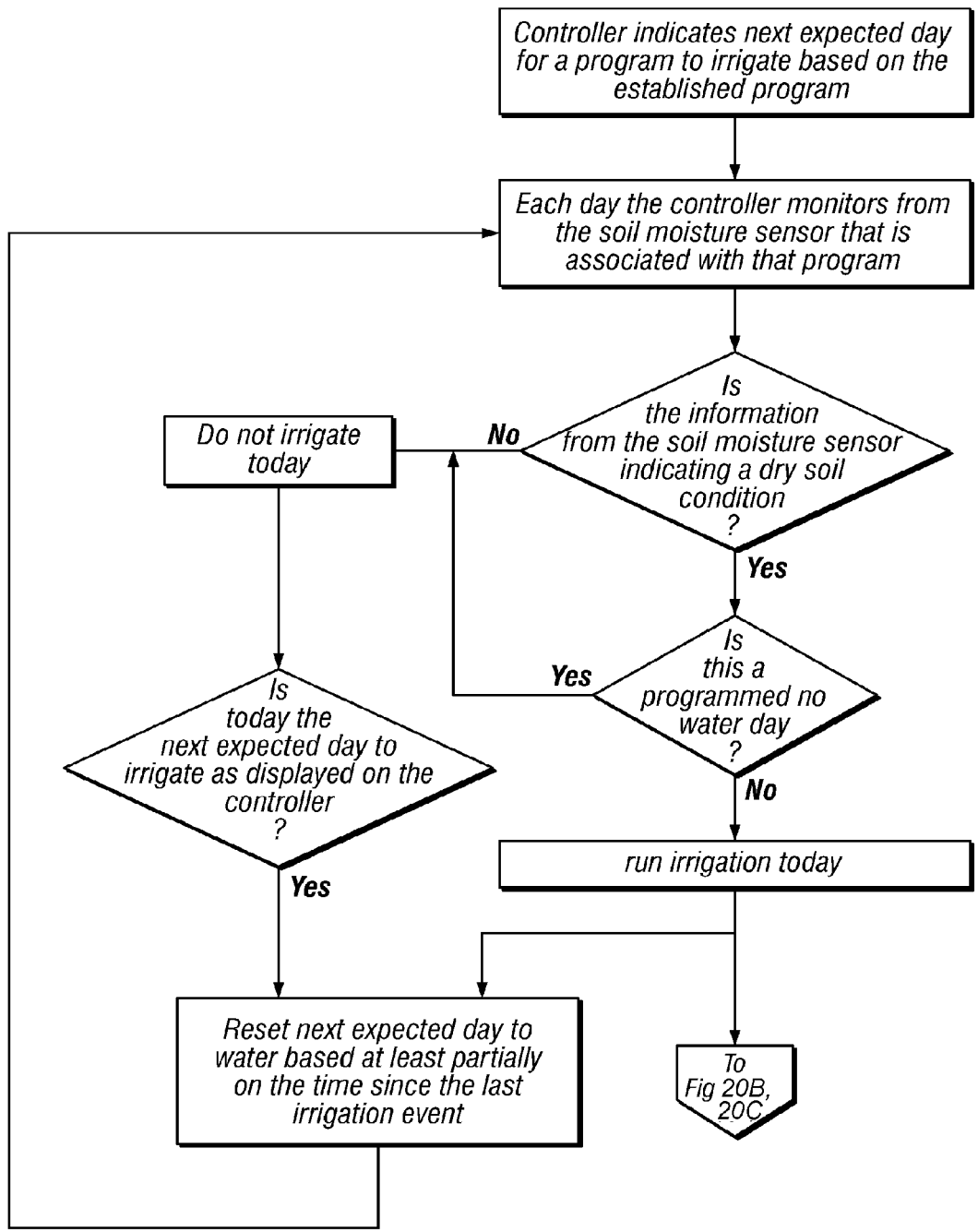
FIGS. 20A-20C are flow diagrams illustrating a method for automatically and continuously refining the watering schedules of a soil moisture based controller using learned data, according to certain embodiments.
Figure 20B:
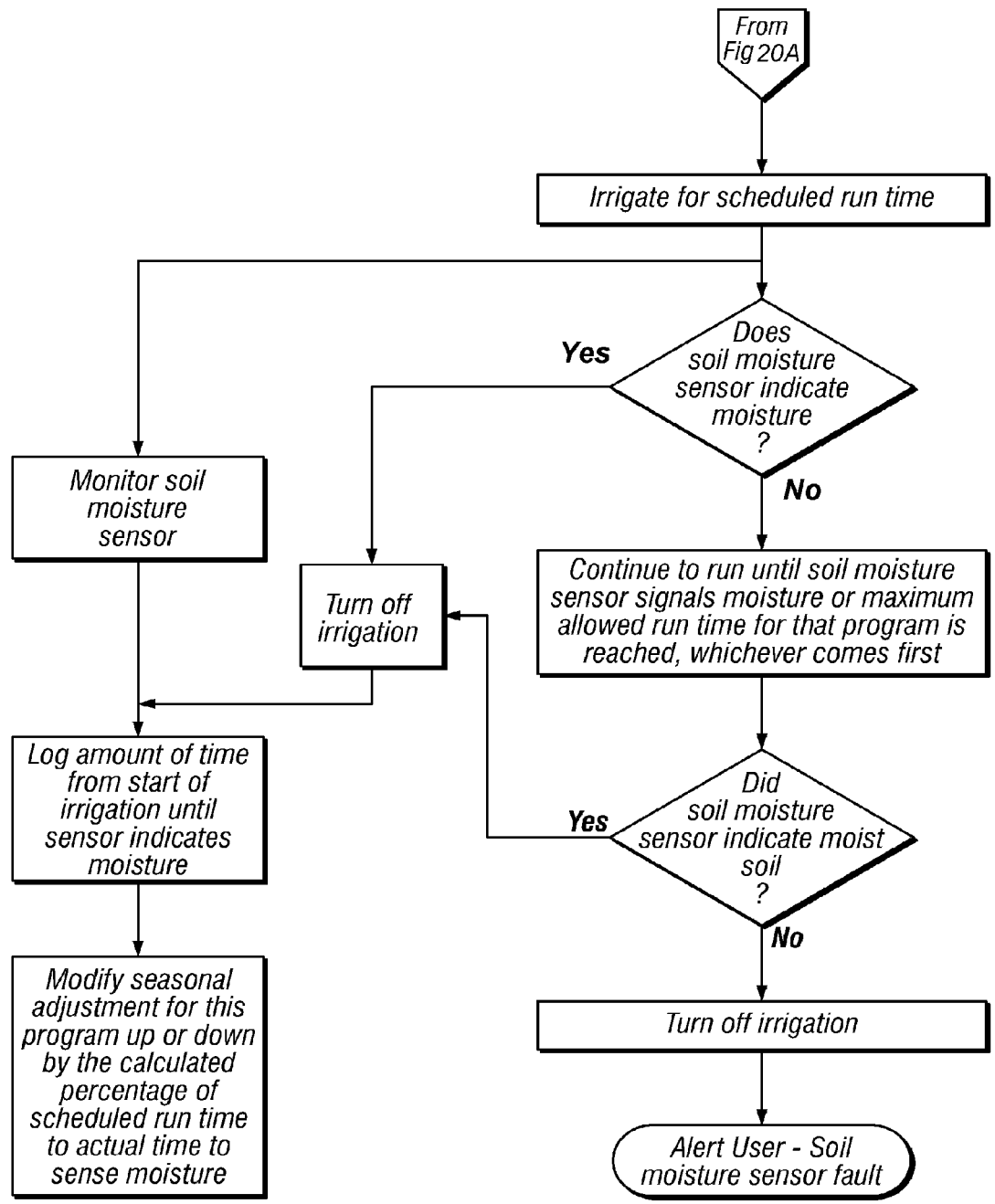
Figure 20C:
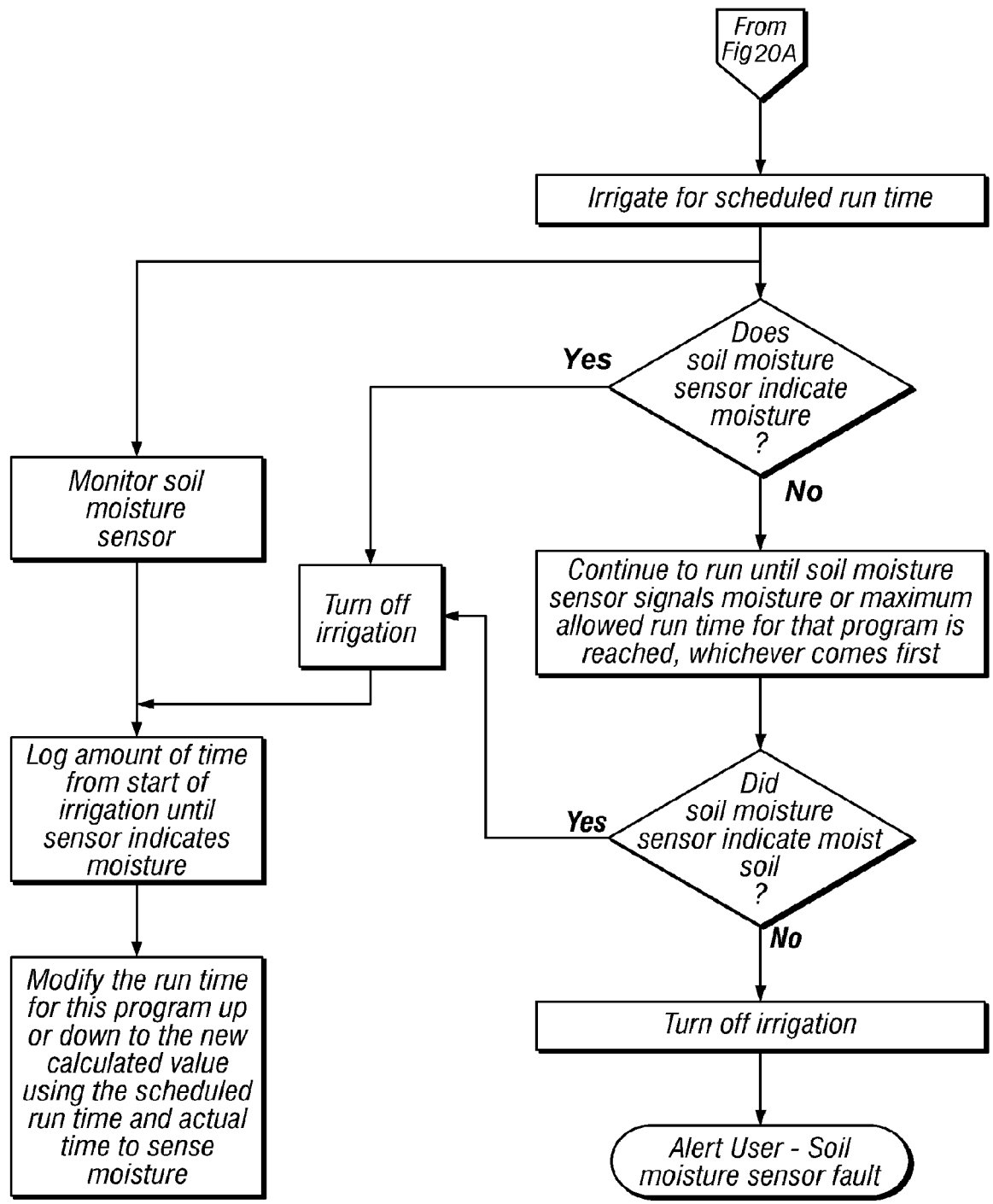

FIGS. 20A-20C are flow charts that illustrate how a soil moisture based controller can continuously monitor soil conditions and refine the irrigation schedule that was previously established. In normal operation, the controller may indicate an expected delay between watering days and display an expected next day to water that the user can view. The actual next day to water is ultimately determined by actual measurements of the soil moisture sensor. The station will actually water when the soil moisture sensor signals that the soil is dry. Factors that may affect the actual watering day include rain, manual watering, or excessive depletion of moisture from the soil because of hot or dry weather conditions. When each of the sensors sense that the zone associated with it is dry, the controller will set the delay time between watering values for that zone and begin irrigating according to the watering schedule. The amount of time that the stations waters may be adjusted regularly based on actual measurements of time required for the soil moisture sensor to send the signal that the soil is moist. This adjustment may be made through the seasonal adjustment feature or as a direct numerical value based on the measured time. A maximum run time can be entered for each zone either manually or automatically. This will prevent that zone from excessive over watering in the event a sensor fails, or the controller does not receive the signal from the sensor because of wiring or other communication problems.

Thus embodiments described herein can automatically generate a watering schedule where one does not exist at all through a self-teaching routine. The system can continuously modify the automatically generated watering schedule in addition to modifying the seasonal adjustment. Air and/or soil temperature can optionally be added to the calculations. The system includes the ability for the operator to manually set an overall watering adjustment feature to modify the adjustments normally made by the system to compensate for factors such as shade, excess sun, less than ideal installations, etc. The system can also include an automatic irrigation shut-off over ride feature to meet local municipality requirements.

FIGS. 21A-21H are embodiments of an irrigation system comprising the stand alone irrigation controller 12 connected via cable 14 to the stand alone sensor control unit 16 that is in turn connected via cable 18 to a plurality of sensors 20, where the plurality of sensors 20 comprise a plurality of soil moisture sensors 20.

Figure 21A:
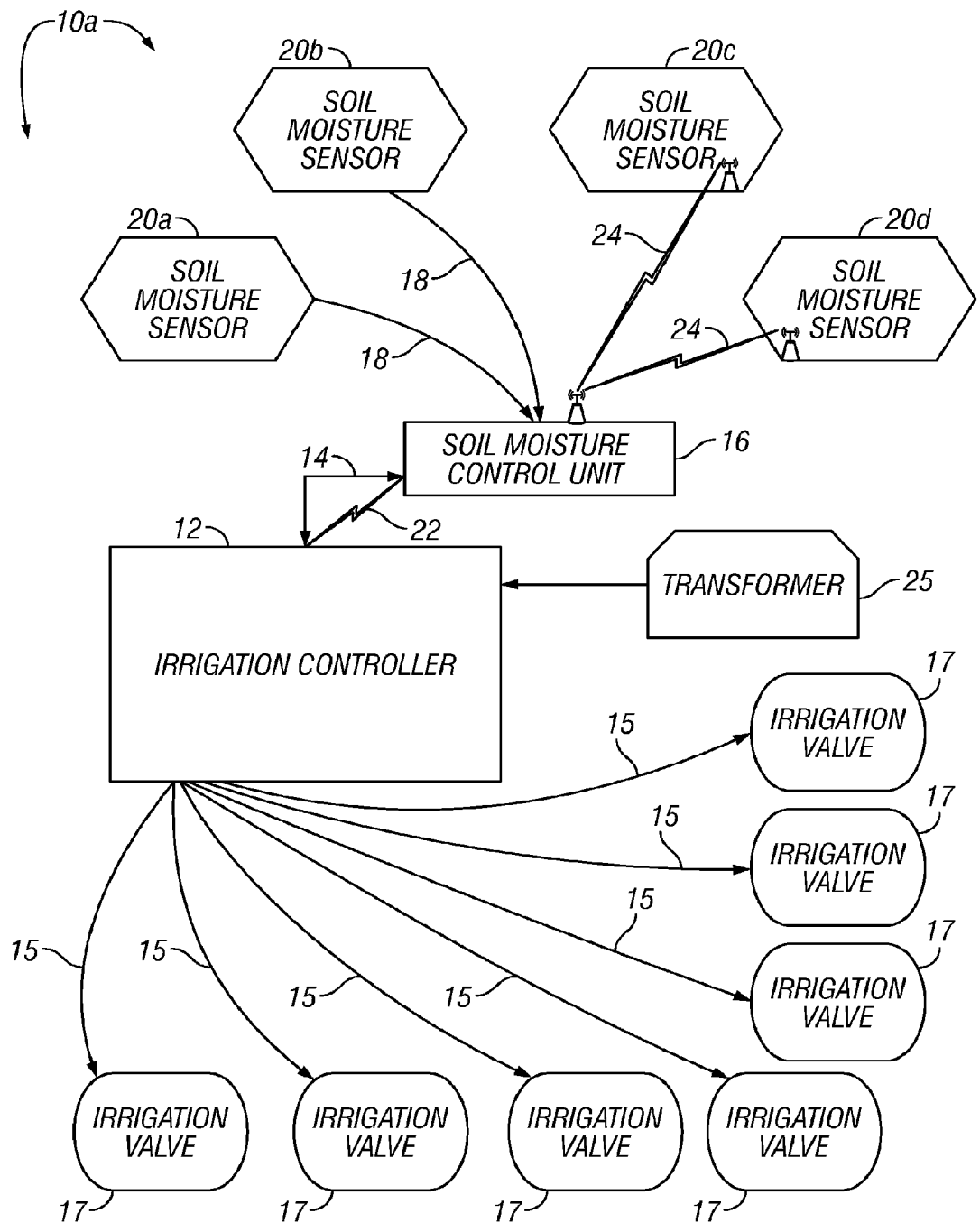
FIG. 21A is a simplified block diagram of an irrigation system using a stand alone irrigation controller, and a soil moisture sensor control unit with each soil moisture sensor communicating directly to the soil moisture control unit, according to an embodiment.

Referring to FIG. 21A, an irrigation system 10a comprises a stand alone irrigation controller 12 connected via cable 14 to a stand alone soil moisture control unit 16 that is in turn connected via buried multi-wire cables 18 to a plurality of soil moisture sensors 20a-20b. It will be understood that the many advantages of the present invention can be achieved with a single soil moisture sensor, however, multiple soil moisture sensors are preferred. FIG. 21A illustrates various means for communication between the soil moisture sensors 20a-d and the soil moisture sensor control unit 16. The controller 12, soil moisture unit 16 and one or more soil moisture sensors 20c and 20d exchange data and commands via wireless communication links 22 and 24.

The stand alone irrigation controller 12 (FIG. 21A) and soil moisture control unit 16 would typically be mounted in a garage or other protected location, although they can have a waterproof construction that allows them to be mounted out of doors. The soil moisture sensors 20a-d are typically mounted in the ground at places that represent the typical moisture content of the irrigated areas. The cables 14 and 18 typically include copper wires so that power can be supplied to the soil moisture control unit 16 and the soil moisture sensor 20 from the irrigation controller 12. Data and commands are sent on other copper wires in the cables. Fiber optic cables can also be utilized for sending data and commands. Optionally, the soil moisture sensors 20a-d may receive their power via battery when only the data is sent over the connecting wire 18 or the radio links 24.

A transformer 25 (FIG. 21A) that plugs into a standard household 110VAC duplex outlet supplies 24VAC power to the stand alone irrigation controller. In its preferred form, the irrigation system 10a employs a hard wired communication link 14 between the stand alone irrigation controller 12 and the stand alone soil moisture control unit 16 that are normally mounted adjacent one another, such as on a garage wall. Hard wired communication links 18 are provided between the stand alone soil moisture control unit 16 and the soil moisture sensors 20a and 20b, and wireless communication links 24 are provided between the stand alone soil moisture control unit and the soil moisture sensors 20c and 20d. The stand alone soil moisture control unit 16 may be manufactured in a form factor that is small enough to fit inside the open space of the irrigation controller 12. One or more solenoid actuated irrigation valves 17 are connected to outputs of the stand alone irrigation controller using buried multi-wire cable 15 or other suitable wires.

Figure 21B:
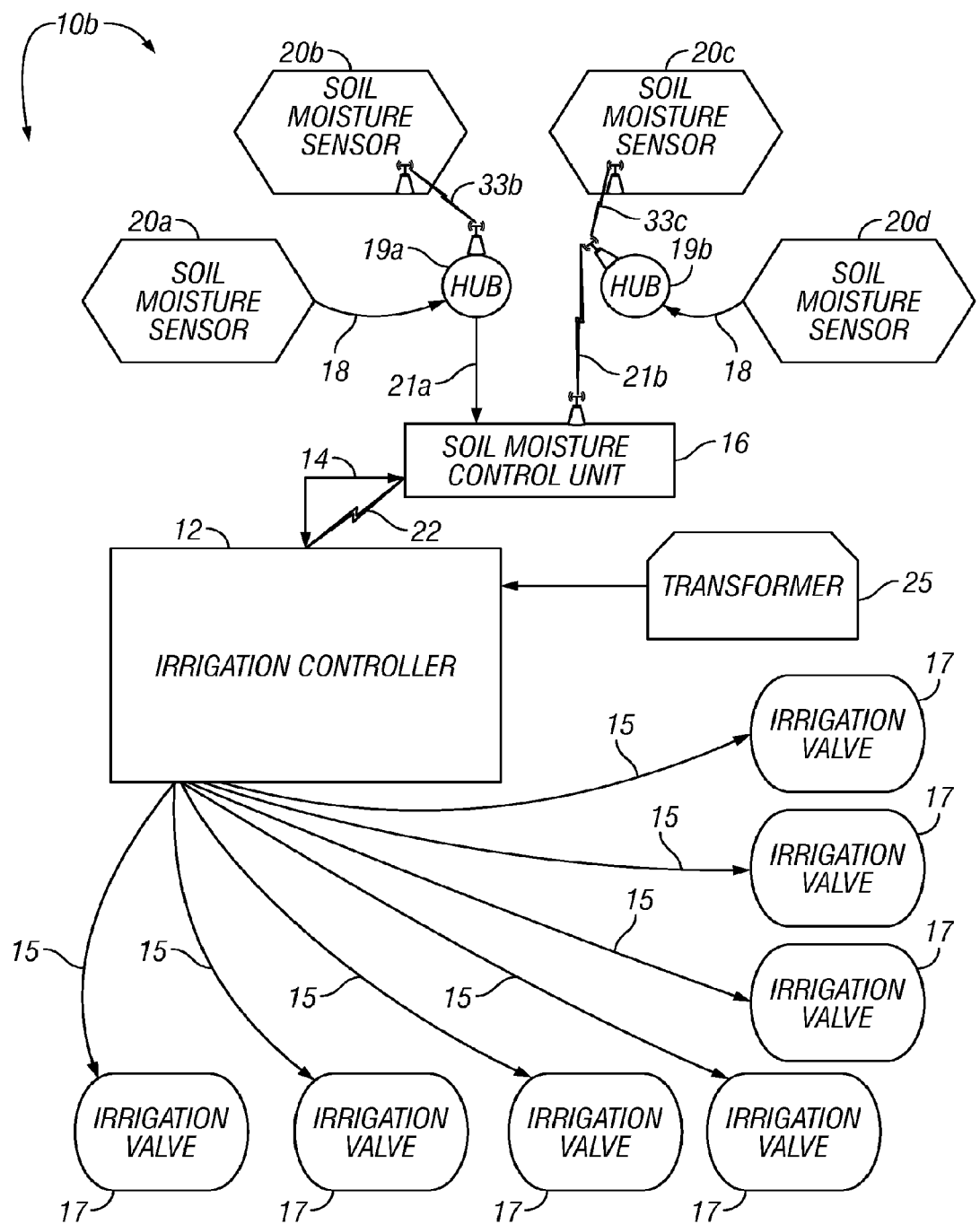
FIG. 21B is a simplified block diagram of an irrigation system using a stand alone irrigation controller, and a soil moisture sensor control unit with each soil moisture sensor communicating through a communication hub to the soil moisture control unit, according to another embodiment.

Referring to FIG. 21B, an irrigation system 10b comprises a stand alone irrigation controller 12 connected via cable 14 to a stand alone soil moisture control unit 16. This figure illustrates alternate means for communication to and from the soil moisture sensors 20a-d and the soil moisture sensor control unit 16 through communications hubs 19(a-b). Soil moisture control unit 16 is connected via cable 21a to a communications hub 19a. Communications hub 19a is connected to soil moisture sensor 20a using cable 18 and wireless connection 33b is used to communicate with soil moisture sensor 20b. Soil moisture sensors 20c and 20d communicate with communications hub 19b using wireless connection 33c and cable 18 respectively. Communications hub 19b communicates through wireless link 21b to the soil moisture control unit 16. The controller 12 and soil moisture control unit 16 would typically be mounted in a garage or other protected location, although they can have a waterproof construction that allows them to be mounted out of doors. The soil moisture sensors 20a-d are typically mounted in the ground at places that represent the typical moisture content of the irrigated areas. The cables 14, 18 and 21a typically include copper wires so that power can be supplied to the soil moisture control unit 16, communications hub 19a, and the soil moisture sensor 20a from the irrigation controller 12. Data and commands are sent on other copper wires in the cables. Fiber optic cables can also be utilized for sending data and commands. Alternately, these same devices may be powered by one or more batteries (not illustrated).

Soil moisture sensors 20b and 20c (FIG. 21B) and wireless communications hub 19b may be powered by batteries (not illustrated), or other power source, as they utilize wireless communications. A transformer 25 that plugs into a standard household 110VAC duplex outlet supplies 24VAC power to the stand alone irrigation controller 12. In its preferred form, the irrigation system 10b employs a hard wired communication link 14, between the stand alone irrigation controller 12 and the stand alone soil moisture control unit 16 that are normally mounted adjacent one another, such as on a garage wall, and a hard wired communication link 21a between the stand alone soil moisture control unit 16 and the communications hub 19a. Hard wired communications 18 or wireless communication links 33b-c provides communication channels to the soil moisture sensors 20a-d to the communication hubs 19*a* and 19*b*. Hardwire communications cable 21*a* or wireless communication link 21*b* provides communication channels to the communication hubs 19*a* and 19*b* respectively. The soil moisture control unit 16 may be manufactured small enough to fit inside the open space of the irrigation controller 12. Irrigation valves 17 are connected to the output of the irrigation controller using wires 15.

Figure 21C:
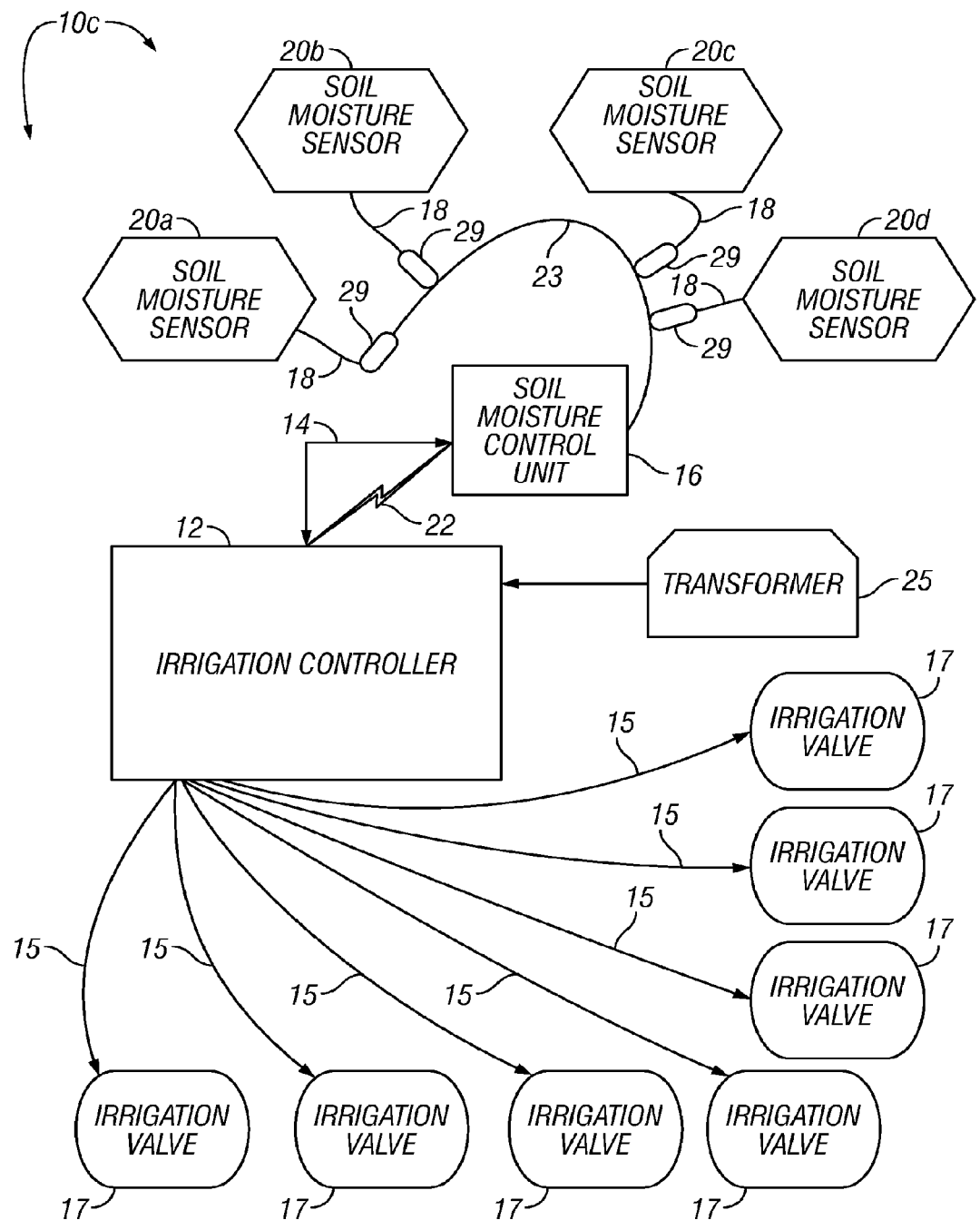
FIG. 21C is a simplified block diagram of an irrigation system using a stand alone irrigation controller, and a soil moisture sensor control unit with each soil moisture sensor communicating to the soil moisture control unit through a multi-wire cable using encoder and decoder circuitry, according to another embodiment.

Referring to FIG. 21C, an irrigation system 10*c* comprises a standalone irrigation controller 12 connected via cable 14 to a standalone soil moisture control unit 16 that is in turn connected via a multi wire cable 23 to one or more decoder modules 24. Each soil moisture sensor 20*a-d* is connected to a decoder module 29 via sensor wiring 18. Optionally, the decoder module 29 may be built into the housings of the soil moisture sensors 20*a-d* to allow connection directly to cable 23. The controller 12 and soil moisture control unit 16 would typically be mounted in a garage or other protected location, although they can have a waterproof construction that allows them to be mounted out of doors.

In the embodiment of the irrigation system 10*c*, the soil moisture sensors 20*a-d* are typically mounted in the ground at places that represent the typical moisture content of the irrigated areas. The cables 14 and 18 typically include copper wires so that power can be supplied to the soil moisture control unit 16 and the soil moisture sensor 20 from the irrigation controller 12. Data and commands may be sent on the same power wires, or on other copper wires in the cables. Fiber optic cables can also be utilized for sending data and commands. The multi conductor cable 23 connects to anyone of a multiple number of decoder modules 29. The decoder modules each have an individual address assigned to them. Any data transmitted by the cable 23 includes and address message packet in the communications that identify which sensor the data is coming from or being sent to. This allows for many sensors to be installed over a large are using only a single two or three wire cable 23, thus potentially saving thousands of feet of wire and the related labor to install it. A transformer 25 that plugs into a standard household 110VAC duplex outlet supplies 24VAC power to the stand alone irrigation controller 12.

In an embodiment, the irrigation system 10*c* (FIG. 21C) employs a hard wired communication link 14 between the stand alone irrigation controller 12 and the stand alone soil moisture control unit 16 that are normally mounted adjacent one another, such as on a garage wall, and hard wired decoder system consisting of wire cable 23 and decoder modules 24 between the stand alone soil moisture control unit 16 and the soil moisture sensors 20*a-d*. The soil moisture control unit 16 may be manufactured small enough to fit inside the open space of the irrigation controller 12. One or more irrigation valves 17 are connected to the output of the irrigation controller using multi wire cable 15 or other suitable individual wires.

Figure 21D:
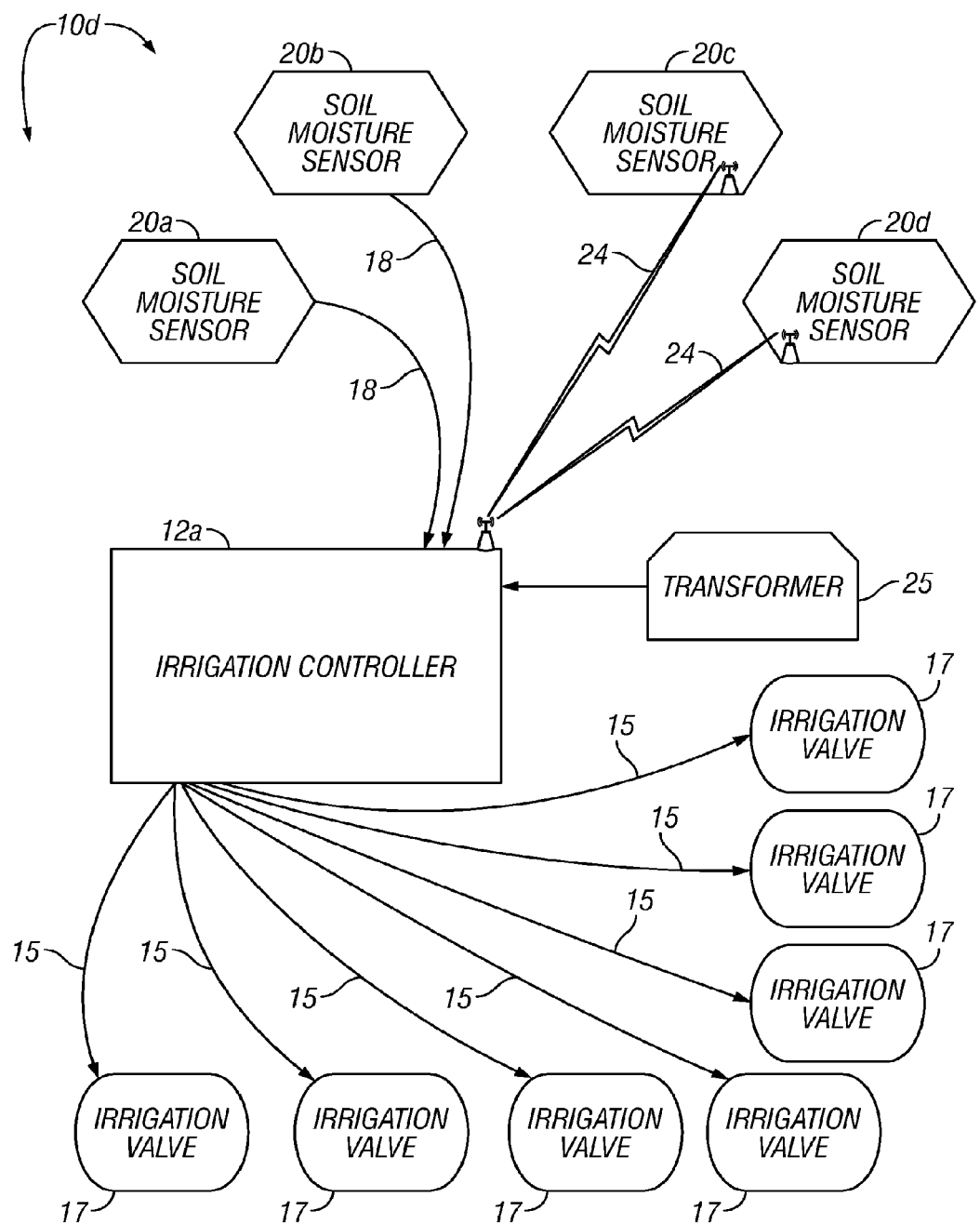
FIG. 21D is a simplified block diagram of an irrigation system using a stand alone irrigation controller with integrated soil moisture control capabilities with each soil moisture sensor communicating directly to the irrigation controller, according to another embodiment.

Referring to FIG. 21D, a modified stand alone irrigation controller 12*a* internally contains similar electronics and logic and/or firmware similar to that of the stand alone controller 12 and the stand alone soil moisture control unit 16 of FIG. 21A. FIG. 21D illustrated multiple means for communications to and from the soil moisture sensors 20*a-d* and the stand alone irrigation controller 12*a*. The stand alone irrigation controller 12*a* is in connected via multi-wire cables 18 to one or more soil moisture sensors 20*a-b*. The stand alone irrigation controller 12*a* and one or more soil moisture sensors 20*c* and 20*d* may exchange data and commands via wireless communication links 24. The stand alone irrigation controller 12*a* and would typically be mounted in a garage or other protected location, although it can have a waterproof construction that allows it to be mounted out of doors.

In the embodiment of the irrigation system 10*d* (FIG. 21D) the soil moisture sensors 20*a-d* are typically mounted in the ground at places that represent the typical moisture content of the irrigated areas. The cables 18 typically include copper wires so that power can be supplied to the soil moisture sensors 20*a-b* from the stand alone irrigation controller 12*a*. Data and commands may be sent on the same power wires or on other copper wires in the cables. Fiber optic cables can also be utilized for sending data and commands. Optionally, the soil moisture sensors 20*a-d* may receive power via a battery where only the data is sent over the connecting wires 18 or the radio links 24. A transformer 25 that plugs into a standard household 110VAC duplex outlet supplies 24VAC power to the stand alone irrigation controller 12*a*. In its preferred form, the irrigation system 10*d* employs the irrigation controller 12*a* and hard wired communication links 18*a*-18*b* between the irrigation controller 12*a* and the soil moisture sensors 20*a*-20*b*, or by wireless communication links 24 of soil moisture sensors 20*c* and 20*d*. The stand irrigation controller 12*a* may be "purpose built" to work with soil moisture sensors 20*a-d* or it may be manufactured as a more generic irrigation controller that is designed to accept a plug-in module that adapts it to work with soil moisture sensors 20*a-d*. One or more irrigation valves 17 are connected to the output of the irrigation controller using multi wire cable 15 or other suitable individual wires.

Figure 21E:
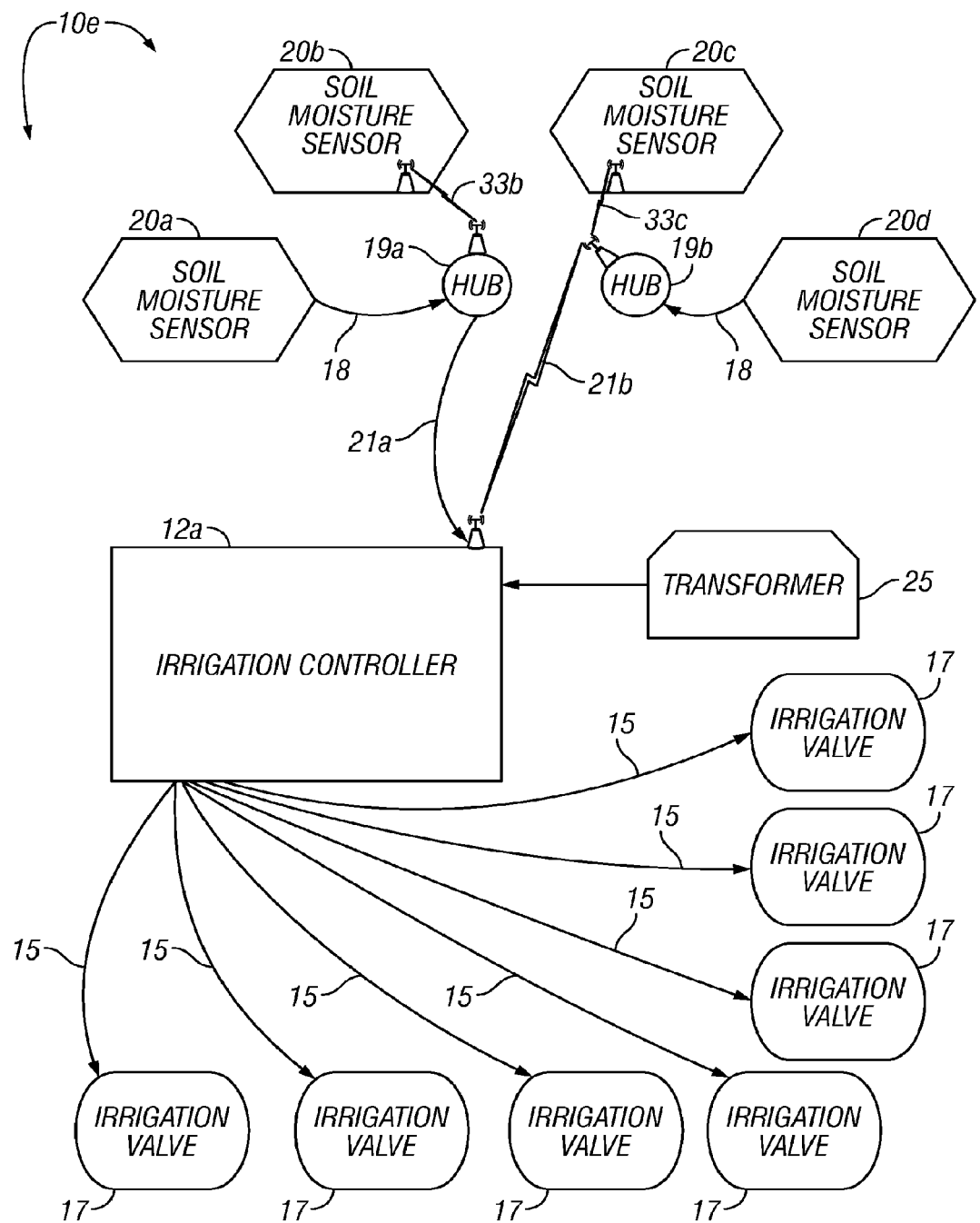
FIG. 21E is a simplified block diagram of an irrigation system using a stand alone irrigation controller with integrated soil moisture control capabilities with each soil moisture sensor communicating with the irrigation controller through a multi wire cable, according to another embodiment.

Referring to FIG. 21E, a standalone irrigation controller 12*a* internally contains electronics and logic and/or firmware similar to that of the standalone controller 12 of FIG. 21A and the attached soil moisture control unit 16 of FIG. 21A. FIG. 21E illustrates multiple means for communication to and from the soil moisture sensors 20*a-d* and the irrigation controller 12*a* through communications hubs 19*a-b*. The irrigation controller 12*a* is connected via cable 21*a* to a communications hub 19*a*. Communications hub 19*a* is connected to soil moisture sensor 20*a* using cable 18*a* and wireless connection 33*b* is used to communicate with soil moisture sensor 20*b*. Soil moisture sensors 20*c* and 20*d* communicate with wireless communications hub 19*b* using wireless connection 33*c* and cable 18*d* respectively. Communications hub 19*b* communicates through wireless link 21*b* to the soil moisture controller 12*a*.

In the system 10*e* (FIG. 21E) the controller 12*a* would typically be mounted in a garage or other protected location, although it can have a waterproof construction that allows it to be mounted out of doors. The soil moisture sensors 20*a-d* are typically mounted in the ground at places that represent the typical moisture content of the irrigated areas. The cables 18 and 21*a* typically include copper wires so that power can be supplied to the communications hub 19*a* and the soil moisture sensor 20*a* from the irrigation controller 12*a*. Data and commands may be sent on other copper wires in the cables. Fiber optic cables can also be utilized for sending data and commands. Alternately, these same devices may be powered by one or more batteries (not shown). Soil moisture sensors 20*b* and 20*c* and wireless communications hub 19*b* may be powered by batteries (not shown), or another power source, as they utilize wireless communications. A transformer 25 that plugs into a standard household 110VAC duplex outlet supplies 24VAC power to the stand alone irrigation controller 12*a*.

In an embodiment, the irrigation system 10*e* (FIG. 21E) employs hard wired communications 18 or wireless communication links 33*b-c* between the soil moisture sensors 20(*a-d*) and the communication hubs 19*a* and 19*b*. Hardwire communications cable 21a or wireless communication link 21b provides communication channels between the communication hubs 19a and 19b respectively and the irrigation controller 12a. Irrigation valves 17 are connected to the output of the irrigation controller 12 using wires 15.

Figure 21F:
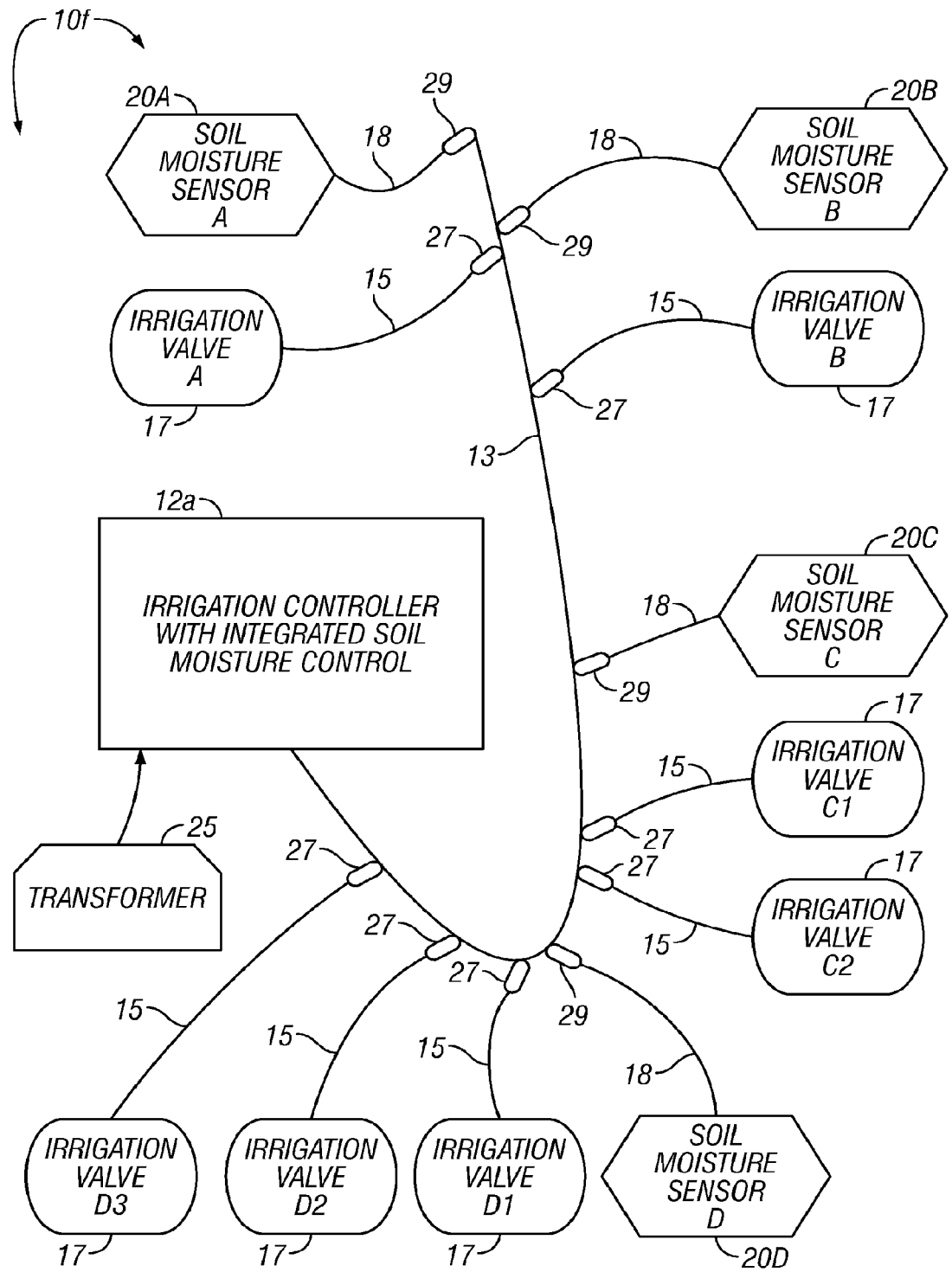
FIG. 21F is a simplified block diagram of an irrigation system using an irrigation controller with integrated soil moisture control capabilities with each soil moisture sensor and valve communicating with the irrigation controller through a multi-wire cable using encoder and decoder circuitry, according to another embodiment.

Referring to FIG. 21F, a standalone irrigation controller 12a internally contains electronics and logic and/or firmware similar to that of the standalone controller 12 of FIG. 21A and the attached soil moisture control unit 16 of FIG. 21A. In this case, controller 12 is designed to communicate to all of the peripheral devices using encoder and decoder technology. The irrigation controller 12a is connected via cable 13 to a variety of decoder modules 27 and 29. Decoder modules 27 are designed to provide power to turn on control valves when the irrigation controller sends the appropriate command. Decoder modules 29 are designed to communicate two ways and provide the communication channel between the soil moisture sensors 20a-d and the irrigation controller 12a. Decoder modules 29 are connected to the soil moisture sensors 20 via using cable 18a. Optionally, the decoder module 29 may be built into the housings of sensors 20a-d to allow connection directly to cable 13.

The decoder modules 27 and 29 (FIG. 21F) each have an individual address assigned to them. Any data transmitted by the cable 13 includes an address message packet in the communications that identify which sensor or valve the data is coming from or being sent to. This allows for many sensors and many valves to be installed over a large are using only a single two or three wire cable 13, thus potentially saving thousands of feet of wire and the related labor to install it. The controller 12a would typically be mounted in a garage or other protected location, although it can have a waterproof construction that allows it to be mounted out of doors. The soil moisture sensors 20a-d are typically mounted in the ground at places that represent the typical moisture content of the irrigated areas. The cables 18 typically include copper wires so that power can be supplied to the soil moisture sensors 20a-d from the irrigation controller 12a. Data and commands may be sent on the power wires or on other copper wires in the cables. Alternately, these same devices may be powered by one or more batteries (not illustrated}. A transformer 25 that plugs into a standard household 110VAC duplex outlet supplies 24VAC power to the stand alone irrigation controller 12a.

In an embodiment, the irrigation system 10f of FIG. 21F employs hard wired decoder communications cable 13 which is connected to decoder modules 27 and 29. Irrigation valves are connected to decoder modules 27 using cables 15. Soil moisture sensors are connected to the decoder modules 29 using cables 18.

Figure 21G:
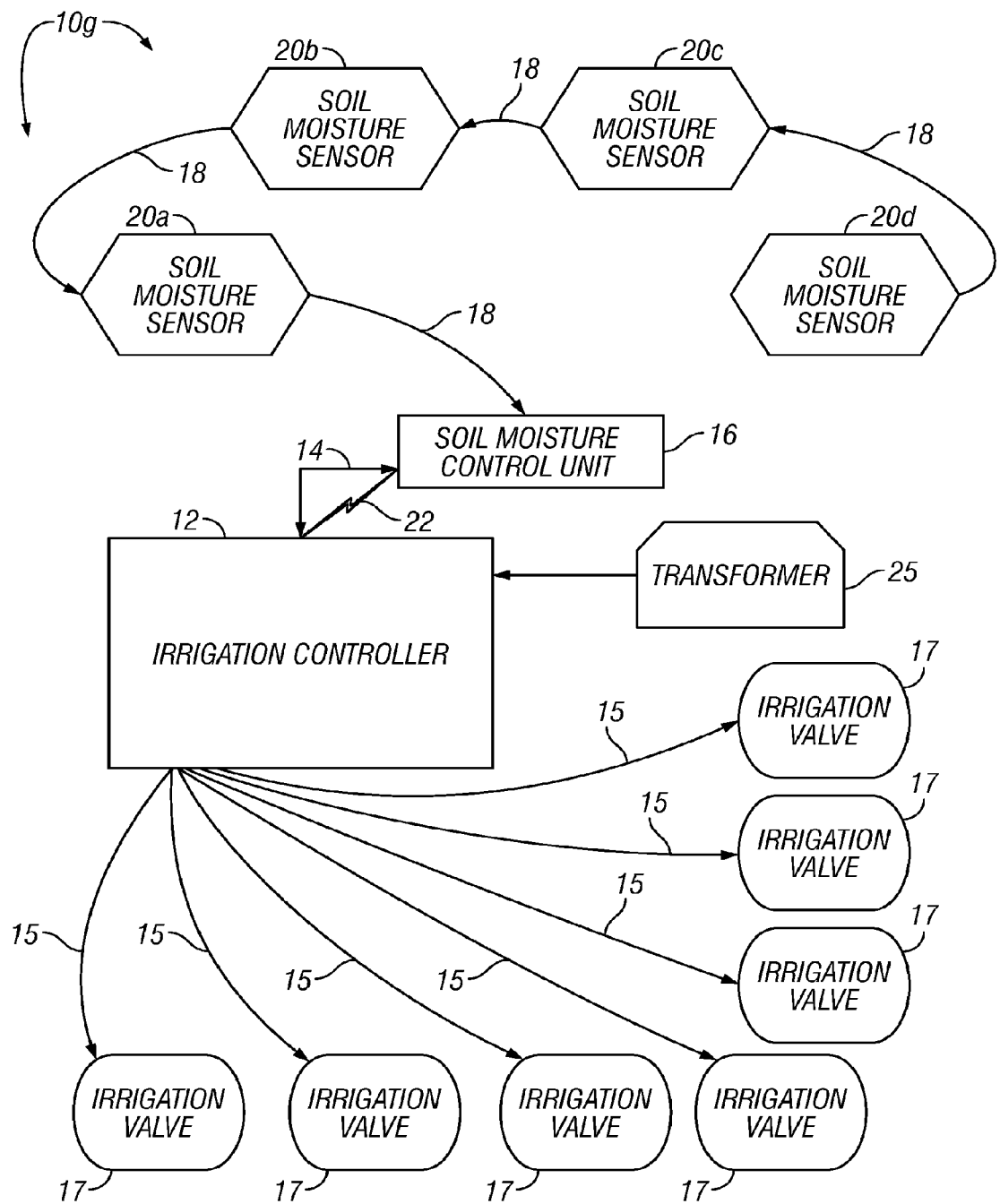
FIG. 21G is a simplified block diagram of an irrigation system using a stand alone irrigation controller, and a soil moisture sensor control unit with one sensor communicating directly to the soil moisture control unit and each following soil moisture sensors communicating through the soil moisture sensor ahead of it in a daisy chain fashion, according to another embodiment.

Referring to FIG. 21G, a standalone irrigation controller 12 is connected via cable 14 to a standalone soil moisture control unit 16 that is in turn connected via multi wire cables 18 to one or more soil moisture sensors 20a-20d. This figure illustrates a daisy chain connection configuration for the soil moisture sensors 20a-20d that allows for communications to and from the soil moisture sensors 20a-d and the soil moisture sensor control unit 16. The stand alone irrigation controller 12 and stand alone soil moisture control unit 16 would typically be mounted in a garage or other protected location, although they can have a waterproof construction that allows them to be mounted out of doors. The soil moisture sensors 20a-d are typically mounted in the ground at places that represent the typical moisture content of the irrigated areas. The cables 14 and 18 typically include copper wires so that power can be supplied to the soil moisture control unit 16 and the soil moisture sensor 20 from the irrigation controller 12. Data and commands are sent on other copper wires in the cables. Fiber optic cables can also be utilized for sending data and commands. Optionally, the soil moisture sensor 20 may receive its power via a battery where only the data is sent over the connecting wire 18. A transformer 25 that plugs into a standard household 110VAC duplex outlet supplies 24VAC power to the stand alone irrigation controller 12.

In an embodiment, the irrigation system 10g (FIG. 21G) employs a hard wired communication link 14 between the stand alone irrigation controller 12 and the stand alone soil moisture control unit 16 that are normally mounted adjacent one another, such as on a garage wall, and hard wired communication link 18 between the stand alone soil moisture control unit 16 and the soil moisture sensor 20a. Subsequent soil moisture sensors are connected in a daisy chain fashion to the next sensor ahead of it. The soil moisture control unit 16 may be manufactured small enough to fit inside the open space of the irrigation controller 12. One or more irrigation valves 17 are connected to the output of the irrigation controller using multi wire cable 15 or other suitable individual wires.

Figure 21H:
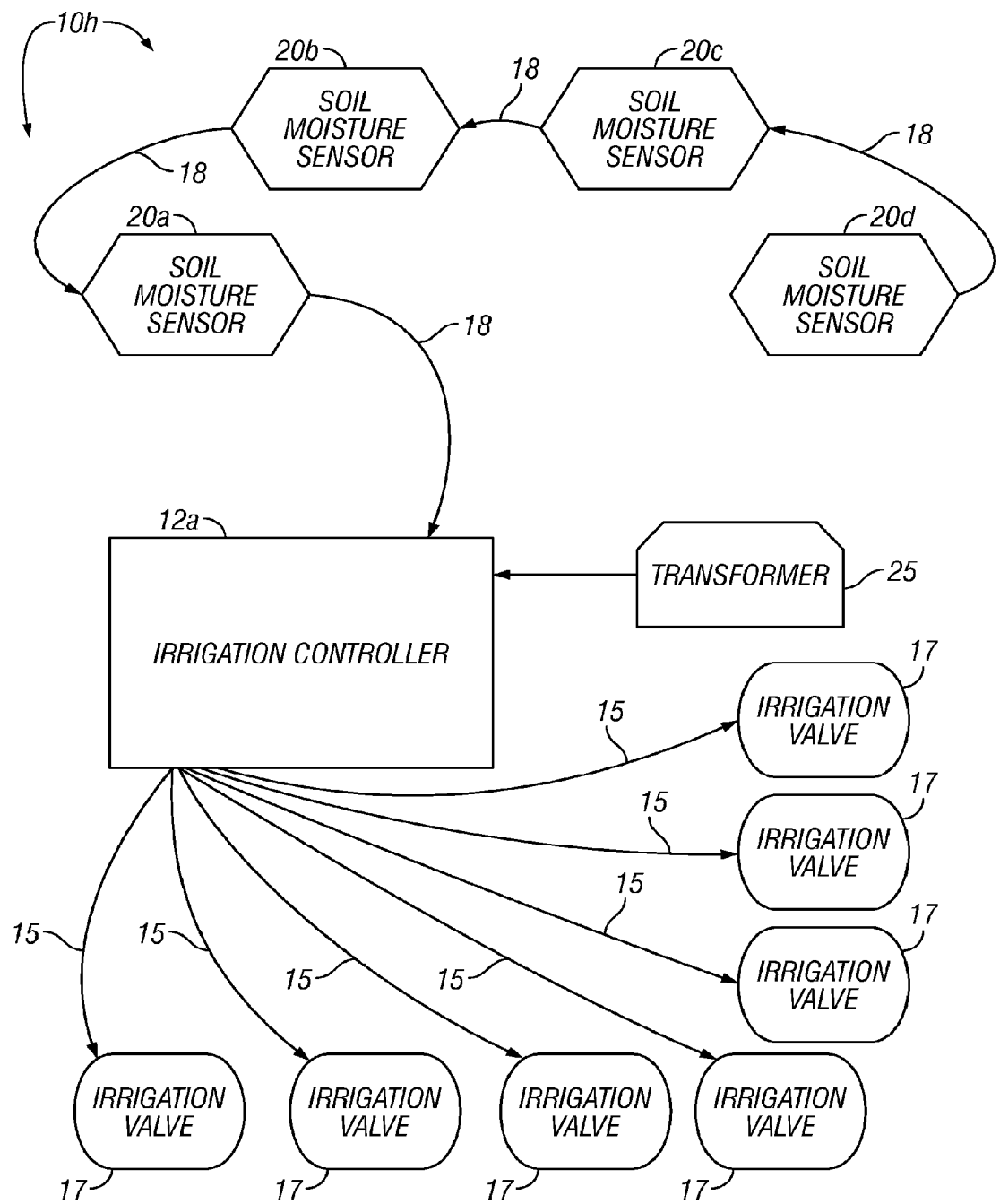
FIG. 21H is a simplified block diagram of an irrigation system using an irrigation controller with integrated soil moisture control capabilities having one soil moisture sensor communicating directly to the irrigation controller, and each of the following soil moisture sensors communicating through the soil moisture sensor ahead of it in a daisy chain fashion, according to another embodiment.

Referring to FIG. 21H, a stand alone irrigation controller 12a internally contains electronics and logic and/or firmware similar to that of the standalone controller 12 of FIG. 21A and the attached soil moisture control unit 16 of FIG. 21A. This figure illustrates a daisy chain communications scheme to and from the soil moisture sensors 20a-d and the irrigation controller 12a. The irrigation controller 12a is connected via multi-wire cables 18 to soil moisture sensors 20a. Subsequent soil moisture sensors are connected in a daisy chain fashion to the next soil moisture sensor ahead of it. The controller 12a would typically be mounted in a garage or other protected location, although it can have a waterproof construction that allows it to be mounted out of doors. The soil moisture sensors 20a-d are typically mounted in the ground at places that represent the typical moisture content of the irrigated areas. The cables 18 typically include copper wires so that power can be supplied to the soil moisture sensors 20a-b from the irrigation controller 12a. Data and commands may be sent on the same power wires or on other copper wires in the cables. Fiber optic cables can also be utilized for sending data and commands. Optionally, the soil moisture sensors 20a-d may receive power via a battery where only the data is sent over the connecting wires 18. A transformer 25 that plugs into a standard household 110VAC duplex outlet supplies 24VAC power to the stand alone irrigation controller 12a.

In an embodiment, the irrigation system 10h (FIG. 21H) employs an irrigation controller 12a and hard wired communication links 18 between the irrigation controller 12a and the soil moisture sensors 20a. Subsequent soil moisture sensors are connected in a daisy chain fashion to the next sensor ahead of it. The irrigation controller 12a may be purpose built to work with soil moisture sensors 20a-d or it may be manufactured as a more generic irrigation controller that is designed to accept a plug-in module that adapts it to work with soil moisture sensors 20a-d. One or more irrigation valves 17 are connected to the output of the irrigation controller using multi wire cable 15 or other suitable individual wires.

In each of the FIGS. 21A, 21B, 21C and 21G, the hard wired connection 14 may be replaced by a wireless connection 22 and the soil moisture control unit 16 may receive its power from an alternative source, including a different 24VAC power supply or one or more batteries.

In conclusion, the sensor control unit 16 utilizes the watering program set up procedures that the users are already accustomed to. Start times, station run times, and days-to-water are manually entered into the irrigation controller 12.

The user also selects from one of a group sensors in the sensor control unit 16. The sensor control unit 16 then automatically takes over setting of the seasonal adjustment feature of the irrigation controller 12 on a regular basis. Instead of a user changing that feature several times per year, the sensor control unit 16 automatically sets that seasonal adjustment daily depending on current conditions gathered on site. Furthermore, the sensor control unit 16 shuts down any scheduled watering by the irrigation controller 12 in response to, for example, a rain event, a freeze event, and when there is a scheduled no-water window.

Embodiments also provides a unique method of controlling a plurality of valves on an irrigation site. The method includes the steps of selecting and/or creating a watering schedule, storing the watering schedule and generating a signal representative of a condition on an irrigation site. The method also includes the steps of calculating an estimated irrigation requirement value based at least in part on the sensor signal and selectively turning a plurality of valves located on the irrigation site ON and OFF in accordance with the watering schedule. Importantly, the method includes the further step of automatically modifying the watering schedule based on the estimated irrigation requirement value using a seasonal adjust algorithm to thereby conserve water while maintaining the health of plants on the irrigation site. Optionally, the method may further include the step of inputting an overall watering adjustment and automatically modifying the watering schedule through the seasonal adjust algorithm based on the estimated irrigation requirement value as increased or decreased by the inputted overall watering adjustment.

While an embodiment of an irrigation system 10 comprising a stand alone sensor control unit 16 connected to stand alone irrigation controller 12 and linked to one or more separate sensors 20 has been described in detail, persons skilled in the art will appreciate that embodiments can be modified in arrangement and detail. The features and functionality described could be provided by combining the irrigation controller 12 and the sensor control unit 16 into a single integrated unit in which case a single microcontroller would replace the microcontrollers 40 and 108. Alternatively, the sensor control unit could be packaged in sensor control module designed for removable insertion into a receptacle in a stand alone irrigation controller 12. The irrigation controller 12 may be mounted outside, or be connected directly to 110 or 220 AC power with a transformer mounted inside the irrigation controller 12. The sensors 20 or communications hubs may be powered by batteries that may be replaceable or rechargeable. Rechargeable batteries may be recharged using any charging technology including solar, water, or wind powered generators.

Depending on the embodiment, certain acts, events, or functions of any of the algorithms described herein can be performed in a different sequence, can be added, merged, or left out altogether (e.g., not all described acts or events are necessary for the practice of the algorithm). Moreover, in certain embodiments, acts or events can be performed concurrently, e.g., through multi-threaded processing, interrupt processing, or multiple processors or processor cores or on other parallel architectures, rather than sequentially.

The various illustrative logical blocks, modules, and algorithm steps described in connection with the embodiments disclosed herein can be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

The various illustrative logical blocks and modules described in connection with the embodiments disclosed herein can be implemented or performed by a machine, such as a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor can be a microprocessor, but in the alternative, the processor can be a controller, microcontroller, or state machine, combinations of the same, or the like. A processor can also be implemented as a combination of computing devices, e.g., a combination of a DSP and a microprocessor, a plurality of microprocessors, one or more microprocessors in conjunction with a DSP core, or any other such configuration.

The steps of a method, process, or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of computer-readable storage medium known in the art. An exemplary storage medium can be coupled to the processor such that the processor can read information from, and write information to, the storage medium. In the alternative, the storage medium can be integral to the processor. The processor and the storage medium can reside in an ASIC.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding whether these features, elements and/or states are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

While the above detailed description has shown, described, and pointed out novel features as applied to various embodiments, it will be understood that various omissions, substitutions, and changes in the form and details of the devices or algorithms illustrated can be made without departing from the spirit of the disclosure. As will be recognized, certain embodiments of the inventions described herein can be embodied within a form that does not provide all of the features and benefits set forth herein, as some features can be used or practiced separately from others. The scope of certain inventions disclosed herein is indicated by the appended claims rather than by the foregoing description. All changes which come within the meaning and range of equivalency of the claims are to be embraced within their scope.

What is claimed is:

1. A stand alone irrigation system comprising:
a stand alone irrigation controller comprising a plurality of user inputs that enable a user to enter a watering schedule including a run time, a computer processor operatively connected to the plurality of user inputs, and a memory connected to the computer processor;
a stand alone control unit comprising a memory storing programming and components of historical evapotranspiration (ET) data associated with a landscape area; and
a plurality of sensors in communication with the stand alone control unit, each sensor configured to generate an environmental signal representative of an irrigation condition of the landscape area, the plurality of sensors comprising at least a first sensor configured to generate a first signal representative of solar radiation and a second sensor configured to generate a second signal representative of temperature;
wherein the programming is configured to calculate a first value using the environmental signals communicated from the plurality of sensors, one or more of the components of historical ET data, and a reference comprising a maximum expected user-adjustable ET value, and communicate the first value to the computer processor of the stand alone irrigation controller to automatically scale the run time of the watering schedule based on the first value, the stand alone irrigation controller configured to provide operational signals to at least one irrigation control valve to cause the at least one irrigation control valve to supply water to irrigate the landscape area according to the scaled run time of the watering schedule.

2. The stand alone irrigation system of claim 1 wherein the environmental signals communicated from the plurality of sensors are the first signal representative of solar radiation and the second signal representative of temperature.

3. The stand alone irrigation system of claim 1 wherein the stand alone control unit further comprises at least one user input that enables the user to change the reference.

4. The stand alone irrigation system of claim 1 wherein the environmental signals from the plurality of sensors further comprise an indication of at least one of humidity, soil moisture, wind, and rain.

5. The stand alone irrigation system of claim 1 wherein the components of historical ET data comprise temperature, humidity, solar radiation, and wind speed for the landscape area.

6. The stand alone irrigation system of claim 1 wherein the stand alone control unit further comprises a protective housing.

7. The stand alone irrigation system of claim 1 wherein the stand alone control unit further comprises a housing that is mountable to a housing of the stand alone irrigation controller.

8. The stand alone irrigation system of claim 1 further comprising a soil moisture sensor configured to measure a level of soil moisture, the computer processor of the stand alone irrigation controller configured to automatically inhibit irrigation when the level of soil moisture is greater than a threshold.

9. A stand alone irrigation system comprising:
a stand alone irrigation controller comprising a plurality of user inputs that enables a user to enter a watering schedule including a run time;
a computer processor operatively connected to the plurality of user inputs, wherein the computer processor is configured to modify the watering schedule;
a memory connected to the computer processor to store the watering schedule and constants selected to simulate local conditions of a landscape area;
a first sensor local to the landscape area and configured to generate a signal representative of solar radiation;
a second sensor local to the landscape area and configured to generate a signal representative of temperature, the computer processor configured to calculate a percentage change using the signal representative of solar radiation from the first sensor, the signal representative of temperature from the second sensor, one or more of the constants selected to simulate the local conditions of the landscape area, and a reference comprising a maximum expected user-adjustable evapotranspiration (ET) value; and
programming stored in the memory to automatically modify the watering schedule by the percentage change, the stand alone irrigation controller configured to provide operational signals to at least one irrigation control valve to cause the at least one irrigation control valve to supply water to irrigate the landscape area according to the modified watering schedule.

10. The stand alone irrigation system of claim 9 wherein the constants selected to simulate the local conditions of the landscape area comprise temperature, humidity, solar radiation, and wind speed for the landscape area.

11. The stand alone irrigation system of claim 9 further comprising a third sensor local to the landscape area and configured to generate an environmental signal representative of an irrigation condition of the landscape area, the environmental signal selected from the group consisting of humidity, wind speed and soil moisture.

12. The stand alone irrigation system of claim 9 further comprising a soil moisture sensor configured to measure a level of soil moisture, the computer processor further configured to automatically inhibit irrigation when the level of soil moisture is greater than a threshold.

13. The stand alone irrigation system of claim 9 further comprising at least one user input that enables the user to change the reference.

14. A method to irrigate an irrigation site, the method comprising:
providing a stand alone irrigation controller;
accepting inputs at the stand alone irrigation controller from a user that enable the user to enter a watering schedule including a run time;
receiving a first signal representative of solar radiation at an irrigation site from a first sensor local to the irrigation site;
receiving a second signal representative of temperature at the irrigation site from a second sensor local to the irrigation site;
storing in a memory constants selected to simulate local conditions of the irrigation site;
calculating a percentage change to the watering schedule using the first signal, the second signal, and a user-adjustable reference that is based on one or more of the constants selected to simulate the local conditions of the irrigation site and a maximum expected user-adjustable evapotranspiration (ET) value;
automatically adjusting the watering schedule by the percentage change; and
providing operational signals to at least one irrigation control valve to cause the at least one irrigation control valve to supply water to the irrigation site according to the adjusted watering schedule.

16. The method of claim 14 further comprising inhibiting irrigation when a level of soil moisture is greater than a threshold.

16. The method of claim 14 further comprising automatically shutting down irrigation based at least in part on detecting a rain event.

17. The method of claim 14 further comprising automatically shutting down irrigation based at least in part on detecting a freeze event.

18. The method of claim 14 further comprising providing a stand alone control unit that is in communication with the first and second sensors and comprises the memory storing the constants selected to simulate the local conditions of the irrigation site, the memory further storing programming that is configured to calculate the percentage change, the stand alone control unit operably connected to the stand alone controller to communicate the percentage change to the stand alone controller.

* * * * *